United States Patent [19]

Harshbarger et al.

[11] Patent Number: 4,670,782

[45] Date of Patent: Jun. 2, 1987

[54] TELEVISION VIDEO PATTERN GENERATOR SYSTEM

[75] Inventors: John H. Harshbarger, Xenia; William M. Shores, Dayton, both of Ohio

[73] Assignee: Visual Information Institute, Inc., Xenia, Ohio

[21] Appl. No.: 699,961

[22] Filed: Feb. 8, 1985

[51] Int. Cl.⁴ ............................................. H04N 5/06
[52] U.S. Cl. .................................. 358/139; 328/187; 328/188; 358/150; 358/151
[58] Field of Search ................. 358/139, 10, 150, 151; 328/187, 188

[56] References Cited

U.S. PATENT DOCUMENTS

| | | | |
|---|---|---|---|
| 3,019,289 | 1/1962 | Machlis | 358/10 |
| 3,879,749 | 4/1975 | Baum | 358/10 |
| 3,917,902 | 11/1975 | Olson | 358/139 |
| 4,093,960 | 6/1978 | Estes | 358/10 |
| 4,149,178 | 4/1979 | Estes | 358/10 |
| 4,417,275 | 11/1983 | Harshbarger et al. | 358/139 |
| 4,513,318 | 4/1985 | Wilensky | 328/188 |
| 4,518,995 | 5/1985 | Harshbarger | 328/187 |

OTHER PUBLICATIONS

"Vii Raster Master Keyboard Entry Programmable Sync Generator", Visual Information Institute, Xenia, Ohio, copyright 1984.
Wells-Gardner Electronics Corporation Brochure, "Series 80 Signal Generator".
Quantum Data, Inc., "Quantum Data Model 801 Programmable Character Generator Owner's Manual".
Visual Information Institute, Inc., "High-Technology Television" (1982).

Primary Examiner—Howard W. Britton
Attorney, Agent, or Firm—Jeffers, Irish & Hoffman

[57] ABSTRACT

A television video pattern generator system comprises a keyboard for entering pulse width and timing parameters for a video scanning rate. The individual incremental pulse width and timing parameters for the horizontal and vertical synchronizing waveforms are entered into a keyboard. A pattern selector selects a particular pattern which the operator wants to display on the video screen. The entered values are stored in a memory and a central processing unit processes the entered parameters and causes horizontal and vertical generators to generate the horizontal and vertical scan signals. A sync generator receives inputs from the horizontal and vertical generators and generates the scan rate. A pattern generator receives inputs from the sync generator and a pattern selector and generates a video display pattern in accordance with the selected pattern parameters and the selected scan rate parameters. If it is desired to compute a scan rate rather than to build a custom scan rate the central processing unit will automatically calculate a scan rate based upon enter parameters so that the individual pulse width of the scan rate pulses are expressed as a percentage of total horizontal line time.

24 Claims, 44 Drawing Figures

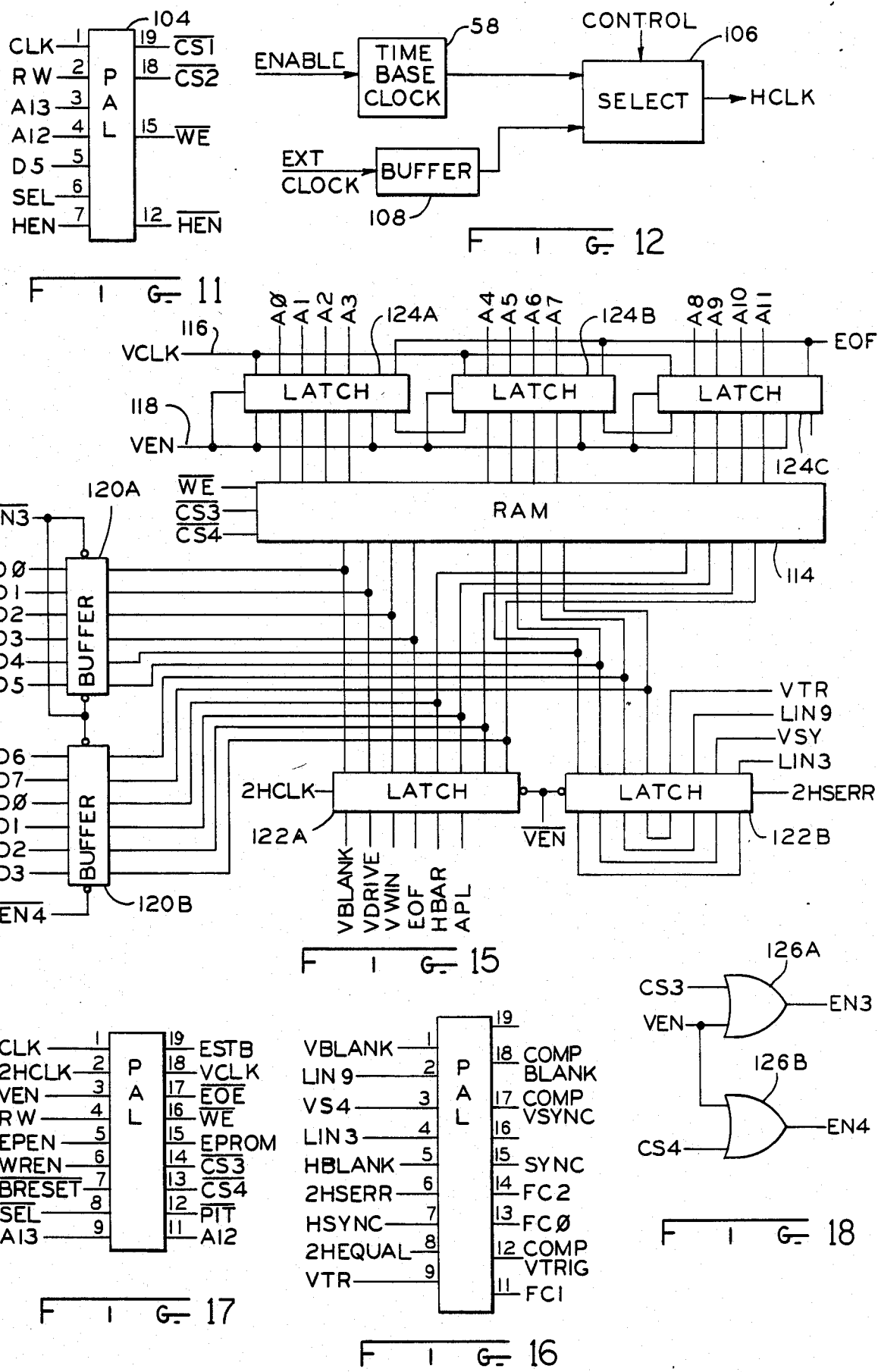

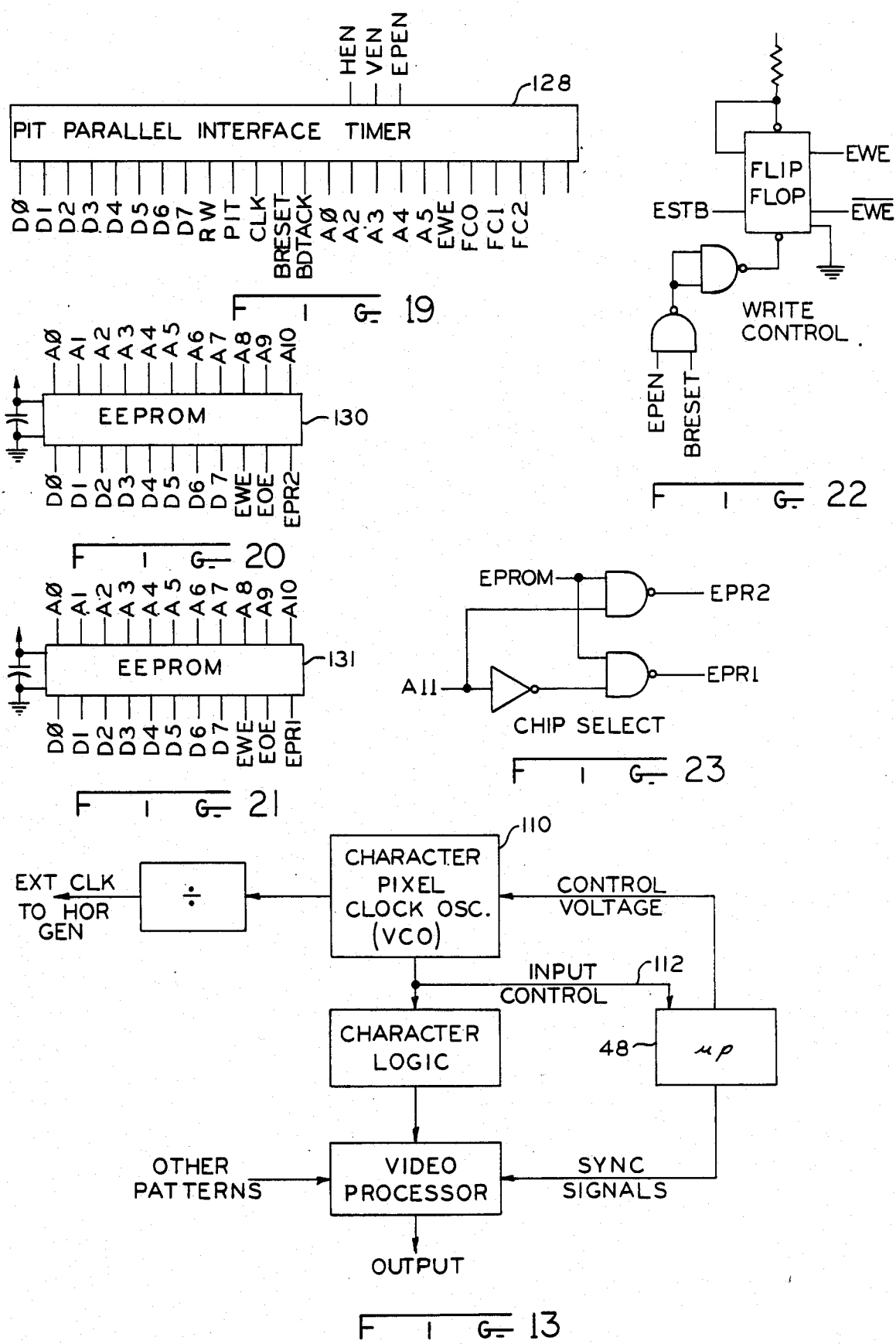

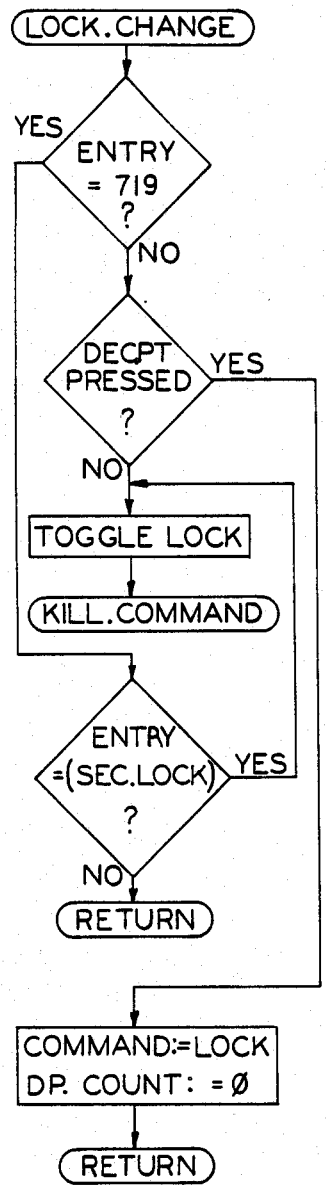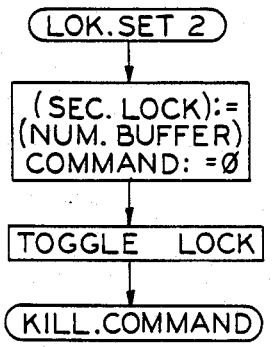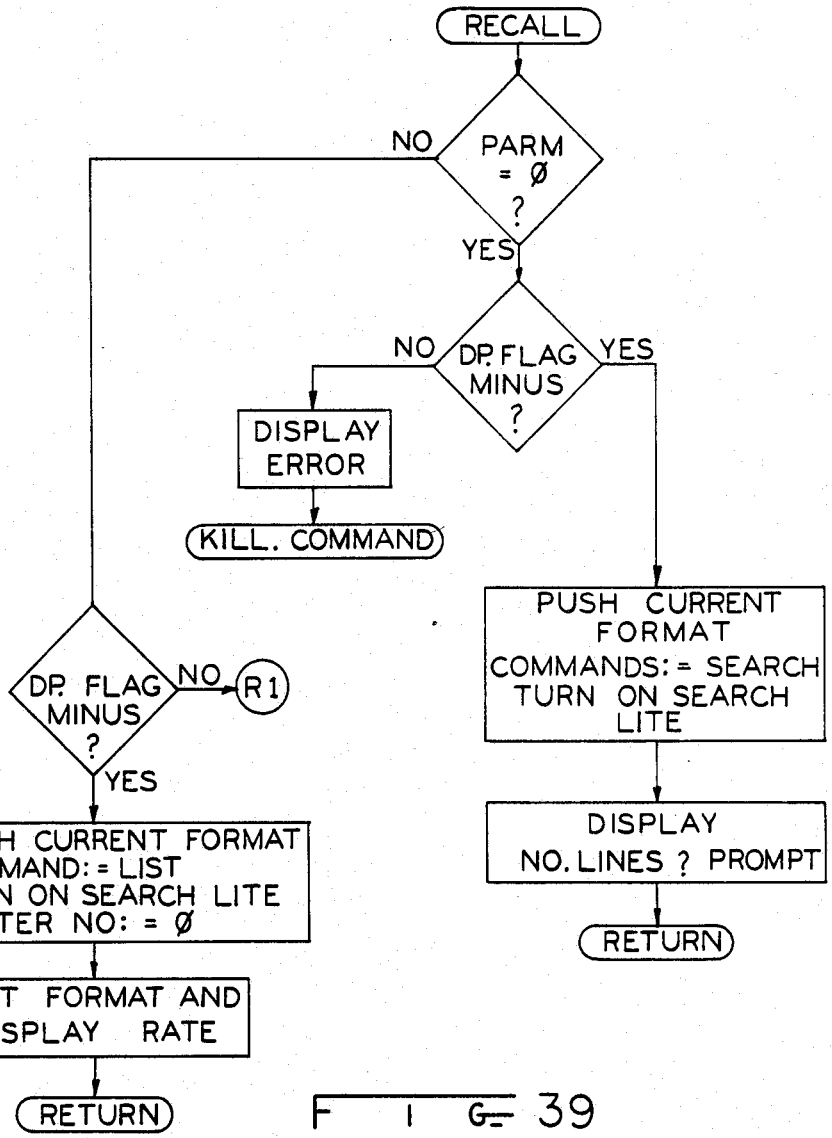

TELEVISION VIDEO PATTERN GENERATOR SYSTEM

BACKGROUND OF THE INVENTION

This invention relates generally to television signal generators, and more particularly to multiple scan rate video test pattern generators for raster scan display devices such as television sets.

Modern television applications are demanding ever greater accuracy in cathode ray tube (CRT) displays. Computer generated images are developed with great timing accuracy and data analysis has been carried to the point that systems are offered in which measurements can be made directly off the television image. Accuracy of placement is paramount in such applications as computerized medical x-ray, industrial process control, etc. This has placed stringent demands on the stability and scan accuracy of television display devices. The response to these demands has been development of more precise television display devices which in turn has led to the need for more precise test techniques and equipment to evaluate a more demanding level of performance.

Television test pattern generators are used to generate a variety of video test patterns which are used to permit adjustment of television receivers or which may be used in the manufacturing and service of television receivers and television signal transmitting equipment.

Examples of test pattern generator systems are disclosed in U.S. Pat. Nos. 4,149,178; 4,093,960; 3,917,902; 3,879,749; 3,019,289; and 4,417,275.

Conventional television test pattern generators require composite, horizontal and vertical blanking, horizontal and vertical drive inputs and provide a composite video signal output.

The television raster is scanned in horizontal lines which progress from the top of the raster to the bottom of the raster. After a total raster field has been scanned the process is repeated. In many applications two fields are scanned to complete one "frame" and the fields are "interlaced".

The composite video signal for scanning the television raster is comprised of both picture and synchronizing information. The raster scan synchronizing information consists of horizontal and vertical scan pulses of precisely determined widths and timing. The scan rate can be described on either a time basis or a pixel basis. A pixel is defined as a discreet bit of information corresponding to a discreet picture element.

H drive is a pulse train in which a pulse starts at the end of every television scanning line, its function being to mark the time interval between the end of one line and the start of another line. The H drive pulses may be used to control the horizontal deflection "flyback" and other signal processing. The horizontal drive pulse train is continuous and uninterrupted even during the vertical synchronizing interval. V drive is a pulse train in which a pulse starts at the end of each television field, its function being to mark the time interval between the end of one television field and the next. The V drive pulses may be used to control the vertical deflection "flyback" and other signal processing.

Blanking is a mixture of horizontal and vertical information used to control the "blackout" of a television screen during deflection return or "flyback" between horizontal lines and vertical fields. The blanking pulses are wider than drive and sync pulses in order to insure that all transitions are invisible, i.e. blanked.

Sync is a complex combination of the horizontal and vertical pulse information used to control the decoding of a television signal by the display device, recorder or other type of video processing equipment. Sync is usually mixed with the video information to produce a composite picture signal.

The scan rate is determined by the number of scan lines per field and desired field repetition rate. Most television systems are "interlaced" to avoid a visible flicker in the display, usually at a 2:1 ratio; 2:1, interlaced ratio means that two entire display "fields" must be developed to generate one complete "frame" or image. In the United States, field and frame rates are 60 HZ and 30 HZ respectively, whereas in countries having 50 HZ power, including the European Countries and Japan the field and frame rates are 50 HZ and 25 HZ respectively. Television operation without interlacing, commonly referred to as 1:1 interlace, is also fairly common.

Recently and particularly in the interface of television equipment with computers, there has been a new proliferation of scan rates. There is the never ending search for means to pack more information into a given area at the expense of inactive (blanking) time.

The different types of television systems, e.g. domestic broadcast, foreign broadcast, industrial and military, operate at many different scanning rates. Complete specification of a scan rate requires careful and precise definition of the scan parameters such as the horizontal scanning line repetition rate [usually expressed in kHZ], the number of scanning lines to be developed in each television field, the number of television fields which make up a complete frame, and the widths of the pulses present within the various synchronizing wave forms.

The format of H drive, V drive and blanking is the same for all scanning rates. However, the sync wave form can occur in any one of three formats, namely broadcast, industrial and military. In the broadcast system the vertical sync pulse interval is preceded by a front porch interval and followed by a back porch interval each porch interval having a duration of three scanning line intervals. Six 2H rate equalizing pulses are superimposed on the sync signal during the front porch and back porch intervals, i.e. six equalizing pulses during each such interval, and six 2H rate serration pulses are superimposed on the vertical sync pulse. Domestic broadcast sync also includes horizontal front porch intervals preceding the horizontal sync pulses.

The sync for industrial television is the same as for broadcast television except for the omission of the equalizing pulses and serration pulses. The sync for military television does not include equalizing and serration pulses, has no horizontal front porch, and no horizontal rate pulse information during the vertical front porch interval of three scanning lines.

Conventional sync generator circuits for test pattern generators have been limited in their applicability to test various types of television systems. Typically they provide only one scanning rate depending upon the type of television system with which the test pattern generator is to be used. It is therefore desirable to provide a selectable rate sync generator for universal application to various types of television systems whereby the scanning rate may be selected over a wide range of specifications.

In one prior art patent, U.S. Pat. No. 4,417,275, assigned to the assignee of record of the present application and which is incorporated herein by reference, a selectable rate sync generator system is provided which selects the desired scan rate by specifying the total horizontal line time and the number of scan lines which are to occur in two fields, regardless of the number of fields which make up a frame. The horizontal repetition rate is either specified or can be calculated. The calculated horizontal line time is selected by a total horizontal line time thumb wheel selection switch which results in the desired horizontal rate. Another thumb wheel selection switch in the system is set for the desired number of scan lines in two fields.

Signal source 1206A, which is a pattern generator and sync generator manufactured by Visual Information Institute, Inc., the assignee of the present application, utilizes a plurality of switches to set various parameters for generation of the synchronizing waveform and pattern. This device and the accompanying technical manual therefor is incorporated herein by references.

A problem with the prior art sync generator test systems has been that, in pixel based rasters, the number of horizontal lines per field and the line time needed to be calculated. This process was time consuming and unwieldy. Furthermore, in such systems the oscillator frequency had to be varied to accomodate the different system requirements, whereby an infinitely variable oscillator had to be provided. This requirement placed special demands on the system designer. It is therefore desired to provide a sync generator for producing variable scan rates with a fixed frequency oscillator.

While the raster scan test pattern generator described in the above-identified prior art U.S. Pat. No. 4,417,275 is satisfactory for many applications, it is desirable to provide a test pattern generator which is readily applicable to television systems wherein the rasters are defined in pixels or number of data bits per horizontal line without the need for multiple calculations in the use of the generator.

One prior art pixel based sync generator system has been provided wherein a frequency synthesizer is used comprising a variable oscillator having a variable frequency. The system requires entry of a few major parameters defining a scan rate and then calculates all values for the desired scan rate. The disadvantage of the system is that binary integers must be used for computing the different frequencies, whereby certain frequencies cannot be provided with the system and certain raster specifications will not be achievable. Additionally, the lack of sufficiently fine resolution achieved with that system at the higher frequency ranges of the oscillator is undesirable.

What is therefore desired is to provide a universal time based sync generator system wherein multiple scan rate test patterns, both time and pixel based, can be generated by entering the parameters for all the horizontal and vertical sync pulse elements into a keyboard and wherein the system builds or generates the scan rate from the discrete defined sync elements.

Another disadvantage of the above-identified prior art pixel based sync generator system is that all entries must be made on the keyboard or keypad. Thus with that system, if a television unit were being tested and several different patterns were desired to be viewed, such as a bar pattern, a dot pattern, gray scale, etc., this could not be quickly achieved as new entries would have to be made in the keyboard. What is therefore desired is a sync generator system wherein the parameters for a particular scan rate are preset in a keyboard and wherein a control is provided which permits rapid selection of different types of test patterns which are generated utilizing the scan rate parameters keyed into the keyboard.

What is also desired is a sync generator wherein stored raster scan test patterns can be altered and customized as desired.

What is furthermore desired is a sync generator wherein stored raster scan test patterns can only be altered by entering a software security code into the keyboard.

What is still further desired is a test pattern generator which provides a default scan rate when the system is first turned on, whereby a predetermined raster scan rate is provided to prevent any damage to the Cathode Ray Tube unit being tested.

What is yet further desired is a sync generator system having a keyboard display for displaying parameters and other items in a user friendly readable language rather than digital code.

SUMMARY OF THE INVENTION

The present invention overcomes the disadvantages of the above prior art test generators by providing an improved test generator which is applicable to a wide variety of television systems, both time based and pixel based. In this system parameters and timing are indicated on an alpha-numeric display. The operator may generate or build a custom rate, one element at a time according to parameters entered on a keyboard or may choose standard scan rate proportions whereby a rate will be computed automatically. Thus it is possible to synthesize a scan rate from the individual pulse elements whose parameters are entered into the keyboard. Rates may be stored, recalled for use, edited, or deleted, by keypad code entries. Memory storage is provided for a large number of raster structures. Software lockout is provided to prevent unauthorized editing without a proper access code.

A sync generator system has been developed by the assignee of record of the present invention whereby a proportional standard is provided which is applicable to all scan rates. This system overcomes the problems inherent in previous systems and is convenient for clocked generation of sync signals by modern digital techniques. Thus this system provides a totally clocked system for automatically calculating a scan rate in which all pulse widths are expressed as percentage of total horizontal line time. The format is therefore called a proportional format.

In order to simplify equipment and calibration procedures and thereby to minimize equipment costs the instant invention provides a universal format for horizontal scan rate raster development based on a 0.1 microsecond timing increment. In the system according to the invention all horizontal rate parameters e.g. total H line, H blanking width, H front porch etc., are defined to the nearest 0.1 microsecond and are programmed into a keypad. Increments of time smaller than 0.1 microseconds are rounded off. Vertical parameters are established in increments of half lines. Pulses such as V blanking, V drive, V front porch, and V sync are configured to the nearest half-line.

Thus in the system according to the present invention the operator can either use a preset or proportional format wherein the entire scan rate is calculated automatically or the operator can synthesize or build a custom raster rate from pulse increments.

Furthermore, a selection control is provided in addition to the keypad for rapidly selecting test patterns without the need for entering a code into the keypad.

Another advantage of the present invention is the ability to edit and customize raster scan rates as desired.

Yet a further advantage of the present invention is that a pattern generator is provided whereby patterns can be generated by selecting the desired pattern with a separate pattern selection control.

It is a still further advantage of the present invention that stored or memorized raster scan rates may only be altered by entering a software security code into the keyboard.

It is yet a further advantage of the present invention that the system provides a default scan rate when the system is first turned on, thereby preventing damage to the cathode ray tube unit being tested.

Yet another advantage of the present invention is that the keyboard display can be read by the the operator without resorting to a decoding chart.

The invention, in one form thereof, comprises a selectable rate sync generator for a video test pattern generator. The selectable rates sync generator comprises a keyboard for selecting individual and independent raster scan signal pulse width and timing parameters for the horizontal and vertical synchronizing waveforms for a raster scan. The sync generator further comprises means coupled to the keyboard means for generating a time based raster scan signal by building the desired scan signal from individual pulse elements having the selected width and timing parameters.

The invention, in one form thereof, further provides a video pattern generator comprising a keyboard means for individually entering data values representing the incremental pulse width and timing parameters for all the scan rate pulses comprising a raster scan structure. A sync generator means is provided coupled to the keyboard means for generating a time based scan rate composed of pulse elements having the selected pulse widths and timing values. A fixed frequency clock is coupled to the sync generator means for controlling the sync generator and a raster pattern selecting means is provided for selecting a desired raster pattern. A pattern generator means is provided coupled to the sync generator means and the raster pattern selecting means for generating a selected raster pattern at the generated scan rate.

The present invention, in one form thereof, still further provides a video test pattern generator including a fixed frequency master clock and a keyboard for selecting scan rate elements by individually entering data values representing the pulse widths of the pulse elements comprising a scan raster. A readout means is provided coupled to the keyboard means for displaying selected scan rate data. Selecting means is provided for selecting a raster scan display pattern sync generator means is provided coupled to the keyboard means and the clock means for generating a time based scan rate comprised of the selected pulse elements. Pattern generator means is provided coupled to the sync generator means and the selecting means for generating a selected test pattern at the generated scan rate.

The invention, in one form thereof, comprises a method of generating a raster scan signal comprising entering individual pulse widths and timing parameters into a selecting means, storing said parameters in a memory, and generating a scan signal by building a scan signal comprised of pulses having the selected individual widths and timing parameters.

An object of the present invention is to provide a video test pattern generator wherein a customized raster scan rate can be provided including individual elemental pulses whose width and timing are individually specified by the operator.

Yet another object of the present invention is to provide a television video pattern generator wherein the raster scan rate can be edited and customized as desired.

Another object of the present invention is to provide a television video pattern generator system wherein raster scan rates may be stored and memorized and may only be altered by entering a software security code into the keyboard.

A still further object of the present invention is to provide a television video pattern generator which provide a default scan rate when the system is first turned on to prevent damage to the cathode rate tube being tested.

Yet another object of the present invention to provide a video test pattern generator wherein the keyboard display can be read by the operator without resorting to a decoding chart.

A yet further object of the present invention is to provide a video test pattern generator wherein a scan rate can be automatically calculated and wherein the pulse elements comprising the scan rate are expressed as a fixed percentage of total horizontal line time.

Still a further object of the present invention is to provide a video test pattern generator having a fixed frequency master oscillator.

BRIEF DESCRIPTION OF THE DRAWINGS

The above mentioned and other features and objects of this invention and the manner of obtaining them will become more apparent and the invention itself will be better understood by reference to the following description of an embodiment of the invention taken in conjunction with the accompanying drawings, wherein:

FIG. 11 is a diagram of the connections to the horizontal program array logic;

FIG. 12 is a block diagram of the clock select circuit;

FIG. 13 is a block diagram of the pixel clock;

FIG. 15 is a block diagram of the vertical sync generator;

FIG. 16 is a diagram of the connections to the vertical program array logic;

FIG. 17 is a diagram of the connections to the additional vertical program array logic;

FIG. 18 is a block diagram of an enable circuit;

FIG. 19 is a block diagram of a parallel interface timer;

FIG. 20 is a diagram of the connections to the EEPROM;

FIG. 21 is a diagram of the connections to the EEPROM;

FIG. 22 is a block diagram of the right control;

FIG. 23 is a block diagram of the chip select circuit; and

FIGS. 24–42 are flow charts useful in explaining the computing algorythm of the sync generator system.

Corresponding reference characters indicate corresponding parts throughout the several views of the drawings.

All of the exemplifications set out herein illustrate a preferred embodiment of the invention, in one form thereof. Such exemplifications are not to be construed as limiting the scope of the disclosure or the scope of the invention in any.

DETAILED DESCRIPTION OF THE PREFERRED EMBODIMENT

Figure 1A:
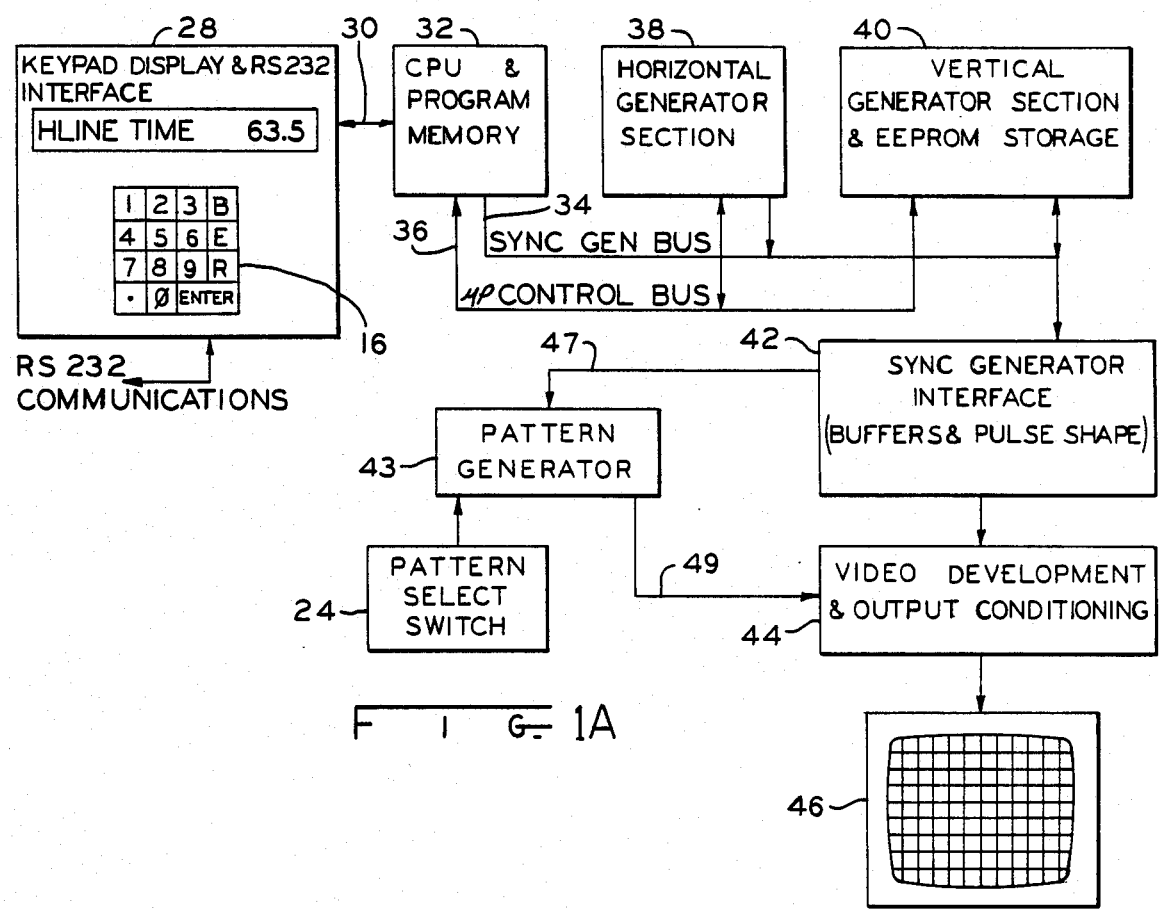
FIG. 1A is a simplified schematic block diagram of the apparatus.
Figure 2A:
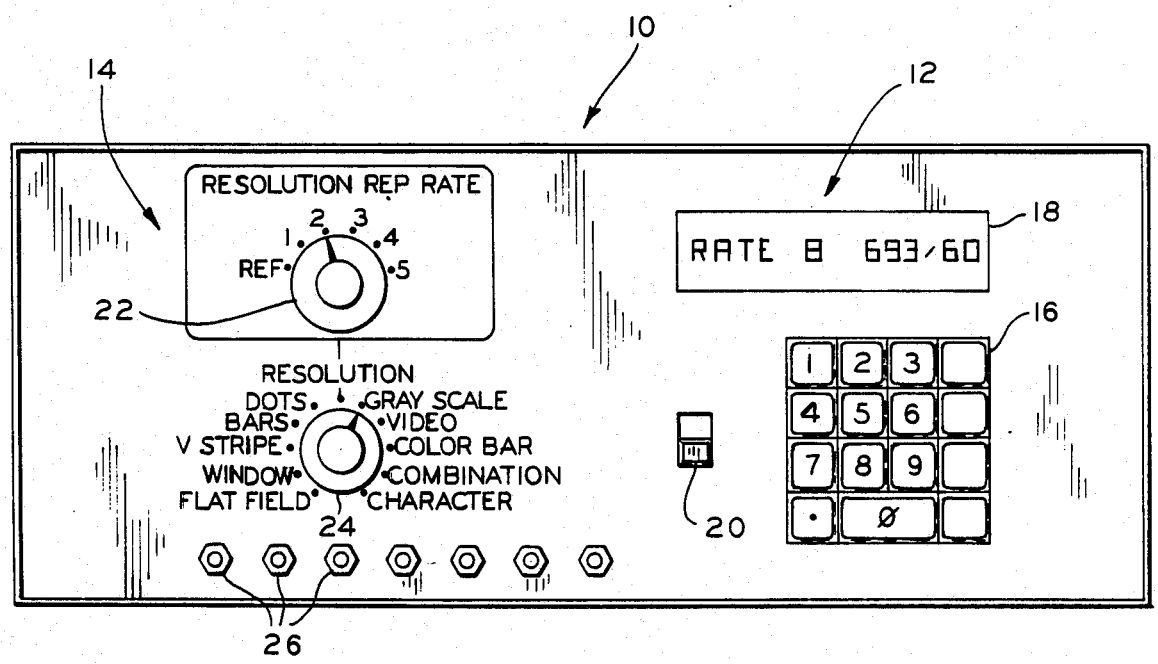
FIG. 2A is an elevational view of the control panel.

Referring first to FIG. 1A. what is disclosed is a simplified block diagram multiple scan rate test pattern generator for raster scan display devices operating in the range from a 10 kHz to 100 kHz horizontal repetition rate at various numbers of scan lines per field and vertical field rates. FIG. 2A shows the control panel 10 for the system and includes a programmable sync portion 12 and a television test pattern generator section 14. Programmable sync portion 12 includes a keypad 16 by means of which horizontal sync and pattern parameters may be entered in 0.1 microsecond timing increments. Thus the operator may build or synthesize a rate by entering horizontal parameters such as told H line time, H blanking, H sync etc., 0.1 microsecond timing increments.

Vertical parameters are entered in increments of half lines. Vertical parameters such as the number of scan lines in two fields, V blanking, V front porch, V sync etc., are entered in half line increments. The entered parameters and timing are indicated on a 16 segment alpha-numeric display 18. By means of the programmable sync portion 12 the operator may generate or build a rate, one parameter at a time, or may choose standard proportion and format which will be computed automatically. Rates may be stored, recalled for use, edited, or deleted by keypad code entries.

A basic set of test patterns is provided for evaluation of television raster type display devices. Functions are provided to conduct the performance tests for television displays such as Bars, Dots, Window, Gray Scale etc. The functions provided may be used to conduct the performance tests as provided in a publication entitled "Performance Test for Television Display Devices", published by Visual Information Institute, Inc. of Xenia, Ohio, the assignee of the instant invention.

The television test patterns are selected by means of the test pattern selection portion 14. By manipulating selector control knob 24, various test pattern functions may be selected as indicated, such as bars, dots, flat field, etc.

While most of the test functions which may be selected by knob 24 are well known in the prior art and need not be disclosed in great detail herein, the following selections provide functions as follows:

Resolution—this provides a square wave bar pattern at selected repetition rate to a maximum of 30 MHz to develop desired resolution television lines in five increments at full, 100% black to white contrast.

Character—this provides the development of a block "C" with a small "x" superimposed to form rows across the television display screen. The rows are separated by three inactive scanning lines. The number is adjustable, nominally 40–80 per row depending upon scan rate, to a maximum 25 MHz clock rate.

Video—this combines a step resolution burst sequence black reference segment and a ten step gray scale.

Combination—provides in one raster simultaneously the video pattern plus color bars.

The resolution repetition rate selector knob 22 selects the repetition rate for the square wave bar pattern when the selector control knob 24 selects the resolution setting as shown.

The advantage of providing a test pattern generator selectable by means of knob 24 is that the various scan rate parameters for forming a pattern may be recalled from memory. Thus the scan rate parameters may first be entered into the keypad and thereafter the operator can select the test patterns quickly by manipulation of knob 24. As the different test patterns are selected the preset parameters are automatically read from memory to form the raster scan patterns.

Figure 2B:
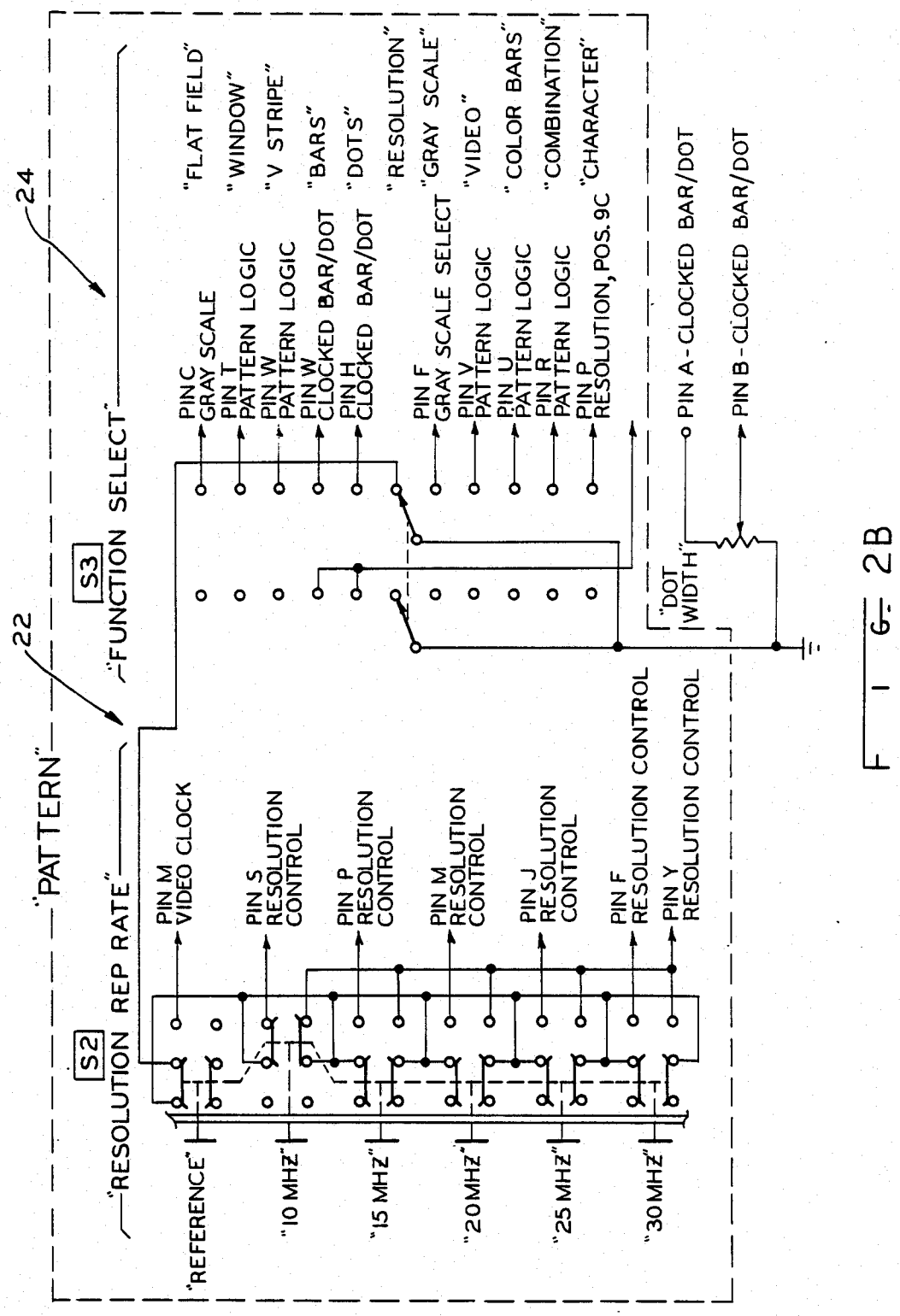
FIG. 2B is a schematic diagram of the pattern generator function switches including the resolution repetition rate switch and the pattern function select switch.

Referring now to FIG. 2B what is shown is a schematic diagram of the resolution repetition rate switch 22 and the pattern function select switch 24. It can be seen that the resolution repetition rate switch 22 provides different frequencies for different settings of the switch. Thus the frequencies 10 megahertz to 30 megahertz are provided in 5 megahertz steps.

Function select switch 24 provides an enabling input for the function select circuits by grounding the particular pin selected by the function switch. By grounding the pin a particular input for the selection will be enabled.

In the block diagram of the control system as shown in FIG. 1A the keypad 16 is shown diagrammatically along with the keypad display and RS232 interface 28. The RS232 interface provides communication to and from the keypad display 18. The display portion 18 comprises a fluorescent display with its own processor which converts the serial number information to character data for display on the display screen.

A bus 30 is provided for routing information between the keypad display 28 and a central processing unit (CPU) and program memory 32. The central processing unit comprises a standard MC68008 CPU chip. The program memory comprises an 8K by 8 random access memory (RAM) and a 16K by 8 erasable programmable read only memory EPROM as will be explained hereinafter. The central processing unit and program memory are connected by means of a sync generator bus 34 and a microprocessor control bus 36 to a horizontal generator section 38, a vertical generator section and electronical erasable program read only memory EEPROM storage unit 40 and a sync generator interface unit 42.

The sync generator interface unit 42 transmits data to a video development and output conditioning section 44 which in turns transmits information to a CRT display device 46.

Figure 1B:
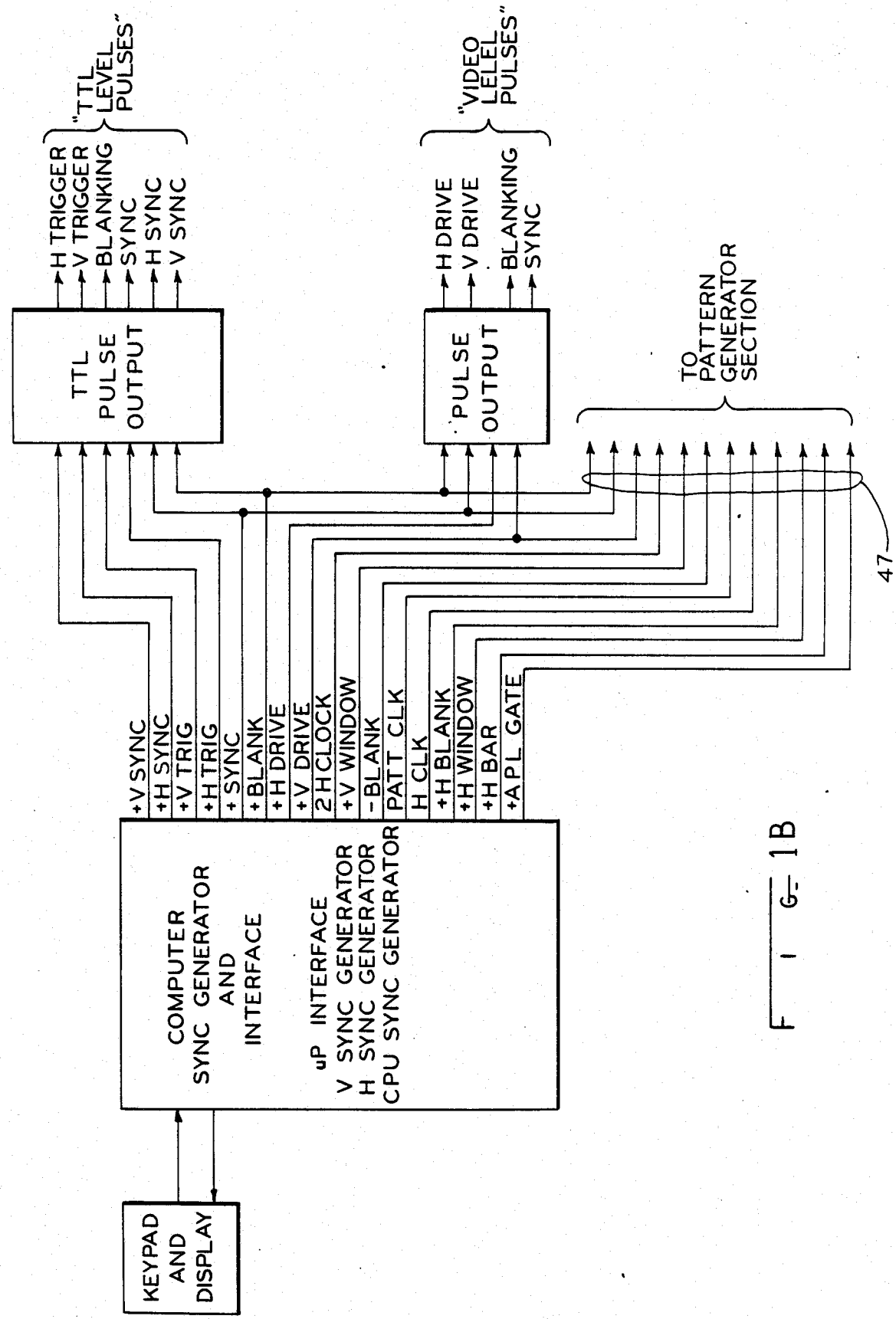
FIG. 1B is a simplified schematic block diagram of the pattern generator input circuitry.

Referring to FIG. 1B what is disclosed is a schematic diagram of the inputs to the pattern generator section. The computer sync generator and interface block comprises a combination of the CPU and program memory 32, horizontal generator section 38, vertical generator section and EEPROM storage 40 and sync generator interface 42. Outputs are provided to a pattern generator 43 on bus 47. By means of these inputs the pattern generator generates a video pattern which is routed by means of a bus 49 to a video development and output conditioning circuit 44. FIG. 1A shows how the pattern generator 43 is connected to the sync generator by means of bus 47 and to the pattern select switch 24. Additionally FIG. 1A shows how the pattern generator is connected by bus 49 to video development and output conditioning circuit 44.

Figure 3:
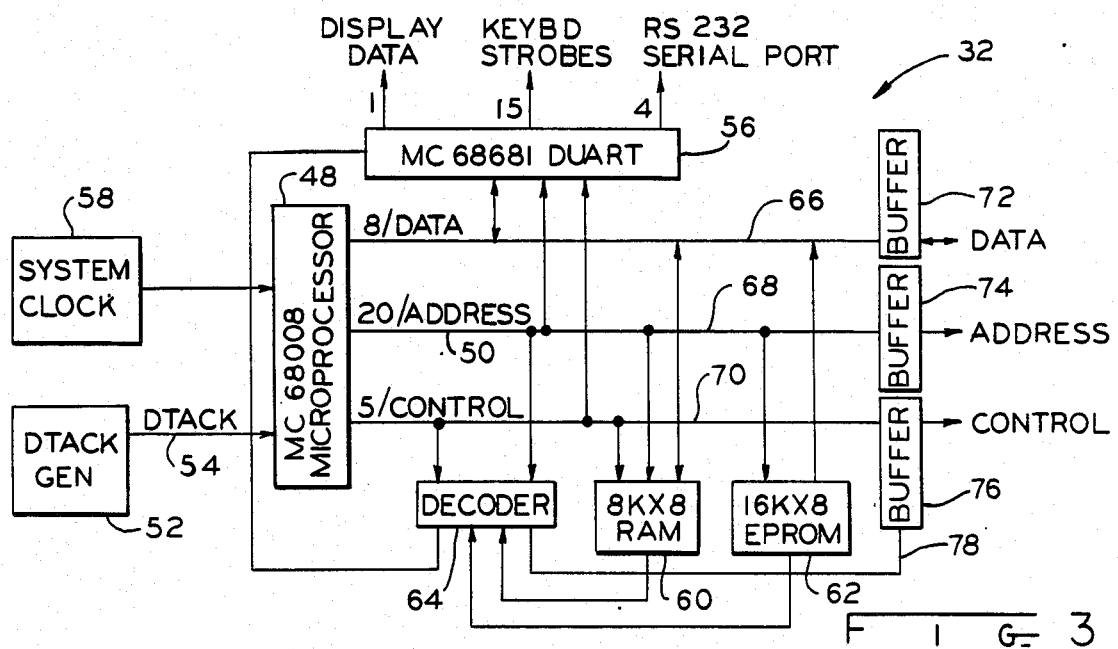
FIG. 3 is a simplified schematic block diagram of the central processing unit and program memory.

Referring now to FIG. 3 there is disclosed a more detailed schematic block diagram of the central processing unit (CPU) and program memory 32. The CPU 48 comprises a standard MC68008 circuit chip which controls the entire system based on a program stored in the memory 62. CPU 48 comprises a 32 bit CPU which transfers 8 bits of information at a time and covers an address space of 1 million bites on the twenty address lines indicated at 50. This CPU is of the asynchronous type and requires an acknowledge when the data is ready. This acknowledgement is provided by the data acknowledge generator (DTACK) 52 on a data acknowledge line 54.

A dual universal asynchronous receiver transmitter (DUART) circuit 56 is provided and comprises a standard MC68681 circuit chip for receiving and transmitting data from and to the display keypad unit 28 and the central processing unit 48. A system clock 58 is provided for controlling the CPU and delivers a 8 MHZ square wave input signal to the CPU.

Two memories are provided for providing information to the microprocessor, an 8K by 8 random access memory RAM and a 16K by 8 erasable programmable read only memory EPROM.

DUART 56 multiplexes the four columns and four rows of the keypad to determine if any keys have been depressed and, if this is found to be true it transmits the entered information in parallel to the microprocessor 48. Additionally, DUART 56 routes this information to the data display 28 for display on screen 18 and to RS232 port which is used to communicate with other peripheral equipment.

EPROM 62 comprises a standard HM27128 16k by 8 memory chip which contains the stored program for controlling the entire system. The CPU picks up the data out of the EPROM at the address it has selected, decodes the data and uses that as an instruction. RAM 60 comprises a standard HM6264 8k by 8 memory chip and contains only program variables, such as the formats. RAM 60 is therefore used in the sense of a scratch pad where the CPU stores all the data it is using. Decoder 64 is a bi-polar PROM which decodes the entire memory map and determines which unit CPU 48 is addressing. Since CPU 48 is asynchronous, when it writes an address it must receive a detect signal to proceed further. This is done by means of the system clock 58 which is used to time the responses of the microprocessor. Thus clock 58 enables the system to adjust to the speed variations between different parts of the system.

The data on bus 66, the address on bus 68 and the control signals on bus 70 are routed through buffers 72, 74, and 76 respectively prior to routing them to other circuit elements, whereby the microprocessor does not have to directly drive those other elements. The buffers are tristated and are enabled until the microprocessor attempts to communicate with elements other than its own circuit board.

Figures 4, 8, 9:
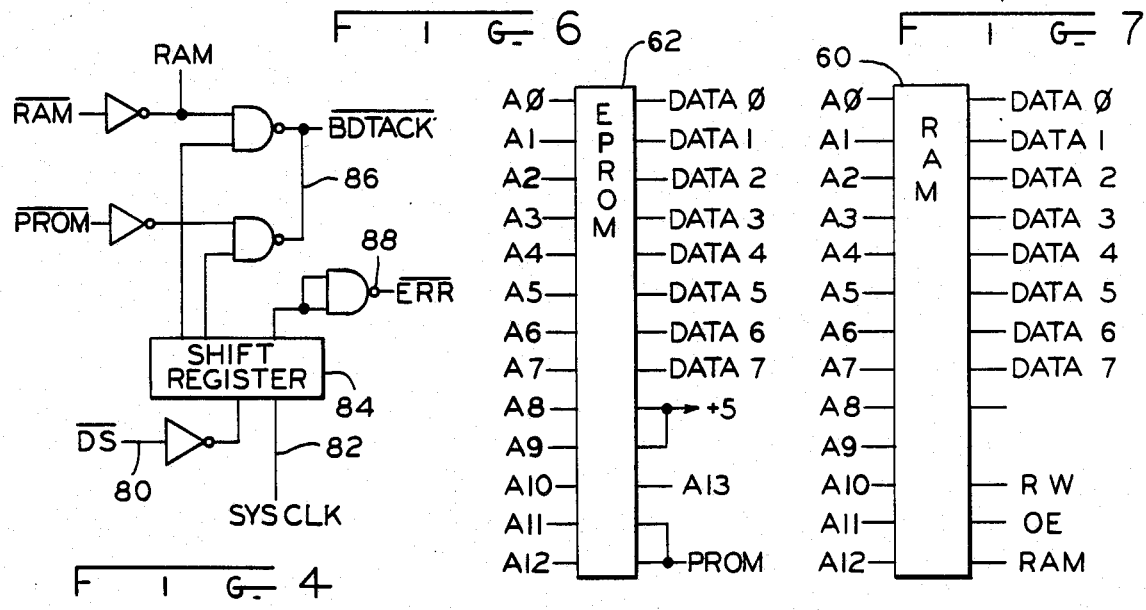
FIG. 4 is a block diagram of the data acknowledge generator.
FIG. 8 is a block diagram of the random access memory.
FIG. 9 is a block diagram of the erasable programmable read only memory.

Turning now to FIG. 4 what is shown is the data acknowledge generator 52 or DTACK circuit in greater detail. This circuit includes a shift register 84 comprising a standard 74LS164 circuit chip which receives input from data strobe line 80 and clock line 82. Thus if valid data is received on line 80 this information is delayed by means of a signal from system clock 58 via line 82 and shift register 84. If either of RAM 60 or EPROM 62 have been selected the output on DTACK output line 86 will go low. Since EPROM 62 takes longer to respond than the RAM 60 the output on line 86 can be delayed by means of the clock signal on 82. If no signal is detected from RAM 60 or EPROM 62 within 8 clock periods an error output is generated on error output 88 which is fed to the microprocessor and causes a message to be displayed on display screen 18 indicating an error and stopping the machine.

Figure 5:
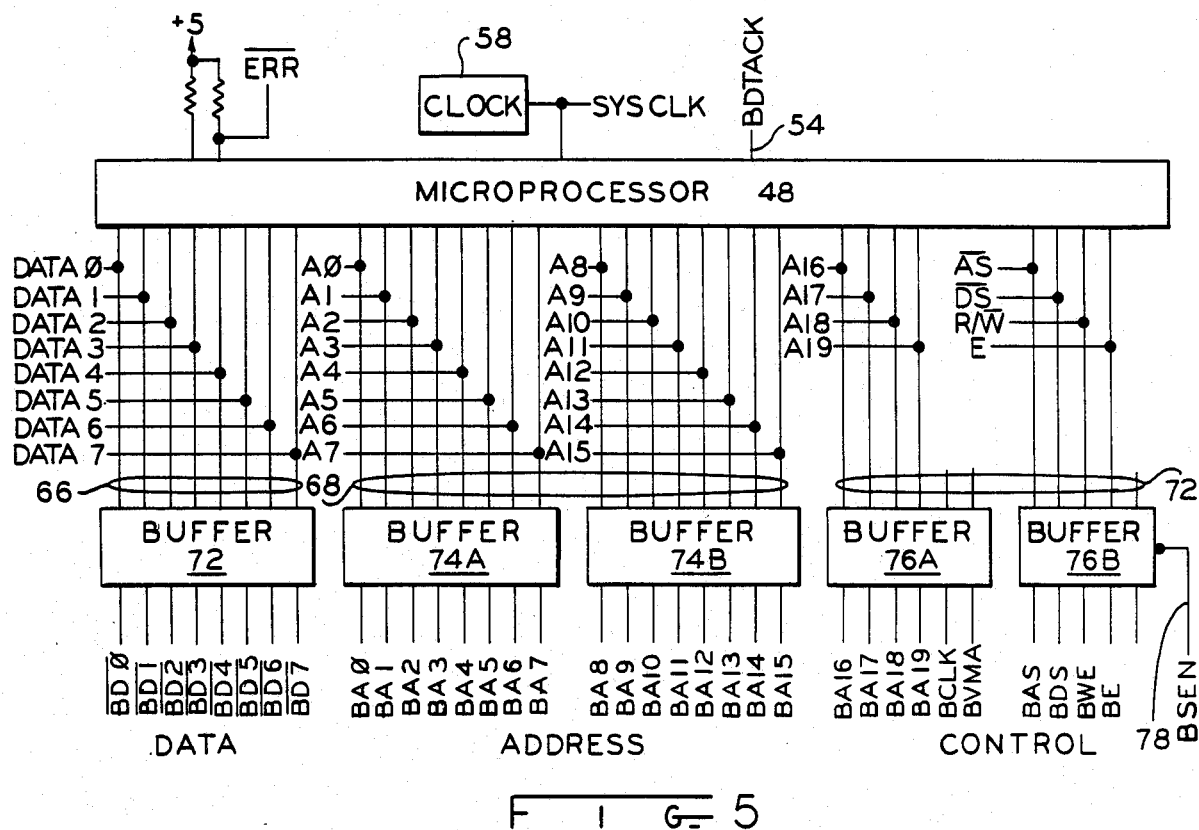
FIG. 5 is a block diagram of the microprocessor and associated buffers.

FIG. 5 discloses the microprocessor, clock and buffer circuit in more detail. Microprocessor 48 is 32 bits wide and is connected to data bus 66, address bus 68 and control bus 72, which are respectively connected to buffers 72, 74a, 74b, 76a and 76b. Buffer 72 is a standard 74LS640 circuit chip; buffers 74a and 74b are standard 74LS541 circuit chips; and buffers 76a and 76b are standard 74LS367 circuit chips. The outputs of the buffers are indicated of addresses having the prefix "b" for buffer. System clock 58 is again shown as well as a bussed data acknowledge input 54. Decoder 64 enables line 78 which is shown connected to buffer 76. The buffers are used since CPU 48 cannot drive a bus as explained herein above.

Referring further to FIG. 5 it can be seen that eight data lines are connected to CPU 48. The data lines d0-d7 are bidirectional while the address lines 68 and 72 are unidirectional. Thus the data can be either inputs to or outputs from CPU 48, depending on whether the CPU is reading or writing. If the CPU is writing the data outputs are routed through buffer 72 so that a number of circuits can be driven. Direction of data flow is controlled by address line BWE. The data which are provided as inputs to microprocessor 48 are binary values read from program memory. Data is also provided from the keyboard through the DUART 56. There are 20 address lines to cover 1 megabyte of memory. The lines are unidirectional and become valid after a predetermined delay time such as for instance 80 nanoseconds. By selecting an address a part of the system is enabled which is either read from or written to.

Figure 6:
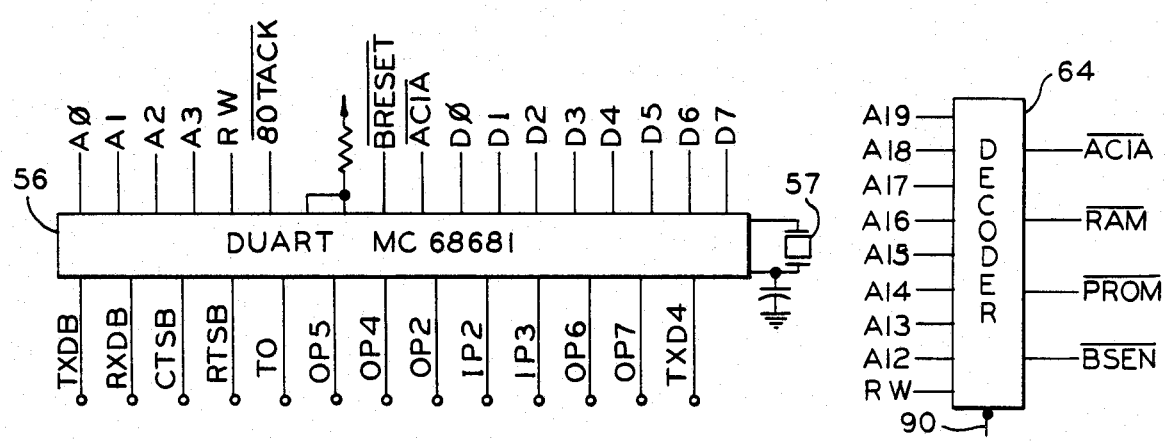
FIG. 6 is a block diagram of the dual universal asynchronous receiver transmitter circuit.

Referring now to FIG. 6 the DUART or dual universal asynchronous receiver transmitter circuit 56 is shown which comprises a standard integrated circuit chip MC68681. The DUART is effectively two serial ports with digital inputs and outputs. It contains 16 registers and the frequency at which the bits are sent to and received by DUART 56 is controllable. This rate is called the "baud" rate. Crystal 57 runs the baud rate clock and the clock rate is typically 1200 HZ. The DUART converts parallel data into serial data and serial data into parallel data at the rate established by the baud rate clock whereby the data can be converted from the parallel format to the serial format and visa versa. The DUART is divided into two sides with one side connected to four address lines and eight data lines. The other side of the DUART is connected to the RS232 serial port by means of 4 lines TXD, RXD, CTS, and RTS. Additionally, this half of the DUART is connected to seven keypad inputs as indicated.

Figure 7:
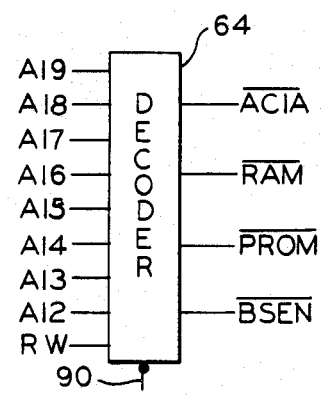
FIG. 7 is a block diagram of the decoder.

Referring now to FIG. 7 what is disclosed is decoder 64 which comprises a standard circuit chip of the type 74LS571. The decoder comprises a bi-polar PROM which decodes the entire memory map. When the address strobe 90 to the decoder is activated the inputs on address input line A12-A19 cause a section of the memory map to be enabled by one of the four outputs.

FIG. 8 shows RAM 60 which comprises a static RAM circuit chip of the type HM6264. This RAM is a static 8k by 8 RAM having a 65,000 bit capacity which is used by the CPU to store data and formats. It is basically a scratch pad for storing the temporary format values.

FIG. 9 discloses EPROM 62 comprising an integrated circuit chip of the type HM27128. This is an erasable programmable read only memory of the 16k by 8 type. It contains the program for controlling the entire system. It also contains messages and the like which are used in the display during operation of the system. The CPU picks up data out of the EPROM 62 at the address it has selected by means of decoder 64 decodes that data, and uses the data as an instruction.

Figure 10:
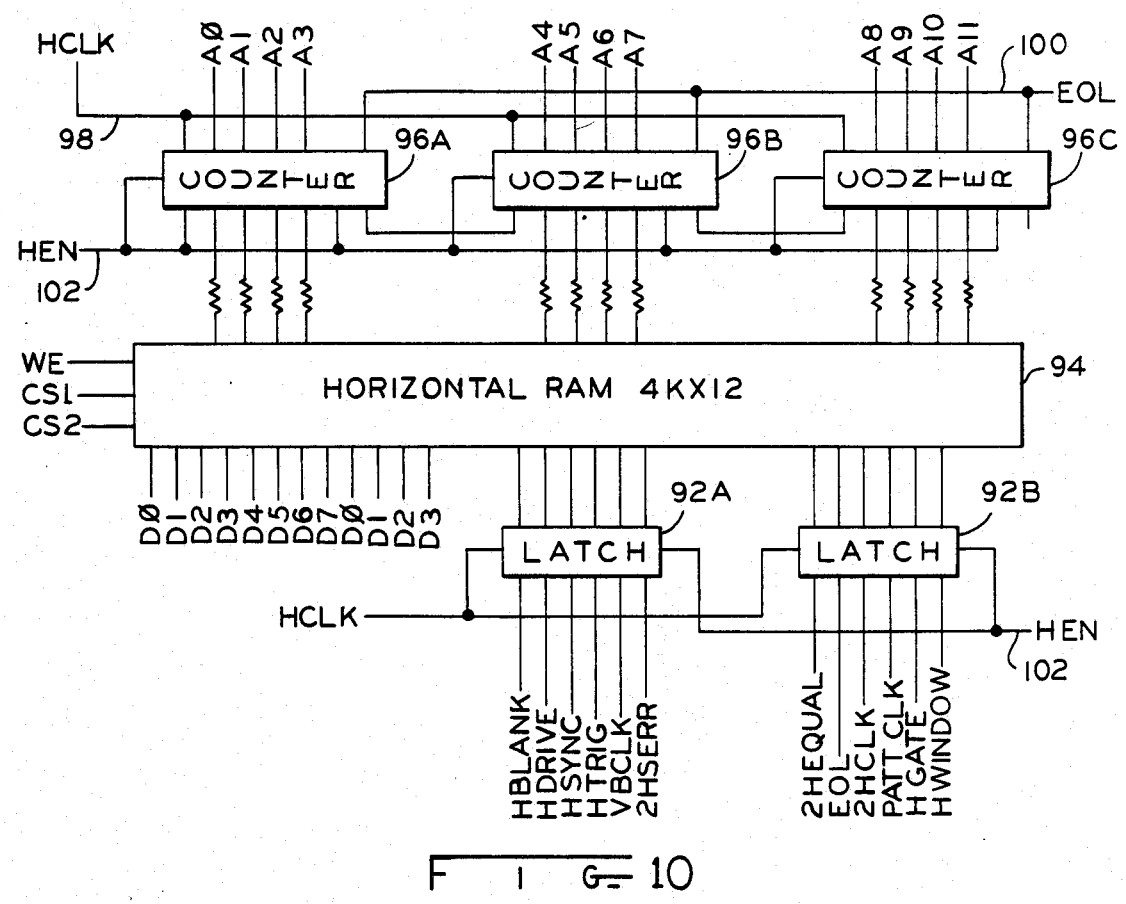
FIG. 10 is a block diagram of the horizontal sync generator.
Figure 14:
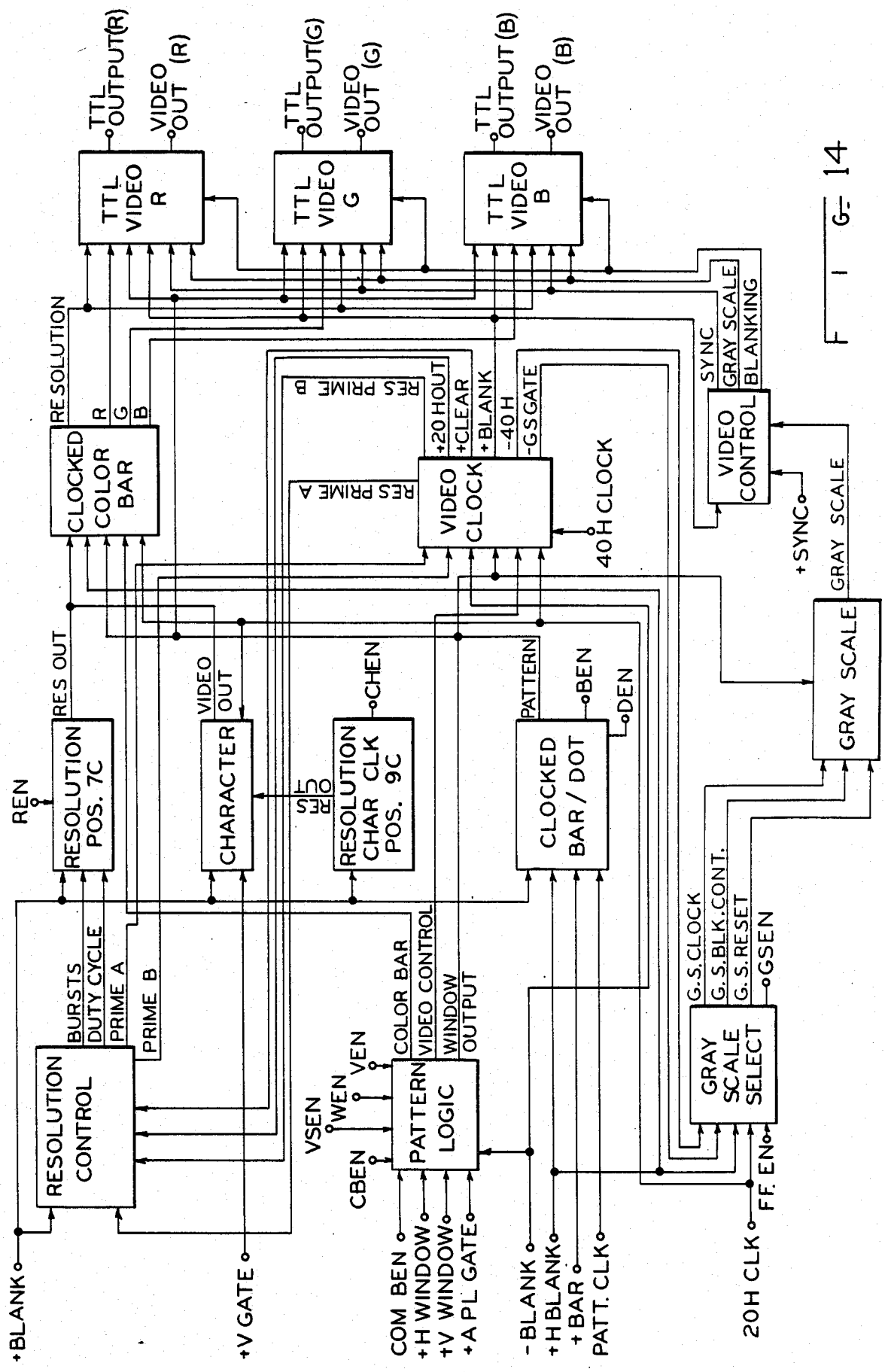
FIG. 14 is a block diagram of the pattern generator section.
Figures 24, 25, 26:
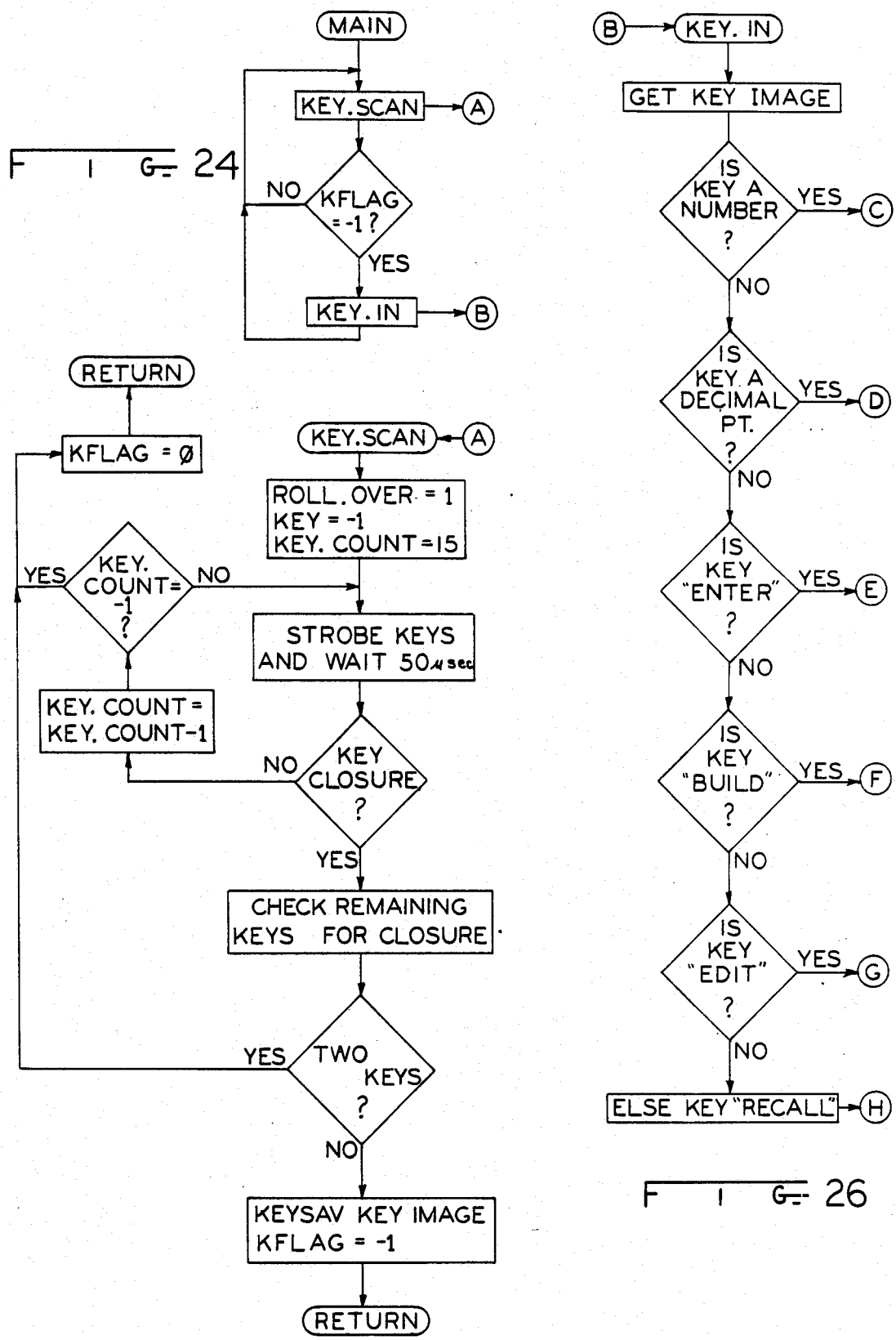
Figure 27:
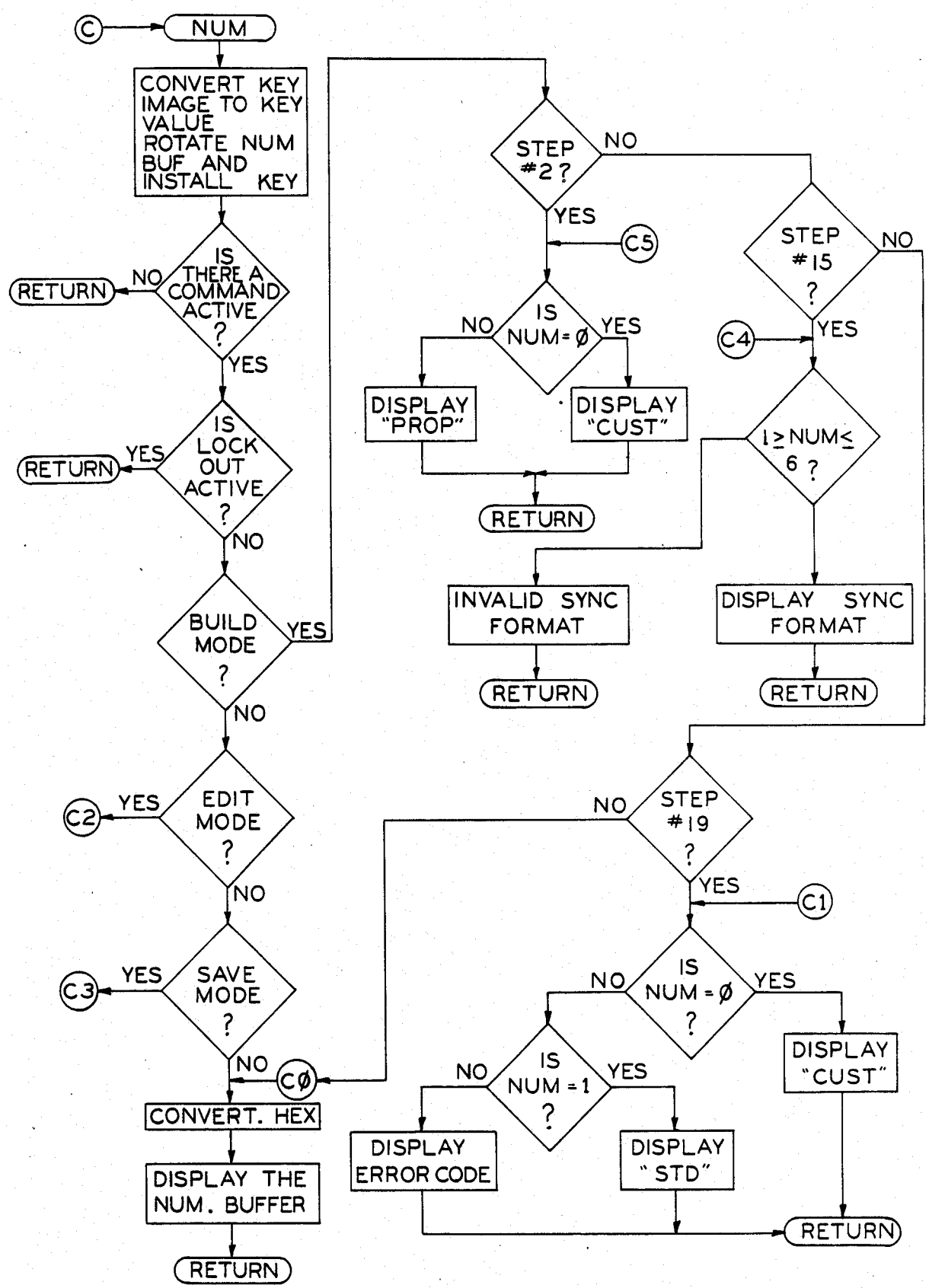
Figure 29:
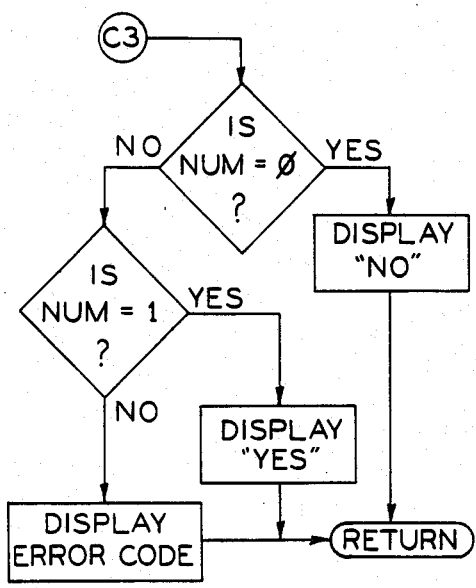
Figure 30:
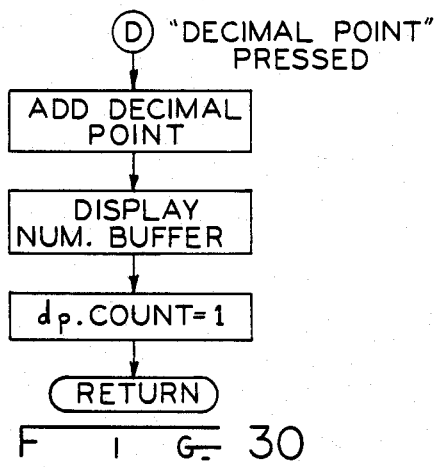
Figure 28:
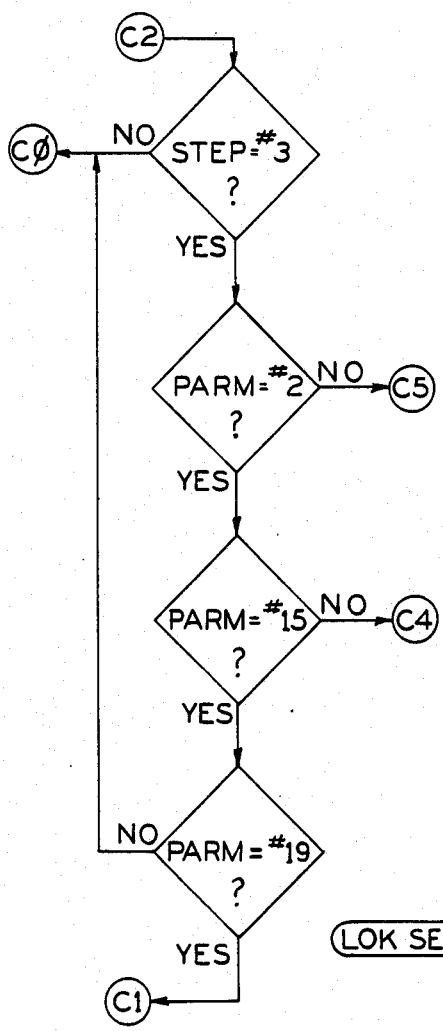
Figure 31:
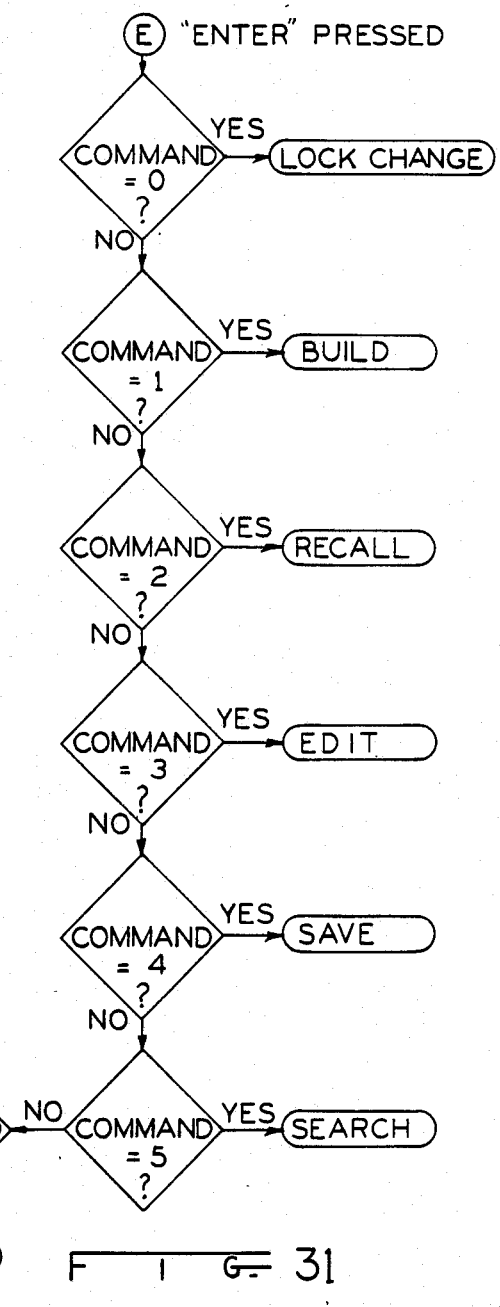
Figure 32:
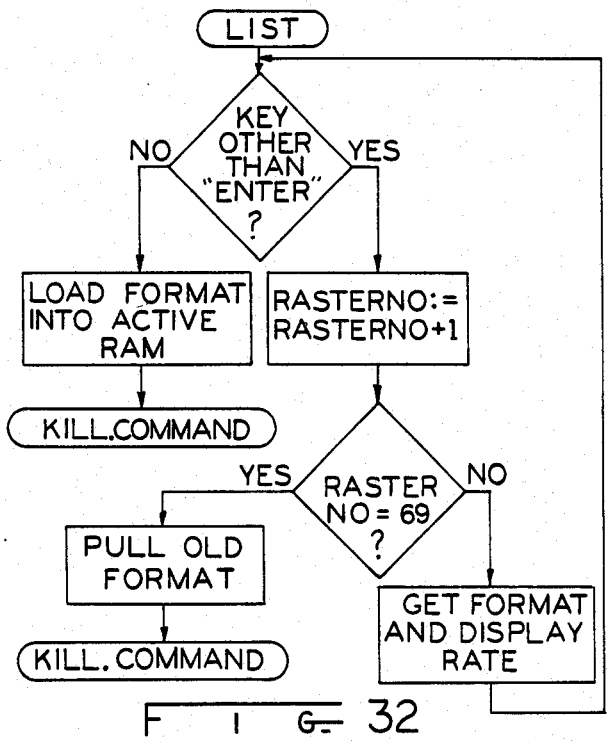
Figure 41:
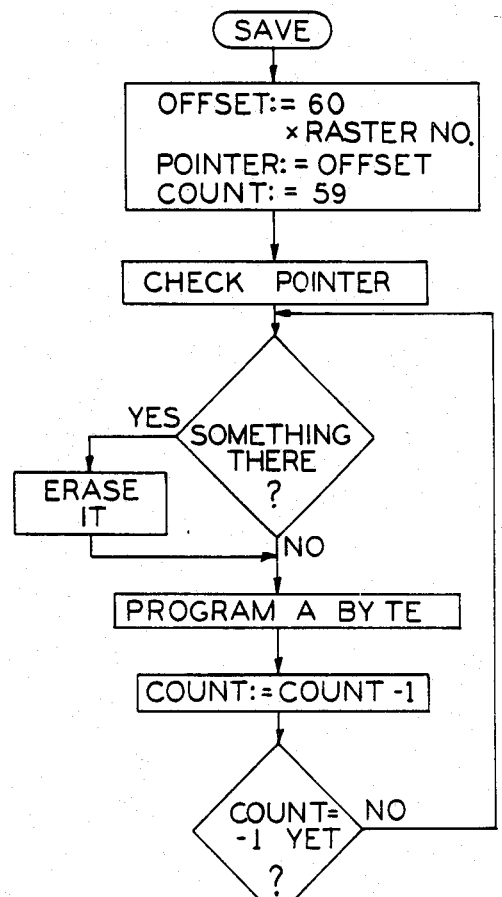
Figure 42:
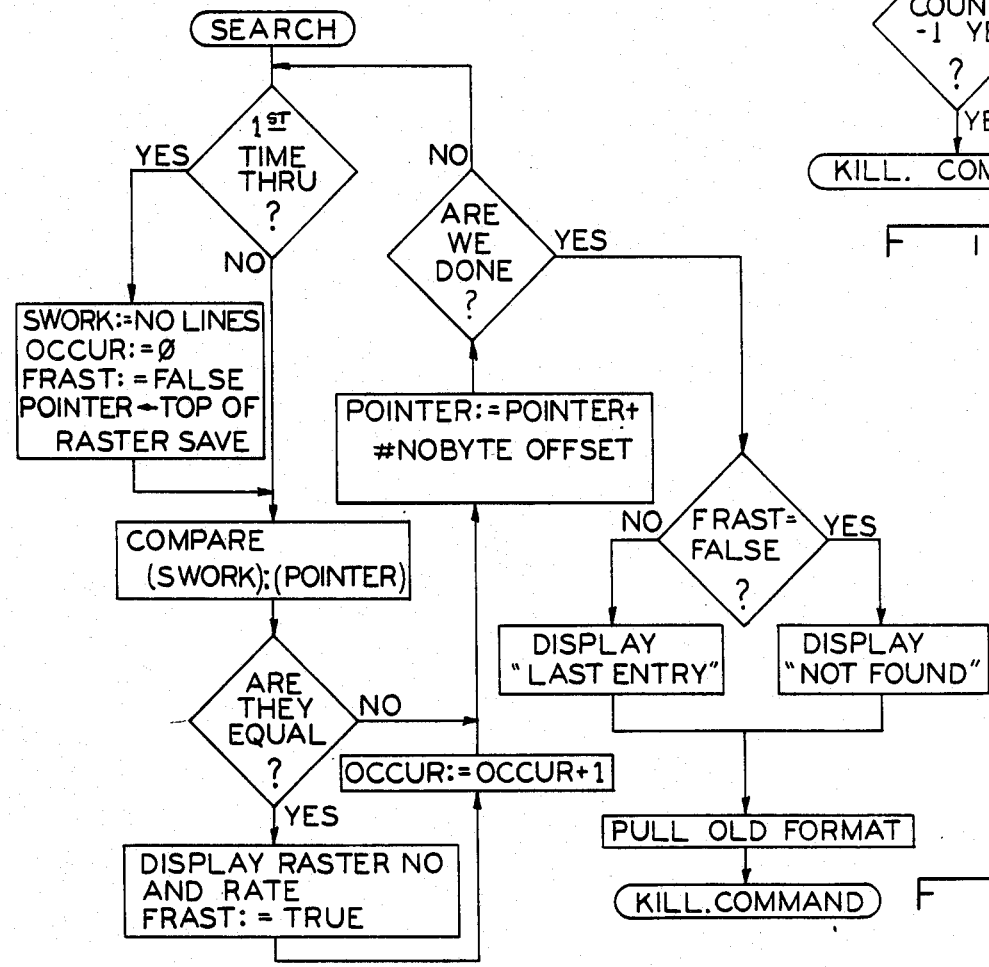
Figure 34:
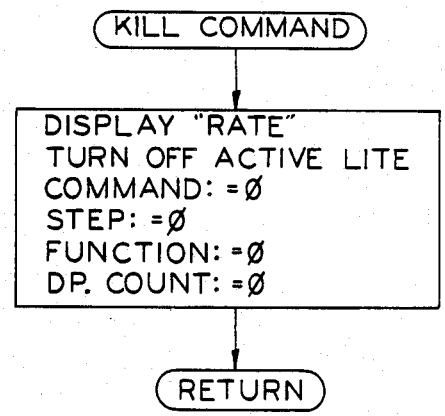
Figure 35:
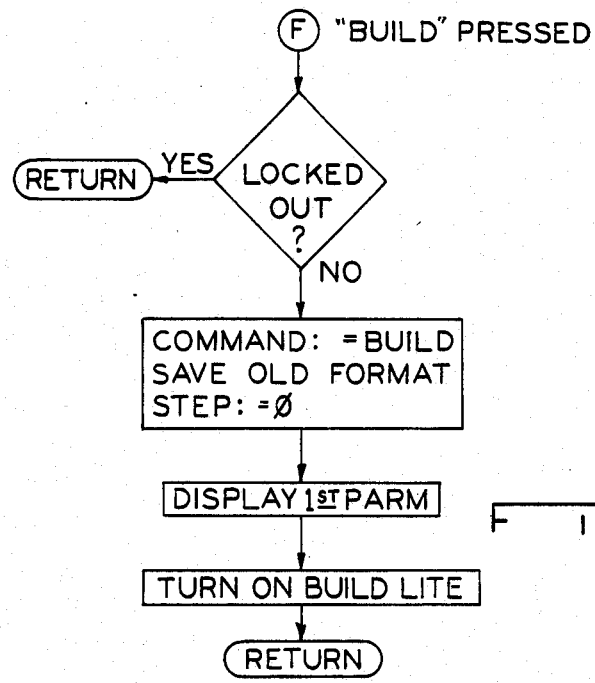
Figure 36:
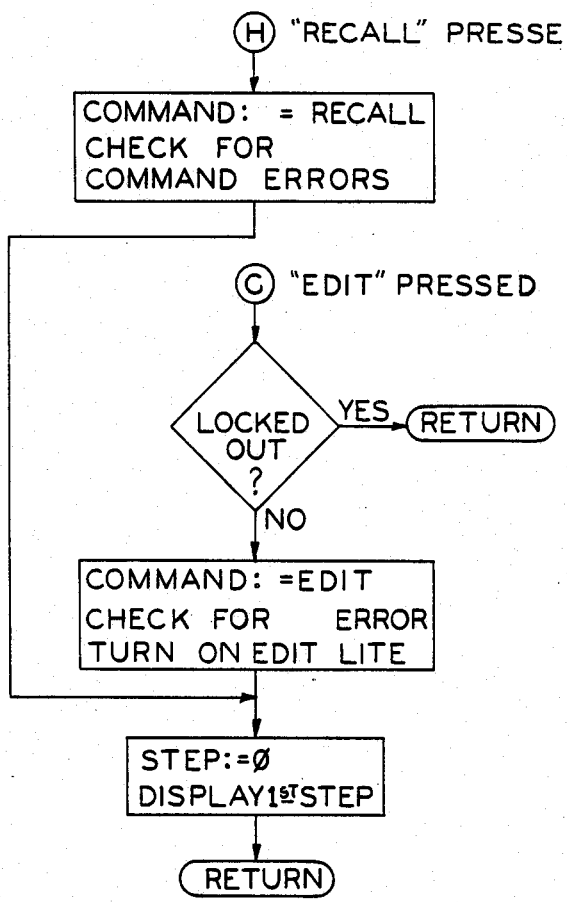
Figure 38:
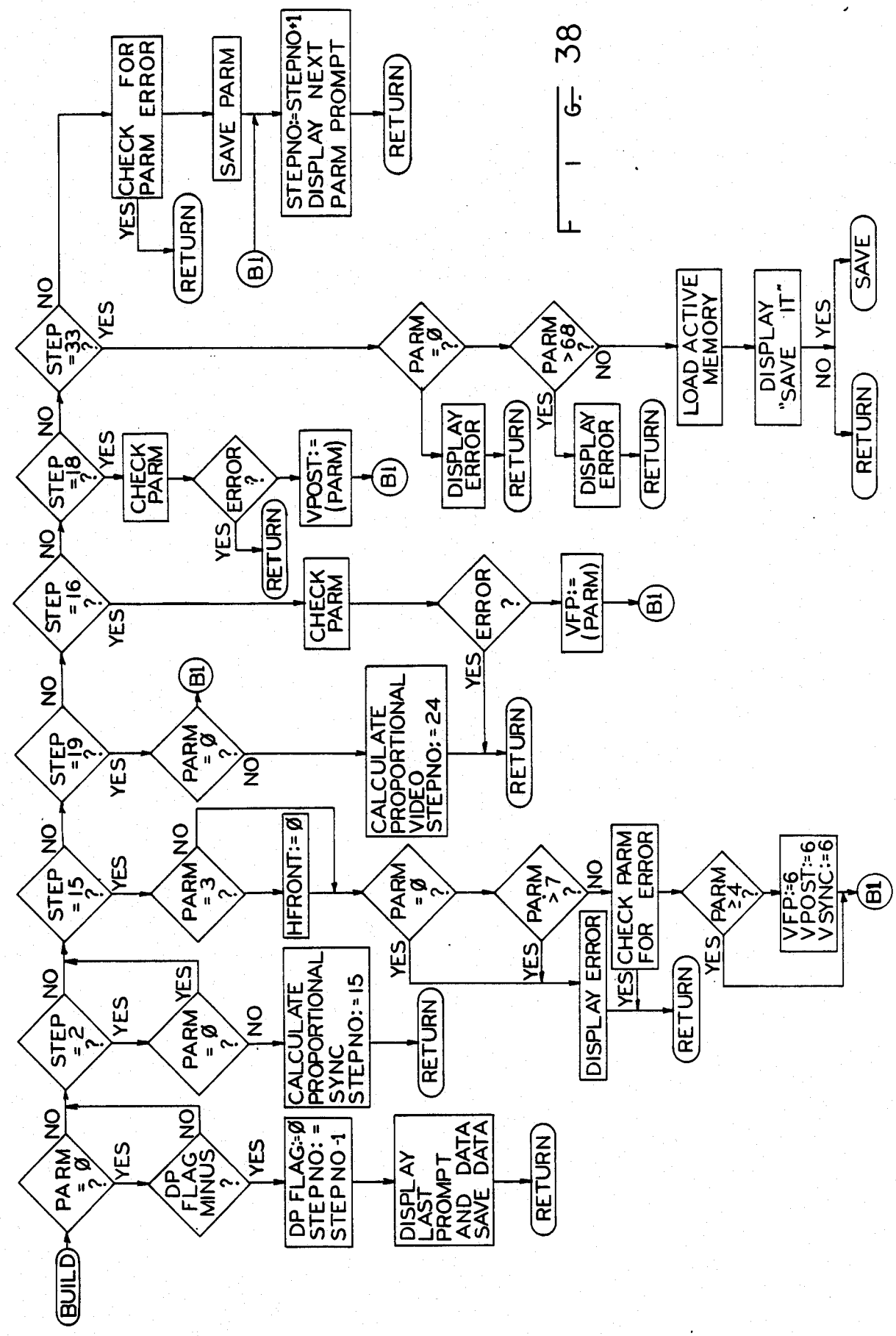
Figure 40:
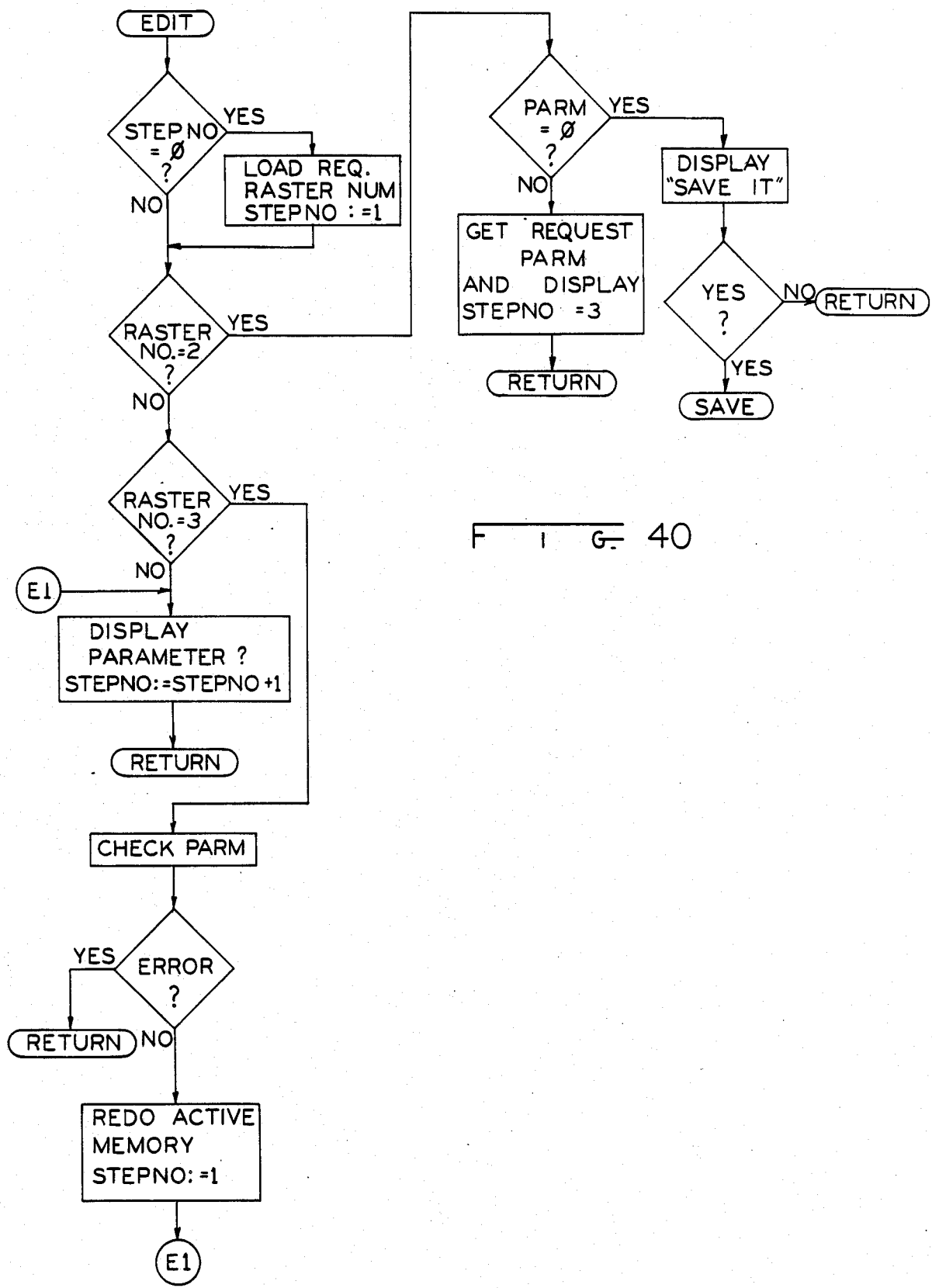

FIG. 10 discloses a detailed schematic block diagram of the horizontal sync generator. The purpose of the horizontal sync generator circuit is to develop the scan rate information required on a horizontal line for scanning the CRT being tested. The information on the horizontal line comprises video and synchronizing pulses. The horizontal clock produces pulses at 20 MHZ for pulse durations of 50 nanoseconds. As the pulses are counted by the counters 96a, 96b, and 96c, the counts select the locations in horizontal RAM 94 that CPU 48 has written to.

The horizontal RAM 94 comprises twelve 4K by 1 high speed static RAMS. Each static RAM represents one specific output provided by the horizontal sync generator. The 9 horizontal parameters provided by the horizontal output are total horizontal line time, horizontal blanking, horizontal front porch, horizontal sync, 2H serration pulses, 2H equalizing pulses, horizontal drive, horizontal trigger phase and horizontal trigger width. These are also the horizontal parameters which the operator can enter into the keypad to build up the rate. The horizontal front porch parameter is used to develop horizontal sync pulses, and the horizontal trigger phase and width are used to develop horizontal trigger pulses. The parameter input to the horizontal RAM are provided on the twelve date lines d0-d3.

The CPU will run through the seven date lines d0-d7 and then starts over again and runs through lines d0-d3. Thus by loading into RAM 94 the data on the data input lines in 50 nanosecond increments the entire horizontal line can be configured. The data is put into the horizontal RAM in parallel but the information comes out of the horizontal RAM in serial bits. The CPU moves all of the separate pulses into the memory then allows the counters to start at the time base rate of 20 megahertz as it counts from 0 until the counters hit the end of line signal which signifies that the count over.

Counters 96a, 96b, and 96c are standard integrated circuit chips of the type 74F163. Latches 92a and 92b which buffer the outputs from the RAM are standard integrated circuit chips of the type 74F374 and comprise edge-triggered flip-flops. The horizontal clock clocks counters 96a, 96b, and 96c at the 20 Mhz rate so that the RAM has 50 nanoseconds to find the address being addressed and to get the information to the latches before the next pulse comes along. Counters 96a, 96b, and 96care enabled by means of the HEN or horizontal enable line. The HEN signal is provided from a vertical port. Some of the outputs from the latches go to the sync generator circuit and some of the outputs go to the vertical generator section to make up composite pulses.

Referring now to FIG. 11 what is disclosed is the program array logic 104 (PAL) for the horizontal sync generator and comprising a standard microcircuit chip 104 of the type 16R4. Circuit 104 comprises a logic array and four uncommitted flip flops configured as a shift register. The PAL logic array includes a 4 bit shift register which is used to move the write pulse down somewhat from edge to edge so that it is in the center of the select pulse and furthermore generates the chip select signals on lines CS1 and CS2 as indicated. The purpose for the shift register is to match the speed of the RAM 60 to the speed of the CPU 48. A Boolean equation is provided for the operation of the PAL circuit as follows:

```
HREG = SEL + /A13 + DS
LADR:= /SEL * /A13 * /HEN * /RD * /DS
CSA:= /LADR * CSA * HWE * CSB * /DS
HWE:= /CSA * HWE * CSB * /DS
CSB:= /HWE * CSB * /DS +
      /CSB * /DS
CS1= /A12 * /CSA +
     /A12 * /HWE +
     /A12 * /CSB * /DS +
     HEN
CS2= A12 * /CSA
     A12 * /HWE
     A12 * /CSB * /DS +
     HEN
DTAK= HREG * /SEL +
      /CSB * /DS
```

Referring now to FIG. 12 what is disclosed is the horizontal clock which provides the 50 nanosecond time base. Either an external or an internal time base can be provided for generating inputs to a select circuit 106. The reason for using an external clock is that it may be desired to have greater resolution than the 50 nanoseconds provided by the internal clock. If for instance it were denied to generate a pixel based line, an external clock input would be provided through buffer 108. The frequency for the external clock would have to be provided to make the pulses generated come out to exactly the desired number.

By referring to FIG. 13 an illustration of a pixel based clock is shown. A voltage controlled pixel clock oscillator 110 is provided which is controlled by means of a control voltage provided by microprocessor 48 from input control line 112. The pixel clock can also be used to generate a character display by having an output of the oscillator connected to character logic and from there to the video processor.

Referring now to FIG. 15 what is disclosed is a vertical sync generator which operates in much the same way as the horizontal sync generator except that it counts in half lines instead of clock increments. RAM 114 comprises (3) three standard 4k by 12 RAM integrated circuits of the type IMS1420. This circuit is made up of three 4k by 4 static RAMS. A vertical clock input is provided on line 116 and a vertical enable signal is provided on line 118. A common input output line is provided for the data which is isolated by means of buffers 120a and 120b. These buffers may be standard circuit chips of the type 74LS367. The buffers are actuated by means of enable lines EN3 and EN4 as indicated. Latches 122a and 122b are latched to the leading edge of the 2H clock and are enabled by the VEN not line. The latches are standard circuit chips of the type 74LS374. Address latches are provided at 124a, 124b, and 124c and these may be integrated circuits of the type 74LS163. The latches operate as a counter chain in similar fashion to the horizontal sync generator. The data inputs are provided on the lines which are fed to latches 120a and 120b to provide vertical parameter information on the vertical trigger phase and width, vertical front porch, vertical blanking, vertical sync, number of scan lines in two fields, V drive and sync format. For different types of modes such as the broadcast mode the vertical is delayed with the front porch and this can be accomplished by means of the 2H clock.

Referring now to FIG. 18 what is provided is the circuitry to produce the enable signals EN3 and EN4 for the vertical sync generator. Signals on lines CS3 and CS4 are provided to gates 126A and 126B together with the vertical enable signal. The logic provides the enable signal to indicate which side of buffers 120a and 120b of the vertical generator is being written to. Or gates 126a, and 126b may be integrated circuits of the type 74LS32.

Referring now to FIGS. 16 and 17 what is provided is the program array logic. FIG. 16 shows the PAL for providing the composite sync pulses and FIG. 17 shows the PAL for developing the controls for the counter, the EPROM and the parallel port as well as the RAM location being written to in blocks of 4k. The PALS are circuit chips of the type 16L8 and operate according to Boolean equations.

The vertical PAL sync generator of FIG. 16 is programmed with the following equation:

```
E02F= /EOF
VSYNC= /VSY
BL= /HBL + /VBL
SYNK= LIN3 * VSY * /HSY * /FC0 * FC1 +
      1VSY * /FC0
SYNC= /LIN9 * VSY * /EQU * /FC0 * /FC1 +
      /LIN9 * /VSY * SER * / FC0 * /FCI +
      /LIN9 * /HSY * /FC0 * /FC1 +
      /VSY * FC0 * /FC1 +
      VSY * /HSY * FC0 * /FC1 +
      /SYNK
```

The vertical PAL sync generator of FIG. 17 is programmed with the following equation:

```
CS1= /SEL * /A13 * /A12 * /VEN * /RD +
     VEN
CS2= /SEL * /A13 * A12 * /VEN * /RD
SREG= /SEL * A13 * /A12 * /RD * /DS
VWE= /SEL * /A13 * /RD */DS * /VEN
ERRM= /SEL * A13 * A12 * RST
VCLK= /VEN * SCLK +
      VEN * /2HC
LADR= /VEN * /A13 * /SEL /RD
TDAK= /SEL * /A13 * /DS * /RD * /VEN +
      /SEL * A13 * /A12 * /RD * /DS +
```
-continued
```
/SEL * A13 * A12 * RST * /DS
```

Referring now to FIG. 19 what is disclosed is a parallel interface timer 128 or PIT. It is used for two things namely to control the horizontal and vertical sync generators and to enable or disable EEPROM 130. The PIT includes 32 registers. CPU 48 controls all of the inputs and outputs to the PIT. CPU 48 can not write to the horizontal or vertical sync generators while CPU 48 is running because the counters would be at the wrong address. The horizontal and vertical sync generators must be turned on and off to allow CPU 48 to send new data to the sync generators to set up the new parameters for the next line, or frame. PIT 128 also generates the function codes for the PAL'S to enable the preparation of custom composite wave forms controlled by EEPROM 131. When a mode is selected such as Industrial, Military, Custom, etc., an output is generated by the PIT to tell the PAL what sync format to put out.

It can be seen that the horizontal and vertical enable lines for stopping and starting the counters of the horizontal and vertical synchronizing circuits are connected to the pit. The EPEN line is used for enabling the EEPROM 130 and prevents the CPU from accidentally writing in to EEPROM 130 without proper enablement.

FIG. 20 shows the electronically erasable programmable read only memory 130 or EEPROM 130. This circuit stores raster formats and parameters and permits the change of parameters when in the edit mode. It is also possible to lock the EEPROM so that changes to the stored values in the EEPROM cannot be made. Lockout can be provided by requiring a security password to be entered before the edit function can be used. EEPROM must be addressed with an access code in the same way as a static RAM or EPROM.

It is important that the format storage devices can be locked out so that the operator can not change the parameters of the test equipment. The lock out feature allows only recall of parameters but will not allow editing or changing of the parameters.

FIG. 21 shows an additional EEPROM 131 which operates in the same way as EEPROM 130 of FIG. 20. EEPROMS 130 and 131 are standard microcircuits of the type 52B13.

FIGS. 22 and 23 show a write control and chip select control respectively and develop enablement signals on lines EWE and EPR. The EWE signal permits the CPU to write to location while the CPU output is low.

In operation the system may be either user programmed or the internal central processor will automatically calculate the proportional format for the operator's frame and line time requirements as input into the keypad.

If no instructions are provided or the system is switched on and off as for instance by a power failure the system is automatically set up for a "default" proportional 525 lines/60 fields per second format. This prevents damage to a CRT unit being tested.

By using the recall, edit or build modes the operator may develop any format needed within the limits 100 to 2,048 lines in two fields and 10 microseconds to 204 microseconds per horizontal line. Additionally, a number of formats can be stored, the number depending upon the amount of memory available. Therefore a fixed format can be automatically selected or a new format can be built from scratch.

To build a format each parameter can be individually defined or automatically calculated depending upon the initial answers given to the prompted questions posed by the system. Thus the following user parameter entries can be provided.

number of H lines in two fields
    horizontal line time
    proportional or custom rate
    horizontal Blanking
    horizontal front porch
    horizontal sync
    2H serration
    2H equalization
    horizontal drive
    horizontal trigger phase
    horizontal trigger width
    vertical Blanking
    vertical drive
    vertical trigger phase
    vertical trigger width
    sync format The built up format can either be saved or maybe deleted after use by entering a code number in the keypad.

An existing format may also be edited or modified to fit new specifications. A parameter is requested and the current value along with the parameter name is displayed on the keypad display 18. If it is decided not to change the displayed parameter value, the existing value must be reentered. This is a two step sequence. First of all the system will ask for the parameter code number and then when the name and the current value is displayed the desired new or existing value must be entered. This sequence can be repeated as many times as necessary for any or all of the parameters. If a format has been built or edited the format may be saved by entering a code number into the keypad and also by pushing the "Raster Store" control button 20.

The system also includes means for detecting errors and for displaying errors on the keypad display. If a catastrophic error is encountered the keypad display will show this by displaying that the error has occurred.

The detailed operation of the system is as follows and as disclosed in the system flow charts shown in FIGS. 24-42. When it is desired to recall a rate previously stored, power is applied to the instrument and the 525/60 proportional scan rate broadcast format, will automatically appear. This initial default rate is permanently programmed and cannot be altered. The instrument will return to this default rate whenever power is interrupted. Signals at this rate automatically appear at the output connectors. The operator presses the recall control button and then enters the raster index number desired after looking the raster number up in the raster log index. After the raster number is entered on the keypad the display will show the scan rate, access code number, scan lines in two fields, and vertical rate.

If it is desired to search for a rate previously stored, the operator can survey all the rasters which may be in storage for any particular number of scan lines in two fields. For instance, there could be stored 875/60 Broadcast format, 875/60 Industrial format, 875/50, and 875/37.6. The operator can inspect each one of these formats to verify the raster log listing as follows. The recall control button would be depressed and the raster index number together with the number of scan lines in two fields would be entered. The display will now show the scan rate access code number, the scan lines in two fields and the vertical rate. However, if this rate is not in storage the display will indicate this and the sequence will end. If the display shows that the scanned rate is in storage and then wishes to search for another rate he presses the number of lines in two fields for the new rate into the keypad. If no additional entries are available at that rate the display will indicate this. If the operator, after finding a particular scan rate, wishes to use the rate the operator will press the enter button after which the scan rate display is activated and the sequence will end.

If it is desired to examine or modify the parameters in a scan rate previously stored, the operator, after applying power to the instrument and entering the security password, enters the EDT control letters after which the keyboard display will call for a raster number which the operator will then enter. The keyboard display will then call for a parameter. The operator must then enter the code number for a parameter to be examined. At this point the operator decides whether revision is required, and enters the desired revision or decides that no revision is desired and enters the code for the next parameter to be examined. If, after a parameter is called for the operator wishes to end the editing mode he enters a code into the keypad and then decides whether to save the edited format or to discard it and use it temporarily. If he decides to discard the format he enters a code into the keyboard whereupon the display will show the scan rate access code number, the number of scan lines in two fields and the vertical rate. The operator may use the modified rate temporarily but since it is not stored, it will be erased when another sequence is initiated. Alternatively, if the same code is entered into the keyboard the display will call for an overwrite and the operator can then decide whether to do so or not. At this point the operator can still decide to use the rate temporarily and then to have it erased or can overwrite the scan rate previously stored and end the sequence.

If it is desired to review all rates in storage the operator enters the scan rate access code number. The display will show the scan rate access code number, the number of scan lines in two fields and the vertical rate. Alternatively, the display will indicate that no rate is stored in that position. By continuing to enter new access codes the entire sequence of stored rates can be reviewed.

If it is desired to build a completely new scan rate, power is applied to the instrument, a security password is entered and the proper code is entered. The display will then call for the desired number of lines horizontal line time in increments of 0.1 microseconds which must then be entered. The operator must then choose whether he wishes to build a proportional or a custom scan rate. If a proportional or standard rate is to be built the proper code is entered and the rate is automatically built and the sync format is displayed. If a custom rate is to be built all of the custom parameters should be entered as they are called for on the display, such as horizontal Blanking width, horizontal front porch width, horizontal sync width, etc. At the end of this procedure the sync format is displayed. After the sync format is displayed for either the proportional or custom rate the display calls for the horizontal pattern whereupon the operator selects the custom or standard rate. Additional parameters must be entered for the custom rate as called for. However, if a standard rate is desired the system automatically supplies the parameters and calls for the horizontal bar position information. To finish building the rate for both the custom and the standard rate several other parameters must be entered such as the horizontal bar position, the horizontal bar spacing, the vertical window start, the vertical window stop, and the raster number. After all these parameters have been entered a decision must be made to save the new scan rate or to discard it. If it is to be discarded the rate may be used temporarily as displayed but it will be erased when another sequence is initiated. If it is desired to save the rate a save code is entered in the keypad and the new scan rate is then stored after the raster store button is depressed.

Further details for the operation of the system can be seen in the flow charts of FIGS. 24–42.

The complete source program for the microprocessor circuit is attached to the specification as appendix "A" from which details of the computational programming will be apparent to those skilled in the art.

Attached to the specification is an appendix "B" which comprises a publication entitled "Vii Raster Master Keyboard Entry Programmable Sync Generator". This publication was prepared and published by Visual Information Institute, Inc. of Xenia, Ohio and is incorporated herein by reference. This publication discloses in detail the operation procedure for the television video pattern generator system disclosed in the instant application.

Also, enclosed herewith as appendix "C" is a publication entitled "Vii Product Information Model 2501 Television Test Pattern Generator". This publication was prepared and published by Visual Information Institute, Inc., of Xenia, Ohio and comprises the technical specifications of a television video pattern generator system according to the present invention. The information disclosed in the publication is incorporated into this application by reference.

While this invention has been described as having a preferred design, it will be understood that it is capable of further modification. This application is therefore intended to cover any variations, uses, or adaptations of the invention following the general principles thereof and including such departures from the present disclosure has come within known or customary practice in the art to which the invention pertains and fall within the limits of the amended claims.

APPENDIX A

```
1                       GEN     IDNT    0,0
2

4                *
5                *       SYSTEM EQUATES
6                *
7       0000E000  AC68    EQU     $E000           SERIAL BASE ADDR
8       00004000  RAMBAS  EQU     $4000           CPU RAM BASE ADDR
9       00005000  FRAME   EQU     RAMBAS+$1000    OFFSET TO GEN IMAGE
10      00004F00  TBUF    EQU     FRAME-256       TEMPORARY BUFFER
11      00004E00  ISSP    EQU     FRAME-512       INITIAL STACK POINTER AND GENERAL BUFFER
12      00020000  HORIZ   EQU     $20000          HORIZONTAL MEMORY MAP BASE
13      00021000  HORIZU  EQU     HORIZ+$1000     UPPER 4 BITS
14      00024000  VERT    EQU     $24000          VERTICAL MEMORY MAP BASE
15      00025000  VERTU   EQU     VERT+$1000      UPPER 4 BITS
16      00026000  PIT     EQU     VERT+$2000      PARALLEL INTERFACE BASE
17      00027000  PARMLS  EQU     VERT+$3000      EEPROM BASE
18      00027FFE  LOKSEC  EQU     PARMLS+$FFE     SECONDARY LOCK
19      00000020  SPACE   EQU     $20             ASCII SPACE
20      00000018  CX      EQU     $18             CANCEL INPUT
21      0000000D  CR      EQU     $0D             ASCII CARRIAGE RETURN
22      0000000A  LF      EQU     $0A             ASCII LINE FEED
23      00000008  BS      EQU     8               BACK SPACE
24      00000001  SRA     EQU     1               SERIAL PORT A-STATUS REG
25      00000003  THRA    EQU     3               TRANSMIT HOLDING REG A-SIDE
26      00000000  RXRDY   EQU     0               RECEIVER READY BIT
27      00000002  TXRDY   EQU     2               TRANSMITTER READY BIT
28      00000009  SRB     EQU     9               STATUS REG B-SIDE
29      0000000B  RHRB    EQU     11              RECEIVE HOLDING REG B-SIDE
30      0000000B  THRB    EQU     RHRB            TRANSMIT HOLDING REG B-SIDE
31      0000000E  OPRON   EQU     14              OUTPUT ON BITS
32      0000000F  OPROFF  EQU     15              OUTPUT OFF BITS
33      00000004  IPCR    EQU     4               INPUT CONTROL REG
34      00000001  BCMD    EQU     1               BUILD COMMAND
35      00000002  RCMD    EQU     2               RECALL COMMAND
36      00000003  ECMD    EQU     3               EDIT COMMAND
37      00000004  SAVCMD  EQU     4               SAVE COMMAND
38      00000005  SERCMD  EQU     5               SEARCH COMMAND
39      00000006  LISCMD  EQU     6               LIST COMMAND
40      00000007  LOCKS   EQU     7               LOCKOUT SET
41      01312D00  DIVD    EQU     $1312D00        SPECIAL DIVISOR
42      0000003E  LMPMSK  EQU     $3E             MASKS OFF ALL LAMPS
43      000000C1  BLDMSK  EQU     $C1             BUILD LAMP MASK
44      00000081  EDTMSK  EQU     $81             EDIT LAMP MASK
45      00000041  SRCHMK  EQU     $41             SEARCH LAMP MASK
46      00000001  SAVMSK  EQU     $01             SAVE LAMP MASK
47      00000044  NORAST  EQU     68              NUMBER RASTERS AVAILABLE

49               *
50               *       PIT OFFSETS
51               *

53      00000000  PGCR    EQU     0               GENERAL CONTROL REGISTER
54      00000002  PSRR    EQU     2               SERVICE REQUEST REGISTER
55      00000004  PADDR   EQU     4               A-DATA DIRECT REGISTER
56      00000006  PBDDR   EQU     6               B-DATA DIRECT REGISTER
57      00000008  PCDDR   EQU     8               C-DATA DIRECT REGISTER
58      0000000C  PACR    EQU     12              PORT A CONTROL REGISTER
59      0000000E  PBCR    EQU     14              PORT B CONTROL REGISTER
60      00000010  PADATA  EQU     16              A DATA REGISTER
61      00000012  PBDATA  EQU     18              B DATA REGISTER
```

```
62      00000018    PCDATA  EQU     24              C DATA REGISTER
63      0000001A    PSR     EQU     26              PORT STATUS REGISTER
64      00000020    TCR     EQU     32              TIMER CONTROL REGISTER
65      00000026    CPRH    EQU     38              COUNT PRELOAD HI
66      00000028    CPRM    EQU     40              COUNT PRELOAD MID
67      0000002A    CPRL    EQU     42              COUNT PRELOAD LOW
68      0000002C    CNTRH   EQU     44              COUNTER HIGH
69      00000030    CNTRM   EQU     48              COUNTER MID
70      00000032    CNTRL   EQU     50              COUNTER LOW
71      00000034    TSR     EQU     52              TIMER STATUS REGISTER
72                  *
73                  *           MESSAGE CODES FOR FOUR CHARACTER MESSAGES
74                  *
75      0000F000    MSG40   EQU     $F000           INVALID FLOATING POINT
76      0000F001    MSG41   EQU     $F001           OVER RANGE
77      0000F002    MSG42   EQU     $F002           UNDER RANGE
78      0000F003    MSG43   EQU     $F003           ILLEGAL FLAG VALUE
79      0000F004    MSG44   EQU     $F004           NOT USED
80      0000F005    MSG45   EQU     $F005           UNINITIALIZED RASTER LOCATION
81      0000F006    MSG46   EQU     $F006           ILLEGAL PARAMETER NUMBER
82      0000F007    MSG47   EQU     $F007           PROPORTIONAL MESSAGE
83      0000F008    MSG48   EQU     $F008           STANDARD MESSAGE
84      0000F009    MSG49   EQU     $F009           CUSTOM MESSAGE .
85      0000F00A    MSG50   EQU     $F00A           BROADCAST MESSAGE
86      0000F00B    MSG51   EQU     $F00B           INDUSTRIAL MESSAGE
87      0000F00C    MSG52   EQU     $F00C           YES MESSAGE
88      0000F00D    MSG53   EQU     $F00D           NO MESSAGE
89      0000F00E    MSG54   EQU     $F00E           ILLEGAL FLOATING POINT
90      0000F00F    MSG55   EQU     $F00F           MILITARY
91      0000F010    MSG56   EQU     $F010           CST4 CUSTOM BROADCAST
92      0000F011    MSG57   EQU     $F011           CST5         INDUSTRIAL
93      0000F012    MSG58   EQU     $F012           CST6         MILITARY
94      0000F013    MSG59   EQU     $F013           WARNING ONE
95      0000F014    MSG60   EQU     $F014           WARNING TWO
96      0000F015    MSG61   EQU     $F015           WARNING THREE

98                  *
99                  *           MEMORY CONSTANT OFFSETS
100                 *
101     00000000    NOLINE  EQU     0               NUMBER OF LINES
102     00000002    HLINE   EQU     2               HOR. LINE TIME
103     00000004    HBLANK  EQU     4               HOR. BLANKING
104     00000006    HFRONT  EQU     6               HOR. FRONT PORCH
105     00000008    HSYNC   EQU     8               HOR. SYNC
106     0000000A    SERR    EQU     10              2H ERRATIONS
107     0000000C    EQUAL   EQU     12              2H EQUALIZING
108     0000000E    HDRIV   EQU     14              HOR. DRIVE
109     00000010    HTRIGP  EQU     16              HOR. TRIGGER PHASE
110     00000012    HTRIGW  EQU     18              HOR. TRIGGER WIDTH
111     00000014    VBLANK  EQU     20              VERT. BLANKING
112     00000016    VDRIV   EQU     22              VERT. DRIVE
113     00000018    VTRIGP  EQU     24              VERT. TRIGGER PHASE
114     0000001A    VTRIGW  EQU     26              VERT. TRIGGER WIDTH
115     0000001C    VFP     EQU     28              VERTICAL FRONT PORCH (128 MAX.)
116     0000001D    VPOST   EQU     29              VERTICAL POST (128 MAX.)
117     0000001E    VSYNC   EQU     30              VERTICAL SYNC
118     00000020    VBARP   EQU     32              VERT. BAR POSITION
119     00000022    VBARS   EQU     34              VERT. BAR SPACING
120     00000024    HWINS   EQU     36              HOR. WINDOW START
121     00000026    HWINE   EQU     38              HOR. WINDOW STOP
122     00000028    HBARP   EQU     40              HOR. BAR POSTION
123     0000002A    HBARS   EQU     42              HOR. BAR SPACING
124     0000002C    VWINS   EQU     44              VERT. WINDOW START
125     0000002E    VWINE   EQU     46              VERT. WINDOW STOP
126     00000030    BOUNCE  EQU     48              BOUNCE IN NO. FIELDS
127     00000032    PIXLIN  EQU     50              PIXELS PER LINE
128     00000034    HCHP    EQU     52              HORIZONTAL CROSSHAIR POSITION
129     00000036    APLS    EQU     54              AVG. PICTURE LEVEL START
130     00000038    APLE    EQU     56              AVG. PICTURE LEVEL STOP
131     0000003A    FLAG    EQU     58              FLAGS PLUS SYNC FORMAT
132     0000003B    FCODE   EQU     59              RASTER NUMBER
133     0000003B    FCOD    EQU     FCODE 135     0000003C    LISPTR  EQU     60              POINTER TO RASTER
136     00000040    STRPTR  EQU     64              EEPROM POINTER
137     00000044    ADDU    EQU     68              UPPER 4 BYTE WORK SPACE
138     00000048    ADDL    EQU     72              LOWER FOUR BYTE WORK SPACE
139     0000004C    EOLADR  EQU     76              ADDRESS OF END OF LINE
140     00000050    ACTSTR  EQU     80              ADDRESS OF ACTIVE LINE START
141     00000054    DISBUF  EQU     84              DISPLAY BUFFER
142     00000060    DISDTA  EQU     96              ASCII DISPLAY DATA
143     00000064    NUMBUF  EQU     100             UNPACKED BCD DISPLAY DATA
144     00000068    PARM    EQU     104             PARMETER STORE
145     0000006C    PRMADR  EQU     108             ADDRESS OF STORED PARAMETER
146     00000070    SAVPRM  EQU     112             TEMP. PARAMETER STORE
147     00000074    SWORK   EQU     116             GENERAL LONG WORK SPACE
148     00000078    OUTBUF  EQU     120             TERMINAL OUTPUT BUFFER
149     000000BA    TCODE   EQU     186             TEMPORARY RASTER NUMBER 151     000000BC    WARN    EQU     188             WARNING FLAG
```

| | | | | | |
|---|---|---|---|---|---|
| 152 | 000000BD | MILFLG | EQU | 189 | INDIC MILITARY SYNC FORMAT |
| 153 | 000000BE | SOPR | EQU | 190 | OUTPUT REG. SAVE BYTE |
| 154 | 000000BF | FRAST | EQU | 191 | FIRST RASTER CODE |
| 155 | 000000C0 | OCCUR | EQU | 192 | CURRENT OCCURENCE |
| 156 | 000000C1 | PARMNO | EQU | 193 | PARAMETER NUMBER |
| 157 | 000000C2 | ECHO | EQU | 194 | ECHO CHARACTER FLAG |
| 158 | 000000C3 | DEBUG | EQU | 195 | TERMINAL TALKING FLAG |
| 159 | 000000C4 | ENTERD | EQU | 196 | DATA ENTERED FLAG |
| 160 | 000000C5 | LOKOUT | EQU | 197 | TECHNICIAN LOCKOUT FLAG |
| 161 | 000000C6 | BITS | EQU | 198 | BIT STEP FLAG |
| 162 | 000000C8 | CMDFLG | EQU | 200 | COMMAND STATUS |
| 163 | 000000C9 | FCNFLG | EQU | 201 | COMMAND IN PROGRESS |
| 164 | 000000CA | ERROR | EQU | 202 | ERROR FLAG |
| 165 | 000000CC | DPFLAG | EQU | 204 | DECIMAL POINT COUNTER |
| 166 | 000000CD | STEPNO | EQU | 205 | CURRENT STEP |
| 167 | 000000CE | KEYSAV | EQU | 206 | LAST KEY ENTERED |
| 168 | 000000CF | KFLAG | EQU | 207 | KEY PRESSED FLAG |
| 169 | 000000D0 | KEY | EQU | 208 | TEMPORARY KEY |
| 170 | 000000D1 | SAVFLG | EQU | 209 | SAVE IN PROGRESS |
| 171 | 000000D2 | SAVERR | EQU | 210 | SAVE ERROR FLAG |
| 172 | 000000D3 | SERFLG | EQU | 211 | SEARCH IN PROGRESS |
| 173 | 000000D4 | WORKB | EQU | 212 | GENERAL WORK BYTE |
| 174 | 000000D5 | ICHAR | EQU | 213 | SERIAL INPUT CHARACTER |
| 175 | 000000D6 | OCHAR | EQU | 214 | SERIAL OUTPUT CHARACTER |
| 176 | 000000D7 | FCHAR | EQU | 215 | FOUND CHARACTER FLAG |

```
178                *
179                *       ACTIVE GENERATOR MEMORY MASKS
180                *
181   000000FE     HBL     EQU     $FE             H BLANKING
182   000000FD     HDR     EQU     $FD             H DRIVE
183   000000FB     HSY     EQU     $FB             H SYNC
184   000000F7     HTR     EQU     $F7             H TRIGGER
185   000000EF     C40     EQU     $EF             40 H CLOCK
186   000000DF     HS2     EQU     $DF             2H SERRATIONS
187   000000BF     HE2     EQU     $BF             2H EQUALIZING
188   0000007F     EOL     EQU     $7F             END OF LINE 190   000000FE     HC2     EQU     $FE             2H COUNT
191   000000FD     VBC     EQU     $FD             V BAR CLOCK
192   000000FB     HGT     EQU     $FB             H GATE
193   000000F7     HWIN    EQU     $F7             H WINDOW 195   000000FE     VBL     EQU     $FE             V BLANKING
196   000000FD     VDR     EQU     $FD             V DRIVE
197   000000FB     VWIN    EQU     $FB             V WINDOW
198   000000F7     EOF     EQU     $F7             END OF FIELD
199   000000EF     LIN3    EQU     $EF             V FRONT PORCH
200   000000DF     VSY     EQU     $DF             V SYNC
201   000000BF     LIN9    EQU.    $BF             V POST
202   0000007F     VTR     EQU     $7F             V TRIGGER 204   000000FE     HBR     EQU     $FE             H BAR CLOCK
205   000000FD     HCR     EQU     $FD             H CROSSHAIR
206   000000FB     APL     EQU     $FB             AVERAGE PICTURE LEVEL
207   000000F7     VGT     EQU     $F7             V GATE

209                *
210                *       SYSTEM MACROS
211                *

213                *
214                *       USED IN PROCESS TO ADJUST FOR PIXEL CLOCK
215                *       SPEED AND ZERO COUNT
216                *

218                SHUFL   MACRO
219                        LSL     #1,D1           ADJUST FOR 50 N SEC
220                        SUBQ    #1,D1           ADJUST FOR ZERO COUNT
221                        ENDM

223                *
224                *       PRINTS ENTIRE DISPLAY BUFFER AND
225                *       CARRIAGE RETURN, LINE FEED
226                *

228                PRINT1  MACRO
229                        LEA.L   DISBUF(A6),A1   GET DISPLAY BUFFER
230                        MOVEQ   #2,D7           OPERATION CODE
231                        TRAP    #2              PRINT IT!
232                        ENDM

234                *
235                *       ARGUMENT ONE IS THE OPERATION TO BE
236                *       PERFORMED AND A1 POINTS AT WHERE IT
237                *       IS TO BE PERFORMED
238                *
```

```
240                       PRINT2   MACRO
241                                MOVEQ   \1,D7       OPERATION CODE
242                                TRAP    #2          PRINT IT!
243                                ENDM

245                *
246                *        ARGUMENT ONE IS MESSAGE NUMBER TO BE PRINTED
247                *        ARGUMENT TWO IS OPERATION TO BE PERFORMED AND
248                *        A1 POINTS AT OPERATION LOCATION
249                *

251                       PRINT3   MACRO
252                                MOVE.B  \1,D0
253                                MOVEQ   \2,D7
254                                TRAP    #2
255                                ENDM

257                *
258                *        TURNS ON THE MODE LAMPS
259                *

261                       LAMPIT   MACRO
262                                MOVE.B  \1,D0
263                                BSR     LAMPON
264                                ENDM

266                *
267                *        EXCEPTION VECTORS
268                *
269 0 00000000 00004E00             DC.L    ISSP         INITIAL STACK POINTER
270 0 00000004 000000FC             DC.L    START        START OF POWER-ON-RESET
271 0 00000008 00000260             DC.L    BUSERR       BUS ERROR
272 0 0000000C 000002CC             DC.L    ADDERR       ADDRESS ERROR
273 0 00000010 000002DE             DC.L    MONTRAC      ILLEGAL INSTRUCTION
274 0 00000014 000002DE             DC.L    MONTRAC      ZERO DIVIDE
275 0 00000018 000002DE             DC.L    MONTRAC      CHECK INSTRUCTION (NA)
276 0 0000001C 000002DE             DC.L    MONTRAC      TRAPV
277 0 00000020 000002DE             DC.L    MONTRAC      PRIVILEDGE INSTRUCTION
278 0 00000024 000002DC             DC.L    TRACE        TRACE ROUTINE
279 0 00000028 000002DA             DC.L    BRKPT        LINE EMULATOR 1010
280 0 0000002C 000002E0             DC.L    MSG4P        LINE EMULATOR 1111
281 0 00000030 0013000F    AINTAB   DC.L    $0013000F
282 0 00000034 01660206             DC.L    $01660206
283 0 00000038 04BC0500             DC.L    $04BC0500
284 0 0000003C 06000700             DC.L    $06000700
285 0 00000040 0853080F             DC.L    $0853080F
286 0 00000044 09BB0A05             DC.L    $09BB0A05
287 0 00000048 0C000D00             DC.L    $0C000D00
288 0 0000004C 0E000FFF             DC.L    $0E000FFF
289 0 00000050 00000200    PTITAB   DC.B    PGCR,0,PSRR,0
290 0 00000054 10001208             DC.B    PADATA,0,PBDATA,8
291 0 00000058 1800047F             DC.B    PCDATA,0,PADDR,$7F
292 0 0000005C 06EF08F8             DC.B    PBDDR,$EF,PCDDR,$F8
293 0 00000060 0C780EA0             DC.B    PACR,$78,PBCR,$A0
294 0 00000064 204626FF             DC.B    TCR,$46,CPRH,$FF
295 0 00000068 28FF2AFF             DC.B    CPRM,$FF,CPRL,$FF
296 0 0000006C 000000000000 ZERO    DC.L    0,0,0,0
297 0 00000080 000005D0             DC.L    OUTCHR       TRAP LOCATIONS
298 0 00000084 00000598             DC.L    INCH
299 0 00000088 00000608             DC.L    OUTMES
300 0 0000008C 000002DE             DC.L    MONTRAC
301 0 00000090 000002DE             DC.L    MONTRAC
302 0 00000094 000002DE             DC.L    MONTRAC
303 0 00000098 000002DE             DC.L    MONTRAC
304 0 0000009C 000002DE             DC.L    MONTRAC
305 0 000000A0 000002DE             DC.L    MONTRAC
306 0 000000A4 000002DE             DC.L    MONTRAC
307 0 000000A8 000002DE             DC.L    MONTRAC
308 0 000000AC 000002DE             DC.L    MONTRAC
309 0 000000B0 000002DE             DC.L    MONTRAC
310 0 000000B4 00001128             DC.L    PROC
311 0 000000B8 000002DE             DC.L    MONTRAC
312 0 000000BC 000016F6             DC.L    CHECK

314                *
315                *        DEFAULT SCAN RATE VALUES. LOADED ON
316                *        POWER-UP.
317                *

319 0 000000C0 020D      DEFALT   DC.W    $020D         NUMBER OF LINES
320 0 000000C2 027B               DC.W    $027B         HORIZONTAL LINE TIME
321 0 000000C4 006F               DC.W    $006F         HOR. BLANKING
322 0 000000C6 0010               DC.W    $0010         HOR. FRONT PORCH
323 0 000000C8 0030               DC.W    $0030         HOR. SYNC
324 0 000000CA 0030               DC.W    $0030         2H SERRATIONS
325 0 000000CC 0018               DC.W    $0018         2H EQUALIZING
326 0 000000CE 0040               DC.W    $0040         HOR. DRIVE
327 0 000000D0 0000               DC.W    0             HOR. TRIGGER PHASE
328 0 000000D2 0040               DC.W    $0040         HOR. TRIGGER WIDTH
329 0 000000D4 0028               DC.W    $0028         VERTICAL BLANKING
330 0 000000D6 0015               DC.W    $15           VERTICAL DRIVE
331 0 000000D8 0000               DC.W    0             VERT. TRIGGER PHASE
```

```
332 0 000000DA 0015                    DC.W    $15                 VERT. TRIGGER WIDTH
333 0 000000DC 0606                    DC.W    $606                V FRONT PORCH & V POST
334 0 000000DE 0006                    DC.W    6                   VERTICAL SYNC
335 0 000000E0 0006                    DC.W    $06                 VERT. BAR POSITION
336 0 000000E2 0020                    DC.W    $20                 VERT. BAR SPACING
337 0 000000E4 0083                    DC.W    $83                 HOR. WINDOW START
338 0 000000E6 0189                    DC.W    $0189               HOR. WINDOW STOP
339 0 000000E8 0016                    DC.W    $16                 HOR. BAR POSTION
340 0 000000EA 0022                    DC.W    $22                 HOR. BAR SPACING
341 0 000000EC 007A                    DC.W    $007A               VERT. WINDOW START
342 0 000000EE 016E                    DC.W    $016E               VERT. WINDOW STOP
343 0 000000F0 0000                    DC.W    0                   BOUNCE (IN NO. FIELDS)
344 0 000000F2 0000                    DC.W    0                   PIXEL PER LINE
345 0 000000F4 0000                    DC.W    0                   HORIZONTAL CROSSHAIR
346 0 000000F6 00C2                    DC.W    194                 APL START
347 0 000000F8 0122                    DC.W    290                 APL STOP
348 0 000000FA C163                    DC.W    $C163               FLAGS PLUS RASTER NUMBER

350                             *
351                             *       INITAC--INITIALIZE THE SERIAL PORT AND
352                             *               KEYBOARD SCAN.
353                             *

355 0 000000FC 207C0000E000  START     MOVE.L   #AC68,A0            DUART BASE ADDRESS
356 0 00000102 227C00000030            MOVE.L   #AINTAB,A1          DEFAULT REGISTER PARAMETERS
357 0 00000108 740F                    MOVEQ    #15,D2

359 0 0000010A 4280          INACLP    CLR.L    D0
360 0 0000010C 1019                    MOVE.B   (A1)+,D0            GET REGISTER OFFSET
361 0 0000010E 11990000                MOVE.B   (A1)+,0(A0,D0)      SEND TO DUART REGISTER
362 0 00000112 51CAFFF6                DBRA     D2,INACLP 364 0 00000116 41F900026000  HOTSTR    LEA.L    PIT,A0              PARALLEL PORT BASE
365 0 0000011C 43FAFF32                LEA.L    PTITAB,A1           INITIALIZATION TABLE
366 0 00000120 720D                    MOVEQ    #13,D1              FOURTEEN REGISTERS 368 0 00000122 4280          PLOOP     CLR.L    D0
369 0 00000124 1019                    MOVE.B   (A1)+,D0            GET REGISTER OFFSET
370 0 00000126 11990000                MOVE.B   (A1)+,0(A0,D0)      STORE PARAMETER
371 0 0000012A 51C9FFF6                DBRA     D1,PLOOP            CONTINUE 373 0 0000012E 2C4F                    MOVE.L   A7,A6               INIT FRAME POINTER
374 0 00000130 303C00D5                MOVE     #ICHAR,D0

376 0 00000134 42360000      CLRM      CLR.B    0(A6,D0)            CLEAR THE VARIABLES
377 0 00000138 51C8FFFA                DBRA     D0,CLRM 379 0 0000013C 284E                    MOVE.L   A6,A4
380 0 0000013E 267C000000C0            MOVE.L   #DEFALT,A3          TOP OF DEFAULT VALUES
381 0 00000144 3E3C003B                MOVE     #FCOD,D7            NO. BYTES TO TXFER 383 0 00000148 18DB          INIF1     MOVE.B   (A3)+,(A4)+         LOAD DEFALT INTO ACTIVE RASTER
384 0 0000014A 51CFFFFC                DBRA     D7,INIF1

386 0 0000014E 4E4D                    TRAP     #13                 CALCULATE AND LOAD DEFAULT RASTER
387 0 00000150 61000E48                BSR      RATCAL              CALCULATE RATE
388 0 00000154                         PRINT1                       DISPLAY IT!
389 0 0000015C 50EE00C5                ST       LOKOUT(A6)          LOCK OUT ON POWER UP
390 0 00000160 50EE00C2                ST       ECHO(A6)            ECHO SERIAL CHARACTER FLAG
391 0 00000164 08EE000700D5            BSET.B   #7,ICHAR(A6)        INIT TO NO CHARACTER PRESENT

393                             *
394                             *       MAIN PROGRAM LOOP
395                             *

397 0 0000016A 61000384      MAIN      BSR      KEYSCN              CHECK FOR KEY CLOSURE 399 0 0000016E 4A2E00CF      MAIN1     TST.B    KFLAG(A6)           CHECK FOR KEY PUSH
400 0 00000172 67F6                    BEQ.S    MAIN                *********
401 0 00000174 51EE00CF                SF       KFLAG(A6)           DELETE KEY ACTIVE FLAG
402 0 00000178 610003E4                BSR      KEYIN               GO PROCESS KEY
403 0 0000017C 60EC                    BRA.S    MAIN                **********

405 0 0000017E 4E41          MAIN2     TRAP     #1                  CHECK FOR SERIAL CHARACTER
406 0 00000180 08AE000700D5            BCLR.B   #7,ICHAR(A6)        CHECK IF PRESENT
407 0 00000186 6702                    BEQ.S    MAIN3               BRANCH IF NONE
408 0 00000188 4E71                    NOP                          RCVCHR PROCESS IT 410 0 0000018A 60DE          MAIN3     BRA.S    MAIN                END OF MAIN LOOP

412                             *
```

```
413                              *      DECBIN--UNPACKS BCD DIGITS POINTED AT
414                              *           BY A0. THEN FALLS THRU TO CONVERT
415                              *           THEM TO BINARY IN DBEXP.
416                              *           THE LONG WORD IS RETURNED WHERE
417                              *           A0 POINTS.
418                              *
419                              *      NO REGISTERS ARE VOLITILE.
420                              *
421 0 0000018C 48E77080   DECBIN  MOVEM.L  D1-D3/A0,-(A7)
422 0 00000190 4282               CLR.L    D2                ZERO HOLD REG
423 0 00000192 7603               MOVEQ    #3,D3             FOUR LOOPS
424 0 00000194 32280002           MOVE     2(A0),D1          GET WORD TO BE UNPACKED 426 0 00000198 E249        DBLOOP LSR      #1,D1             GET LB BIT
427 0 0000019A E292               ROXR.L   #1,D2             ROTATE INTO HOLD REG
428 0 0000019C E249               LSR      #1,D1
429 0 0000019E E292               ROXR.L   #1,D2
430 0 000001A0 E249               LSR      #1,D1
431 0 000001A2 E292               ROXR.L   #1,D2
432 0 000001A4 E249               LSR      #1,D1
433 0 000001A6 E292               ROXR.L   #1,D2
434 0 000001A8 E88A               LSR.L    #4,D2             CLEAR UPPER 4 BITS
435 0 000001AA 51CBFFEC           DBRA     D3,DBLOOP         LOOP UNTIL DONE
436 0 000001AE 2082               MOVE.L   D2,(A0)           REPLACE WITH UNPACKED BCD
437 0 000001B0 4CDF010E           MOVEM.L  (A7)+,D1-D3/A0

439                              *
440                              *      DBEXP--CONVERTS UNPACKED BCD TO BINARY.
441                              *           UPON ENTRY A0 POINTS AT THE UNPACKED
442                              *           STRING. EXIT LEAVES THE BINARY
443                              *           EQUIVALENT WHERE A0 POINTS.
444                              *
445                              *      NO REGISTERS VOLITILE
446                              *
447 0 000001B4 48E7E080    DBEXP  MOVEM.L  D0-D2/A0,-(A7)
448 0 000001B8 7003               MOVEQ    #3,D0             LOOP FOUR TIMES
449 0 000001BA 4281               CLR.L    D1
450 0 000001BC 4282               CLR.L    D2

452 0 000001BE C2FC000A    DBLP1  MULU     #10,D1            MULTIPLY FOR BINARY
453 0 000001C2 1418               MOVE.B   (A0)+,D2          GET NEXT DIGIT
454 0 000001C4 D242               ADD      D2,D1             ADD TO PRODUCT
455 0 000001C6 51C8FFF6           DBRA     D0,DBLP1          LOOP UNTIL DONE
456 0 000001CA 2141FFFC           MOVE.L   D1,-4(A0)         REPLACE WITH BINARY VALUE
457 0 000001CE 4CDF0107           MOVEM.L  (A7)+,D0-D2/A0
458 0 000001D2 4E75               RTS

460                              *
461                              *      BINDEC--CONVERTS BINARY VALUES TO THEIR
462                              *           BCD EQUIVALENT. UPON ENTRY D0 MUST
463                              *           CONTAIN THE BINARY VALUE TO BE
464                              *           CONVERTED. EXIT D0 HAS THE BCD VALUE.
465                              *
466                              *      REGISTER D0 CHANGED TO THE BCD VALUE.
467                              *
468 0 000001D4 48E77E00   BINDEC  MOVEM.L  D1-D6,-(A7)
469 0 000001D8 4281               CLR.L    D1
470 0 000001DA 761E               MOVEQ    #30,D3            LOOP THIRTYONE TIMES 472 0 000001DC E388        BDLP1  LSL.L    #1,D0             ADJUST MS BIT
473 0 000001DE E391               ROXL.L   #1,D1
474 0 000001E0 7405               MOVEQ.L  #5,D2             D2=OVERFLOW MASK
475 0 000001E2 7803               MOVEQ.L  #3,D4             D4=OVERFLOW ADJUST VALUE
476 0 000001E4 7A07               MOVEQ.L  #7,D5             INTERNAL LOOP EIGHT TIMES
477 0 000001E6 7C0F               MOVEQ.L  #15,D6            D6=NIBBLE MASK 479 0 000001E8 2F06        BDLP2  MOVE.L   D6,-(A7)          SAVE NIBBLE MASK
480 0 000001EA 2F01               MOVE.L   D1,-(A7)          SAVE PARTIAL
481 0 000001EC C286               AND.L    D6,D1             MASK A NIBBLE
482 0 000001EE B481               CMP.L    D1,D2             CHECK FOR OVERFLOW
483 0 000001F0 6202               BHI.S    BDSKIP            BRANCH IF NONE
484 0 000001F2 D997               ADD.L    D4,(A7)           ELSE ADD ADJUSTMENT 486 0 000001F4 E98A       BDSKIP  LSL.L    #4,D2             ADJUST OVERFLOW MASK
487 0 000001F6 E98C               LSL.L    #4,D4             ADJUST OVERFLOW VALUE
488 0 000001F8 221F               MOVE.L   (A7)+,D1          GET PARTIAL
489 0 000001FA 2C1F               MOVE.L   (A7)+,D6          GET MASK AND ADJUST
490 0 000001FC E98E               LSL.L    #4,D6
491 0 000001FE 51CDFFE8           DBRA     D5,BDLP2          END INTERNAL LOOP
492 0 00000202 51CBFFD8           DBRA     D3,BDLP1          CONTINUE EXTERNAL LOOP
493 0 00000206 E388               LSL.L    #1,D0             ADJUST RESULT
494 0 00000208 E391               ROXL.L   #1,D1
495 0 0000020A 2001               MOVE.L   D1,D0             RESTORE TO REG D0
496 0 0000020C 4CDF007E           MOVEM.L  (A7)+,D1-D6
497 0 00000210 4E75               RTS
```

```
499                           *           TURN ON MODE LEDS
500                           *           ENTRY    D0=LAMP MASK FOR OPERATION.
501                           *           NO REGISTERS VOLITILE
502                           *
503                           *

505 0 00000212 48E7C004    LAMPON    MOVEM.L   D0-D1/A5,-(A7)
506 0 00000216 4BF90000E000          LEA.L     AC68,A5              PORT THRU ACIA
507 0 0000021C 122E00BE              MOVE.B    SOPR(A6),D1          GET OUTPUT STATUS
508 0 00000220 0201003E              AND.B     #LMPMSK,D1           TURN OFF LAMPS
509 0 00000224 8200                  OR.B      D0,D1                SELECT LAMP
510 0 00000226 1B41000E              MOVE.B    D1,OPRON(A5)         SEND IT
511 0 0000022A 1D4100BE              MOVE.B    D1,SOPR(A6)          SAVE IT
512 0 0000022E 4601                  NOT.B     D1
513 0 00000230 1B41000F              MOVE.B    D1,OPROFF(A5)
514 0 00000234 4CDF2003              MOVEM.L   (A7)+,D0-D1/A5
515 0 00000238 4E75                  RTS

517                           *
518                           *           TURN LAMPS OFF.
519                           *           NO REGISTERS VOLITILE
520                           *

522 0 0000023A 48E7C004    LAMPOF    MOVEM.L   D0-D1/A5,-(A7)
523 0 0000023E 4BF90000E000          LEA.L     AC68,A5              ACIA BASE
524 0 00000244 122E00BE              MOVE.B    SOPR(A6),D1
525 0 00000248 0201003E              AND.B     #LMPMSK,D1           CLEAR STATUS
526 0 0000024C 1B41000E              MOVE.B    D1,OPRON(A5)         CLEAR LAMPS
527 0 00000250 1D4100BE              MOVE.B    D1,SOPR(A6)          SAVE STATUS
528 0 00000254 4601                  NOT.B     D1
529 0 00000256 1B41000F              MOVE.B    D1,OPROFF(A5)
530 0 0000025A 4CDF2003              MOVEM.L   (A7)+,D0-D1/A5
531 0 0000025E 4E75                  RTS 533
534                           *           RESERVED FOR DEBUG
535                           *

537 0 00000260 41EE0054    BUSERR    LEA.L     DISBUF(A6),A0
538 0 00000264 217C20424520          MOVE.L    #' BE ',12(A0)
               000C 540 0 0000026C 43F900000312 BE0      LEA.L     HMSG,A1
541 0 00000272                       PRINT2    #2
542 0 00000276 4A5F                  TST       (A7)+
543 0 00000278 4CDF00E0              MOVEM.L   (A7)+,D5-D7
544 0 0000027C 4845                  SWAP      D5
545 0 0000027E 3005                  MOVE      D5,D0
546 0 00000280 7403                  MOVEQ     #3,D2
547 0 00000282 4845                  SWAP      D5
548 0 00000284 61001838              BSR       ASKIT
549 0 00000288 30C0                  MOVE      D0,(A0)+
550 0 0000028A 3005                  MOVE      D5,D0
551 0 0000028C 7403                  MOVEQ     #3,D2
552 0 0000028E 6100182E              BSR       ASKIT
553 0 00000292 20C0                  MOVE.L    D0,(A0)+
554 0 00000294 30FC2020              MOVE      #' ',(A0)+
555 0 00000298 3007                  MOVE      D7,D0
556 0 0000029A 7403                  MOVEQ     #3,D2
557 0 0000029C 61001820              BSR       ASKIT
558 0 000002A0 20C0                  MOVE.L    D0,(A0)+

560 0 000002A2 6100024C    BE1       BSR       KEYSCN
561 0 000002A6 4A2E00CF              TST.B     KFLAG(A6)
562 0 000002AA 67F6                  BEQ.S     BE1
563 0 000002AC                       PRINT1
564 0 000002B4 51EE00CF              SF        KFLAG(A6)

566 0 000002B8 61000236    BE2       BSR       KEYSCN
567 0 000002BC 4A2E00CF              TST.B     KFLAG(A6)
568 0 000002C0 67F6                  BEQ.S     BE2
569 0 000002C2 2E7C00004E00          MOVE.L    #ISSP,A7
570 0 000002C8 6000FE4C              BRA       HOTSTR 572 0 000002CC 41EE0054    ADDERR    LEA.L     DISBUF(A6),A0
573 0 000002D0 217C20414520          MOVE.L    #' AE ',12(A0)
               000C
574 0 000002D8 6092                  BRA.S     BE0

576 0 000002DA 4E73        BRKPT     RTE
577 0 000002DC 4E73        TRACE     RTE
578 0 000002DE 4E73        MONTRAC   RTE

580                           *
581                           *           SENDS FOUR BYTE MESSAGE TO DISPLAY
```

```
582                                  *      ENTERED THRU 1111 EMULATOR. LS BYTE
583                                  *      OF EMU-INST POINTS AT CORRECT MESSAGE
584                                  *

586  0  000002E0  48E78004    MSG4P  MOVEM.L  D0/A5,-(A7)
587  0  000002E4  2A6F000A           MOVE.L   10(A7),A5
588  0  000002E8  3015               MOVE     (A5),D0              GET ERROR CODE
589  0  000002EA  024000FF           AND      #$FF,D0
590  0  000002EE  4BED0002           LEA.L    2(A5),A5             MASK OUT UPPER BYTE
591  0  000002F2  2F4D000A           MOVE.L   A5,10(A7)            ADJUST RETURN ADDRESS
                                                                   RESTORE IT
592  0  000002F6  E548               LSL      #2,D0                OFFSET TO TABLE
593  0  000002F8  4BF900000324       LEA.L    MSG4D,A5
594  0  000002FE  2D7500000060       MOVE.L   0(A5,D0),DISDTA(A6)
595  0  00000304                     PRINT1                        DISPLAY IT
596  0  0000030C  4CDF2001           MOVEM.L  (A7)+,D0/A5
597  0  00000310  4E73               RTE

599                                  *
600                                  *      GENERAL AND SYSTEM ERROR MESSAGES
601                                  *

603  0  00000312  48454C502049  HMSG DC.B    'HELP I AM BROKE ',0,0
604  0  00000324  204520312045 MSG4D DC.B    ' E 1 E 2 E 3 E 4 E 5 E 6 E 7'
605  0  00000340  50524F502053       DC.B    'PROP STDCUSTBCST IND YES NO'
606  0  0000035C  2045203820 4D      DC.B    ' E 8 MILCST4CST5CST6 W 1'
607  0  00000374  205720322057       DC.B    ' W 2 W 3'

609  0  0000037C  F00A         JMTAB DC.W    MSG50
610  0  0000037E  4E75               RTS
611  0  00000380  F00B               DC.W    MSG51
612  0  00000382  4E75               RTS
613  0  00000384  F00F               DC.W    MSG55
614  0  00000386  4E75               RTS
615  0  00000388  F010               DC.W    MSG56
616  0  0000038A  4E75               RTS
617  0  0000038C  F011               DC.W    MSG57
618  0  0000038E  4E75               RTS
619  0  00000390  F012               DC.W    MSG58
620  0  00000392  4E75               RTS

622                                  *
623                                  *      MESSAGE TABLE FOR SEQUENCED PROGRAMMING
624                                  *
625  0  00000394  4E4F2E204C49 MSGTAB DC.B   'NO. LINES ',0         1-NUMBER OF LINES IN TWO FIELDS
626  0  0000039F  48204C494E45       DC.B    'H LINE TIME',0        2-HORIZONTAL LINE TIME
627  0  000003AB  50524F502F43       DC.B    'PROP/CUST',0          3-PROPORTIONAL OR CUSTOM FORMAT
628  0  000003B5  4820424C414E       DC.B    'H BLANKING',0         4-HORIZONTAL BLANKING TIME
629  0  000003C0  482046524E54       DC.B    'H FRNT POR',0         5-HORIZONTAL FRONT PORCH
630  0  000003CB  482053594E43       DC.B    'H SYNC',0             6-HOZONTAL SYNC
631  0  000003D2  324820534552       DC.B    '2H SERR',0            7-2H SERRATIONS
632  0  000003DA  324820455155       DC.B    '2H EQUAL',0           8-2H EQUALIZING
633  0  000003E3  482044524956       DC.B    'H DRIVE',0            9-HORIZONTAL DRIVE TIME
634  0  000003EB  482054524947       DC.B    'H TRIG PH',0          10-HORIZONTAL TRIGGER PHASE
635  0  000003F5  482054524947       DC.B    'H TRIG WID',0         11-HORIZONTAL TRIGGER WIDTH
636  0  00000400  5620424C414E       DC.B    'V BLANK',0            12-VERTICAL BLANKING
637  0  00000408  562044524956       DC.B    'V DRIVE',0            13-VERTICAL DRIVE
638  0  00000410  562054524947       DC.B    'V TRIG PH',0          14-VERTICAL TRIGGER PHASE
639  0  0000041A  562054524947       DC.B    'V TRIG WID',0         15-VERTICAL TRIGGER WIDTH
640  0  00000425  53594E432046       DC.B    'SYNC FORMAT',0        16-SYNC FORMAT B/I/M
641  0  00000431  562046524E54       DC.B    'V FRNT POR',0         17-VERTICAL FRONT PORCH
642  0  0000043C  562053594E43       DC.B    'V SYNC WID',0         18-VERTICAL SYNC WIDTH
643  0  00000447  5620504F5354       DC.B    'V POST WID',0         19-VERTICAL POST PERIOD
644  0  00000452  482050415454       DC.B    'H PATTERN',0          20-PATTERN PROPORTION STANDARD/CUSTOM
645  0  0000045C  5620424152 20      DC.B    'V BAR POS',0          21-VERTICAL BAR POSTION
646  0  00000466  5620424152 20      DC.B    'V BAR SPC',0          22-VERTICAL BAR SPACING
647  0  00000470  482057494E20       DC.B    'H WIN START',0        23-HORIZONTAL WINDOW START
648  0  0000047C  482057494E20       DC.B    'H WIN STOP',0         24-HORIZONTAL WINDOW STOP
649  0  00000487  4820424152 20      DC.B    'H BAR POS',0          25-HORIZONTAL BAR POSITION
650  0  00000491  4820424152 20      DC.B    'H BAR SPC',0          26-HORIZONTAL BAR SPACING
651  0  0000049B  562057494E20       DC.B    'V WIN START',0        27-VERTICAL WINDOW START
652  0  000004A7  562057494E20       DC.B    'V WIN STOP',0         28-VERTICAL WINDOW STOP
653  0  000004B2  424F554E4345       DC.B    'BOUNCE?',0            29-BOUNCE (IN NO. FIELDS)
654  0  000004BA  504958454C53       DC.B    'PIXELS/LINE',0        30-PIXELS PER LINE
655  0  000004C6  482043524F53       DC.B    'H CROSSHAIR',0        31-HORIZONTAL CROSSHAIR
656  0  000004D2  41504C205354       DC.B    'APL START',0          32-AVG PICTURE LEVEL START
657  0  000004DC  41504C205354       DC.B    'APL STOP',0           33-AVG PICTURE LEVEL STOP
658  0  000004E5  524153544552       DC.B    'RASTER NUM',0         34-FORMAT NUMBER ASSIGNMENT

660                                  *
661                                  *
662                                  *      SCANS THE KEYBOARD FOR USER ENTRIES
663                                  *      EVERY TIME THRU MAIN LOOP. KEY IS PUT
664                                  *      IN KEYSAV AND KFLAG IS SET.

666  0  000004F0  2A7C0000E000 KEYSCN MOVE.L  #AC68,A5
667  0  000004F6  7801                MOVEQ   #1,D4                 SET ROLLOVER COUNT
668  0  000004F8  50EE00D0            ST      KEY(A6)               BLANK KEY 670  0  000004FC  760F         KEYSC0 MOVEQ  #15,D3                 SET KEY COUNT
```

```
672 0 000004FE 1A03         KEYSC1   MOVE.B   D3,D5                    KEY COUNT TO D3
673 0 00000500 E50D                  LSL.B    #2,D5                    ADJUST FOR PORT
674 0 00000502 8A2E00BE              OR.B     SOPR(A6),D5
675 0 00000506 1B45000E              MOVE.B   D5,OPRON(A5)             SET CORRECT BITS
676 0 0000050A 4605                  NOT.B    D5
677 0 0000050C 1B45000F              MOVE.B   D5,OPROFF(A5)            CLEAR MUTUAL BITS
678 0 00000510 2F00                  MOVE.L   D0,-(A7)                 WAIT SOME TIME
679 0 00000512 7032                  MOVEQ    #50,D0
680 0 00000514 4E71         SWAIT    NOP
681 0 00000516 51C8FFFC              DBRA     D0,SWAIT
682 0 0000051A 201F                  MOVE.L   (A7)+,D0
683 0 0000051C 082D00020004          BTST.B   #2,IPCR(A5)              CHECK FOR CLOSURE
684 0 00000522 670E                  BEQ.S    KYPST                    BRANCH ON CLOSURE
685 0 00000524 51CBFFD8              DBRA     D3,KEYSC1                ELSE CONTINUE 687 0 00000528 50EE00CE     TOKEYS   ST       KEYSAV(A6)               BAD CLOSURE 689 0 0000052C 51EE00CF     KEYSAM   SF       KFLAG(A6)                FLAG NO KEY
690 0 00000530 4E75                  RTS

692                         *
693                         *        CHECKS REMAINDER OF CYCLE HERE
694                         *

696 0 00000532 B62E00D0     KYPST-   CMP.B    KEY(A6),D3               ARE THEY THE SAME
697 0 00000536 6706                  BEQ.S    KYPST1                   IF YES BRANCH 699 0 00000538 1D4300D0     KEYCHG   MOVE.B   D3,KEY(A6)
700 0 0000053C 7801                  MOVEQ    #1,D4

702 0 0000053E 51CCFFBC     KYPST1   DBRA     D4,KEYSC0                CONTINUE OUTSIDE LOOP(ROLLOVER)

704 0 00000542 162E00D0              MOVE.B   KEY(A6),D3               ARE THEY THE SAME?
705 0 00000546 B62E00CE              CMP.B    KEYSAV(A6),D3
706 0 0000054A 67E0                  BEQ.S    KEYSAM                   YES BRANCH
707 0 0000054C 0C2E00FF00CE          CMP.B    #$FF,KEYSAV(A6)          ELSE NO KEY
708 0 00000552 66D4                  BNE.S    TOKEYS
709 0 00000554 1D4300CE              MOVE.B   D3,KEYSAV(A6)            SAVE KEY IMAGE
710 0 00000558 50EE00CF              ST       KFLAG(A6)                FLAG KEY PRESENT
711 0 0000055C 4E75                  RTS

713                         *
714                         *        ENTRY UPON KEY CLOSURE THRU MAIN LOOP
715                         *        JUMPS WITH KEY OFFSET TO CORRECT KEY
716                         *        ROUTINE.
717                         *

719 0 0000055E 51EE00CA     KEYIN    SF       ERROR(A6)                CLEAR ANY PREVIOUS ERROR
720 0 00000562 102E00CE              MOVE.B   KEYSAV(A6),D0            GET KEY VALUE
721 0 00000566 0240001F              AND      #$1F,D0
722 0 0000056A E308                  LSL.B    #1,D0                    ADJUST FOR LONG WORD
723 0 0000056C 41F900000578          LEA.L    KEYTAB,A0
724 0 00000572 30700000              MOVE     0(A0,D0.W),A0            GET ADDRESS OF KEY ROUTINE
725 0 00000576 4ED0                  JMP      (A0)

727                         *
728                         *        KEY ROUTINES IN KEY ORDER
729                         *

731 0 00000578 0F7806880BE0 KEYTAB   DC.W     DECPT,NUM,ENTER,ENTER
732 0 00000580 068806880688          DC.W     NUM,NUM,NUM,RECALL
733 0 00000588 068806880688          DC.W     NUM,NUM,NUM,BUILD
734 0 00000590 068806880688          DC.W     NUM,NUM,NUM,EDIT

736                         *
737                         *        INCH--INPUTS A CHARACTER FROM THE SERIAL PORT
738                         *                IF ONE IS PRESENT. MS BIT ICHAR=1 IF
739                         *                CHARACTER IS PRESENT ELSE 0. ECHOS THE
740                         *                CHARACTER IF ECHO=-1.
741                         *        NO REGISTERS CHANGED
742                         *
743 0 00000598 2F08         INCH     MOVE.L   A0,-(A7)
744 0 0000059A 41F90000E000          LEA.L    AC68,A0                  GET PORT ADDRESS
745 0 000005A0 082800000009          BTST.B   #RXRDY,SRB(A0)           CHECK CHAR PRESENT
746 0 000005A6 671E                  BEQ.S    INCHN                    IF NO BRANCH
747 0 000005A8 1D68000B00D5          MOVE.B   RHRB(A0),ICHAR(A6)       SAVE CHARACTER
748 0 000005AE 4A2E00C2              TST.B    ECHO(A6)                 CHECK FOR ECHO
749 0 000005B2 6708                  BEQ.S    INCH1                    BRANCH IF NO ECHO
750 0 000005B4 1D6E00D500D6          MOVE.B   ICHAR(A6),OCHAR(A6)
751 0 000005BA 4E40                  TRAP     #0                       OUTPUT CHARACTER 753 0 000005BC 08EE000700D5 INCH1    BSET.B   #7,ICHAR(A6)             FLAG CHAR PRESENT
754 0 000005C2 205F                  MOVE.L   (A7)+,A0
755 0 000005C4 4E73                  RTE
```

```
757 0 000005C6 08AE000700D5  INCHN   BCLR.B  #7,ICHAR(A6)        FLAG CHAR NOT PRESENT
758 0 000005CC 205F                  MOVE.L  (A7)+,A0
759 0 000005CE 4E73                  RTE

761                           *
762                           *      OUTCHR--OUTPUTS A CHARACTER TO THE SERIAL PORT.
763                           *              IF THE PORT IS NOT READY IT WAITS.
764                           *      NO REGISTERS ARE CHANGED
765                           *
766 0 000005D0 2F08           OUTCHR MOVE.L  A0,-(A7)
767 0 000005D2 41F90000E000          LEA.L   AC68,A0             SERIAL PORT ADDRESS 769 0 000005D8 082800020009  OUTCH0  BTST.B  #TXRDY,SRB(A0)      CHECK PORT READY
770 0 000005DE 67F8                  BEQ.S   OUTCH0              LOOP UNTIL READY
771 0 000005E0 116E00D6000B          MOVE.B  OCHAR(A6),THRB(A0)  SEND CHARACTER
772 0 000005E6 205F                  MOVE.L  (A7)+,A0
773 0 000005E8 4E73                  RTE

775                           *
776                           *      PCRLF--SENDS CARRIAGE RETURN AND LINE FEED
777                           *              TO THE DISPLAY.
778                           *
779 0 000005EA 103C000D       PCRLF  MOVE.B  #CR,D0              CARRIAGE RETURN
780 0 000005EE 6104                  BSR.S   OUTDIS              SEND IT
781 0 000005F0 103C000A              MOVE.B  #LF,D0              FALL THROUGH

783                           *      OUTDIS- OUTPUT CHARACTERS AND COMMANDS TO THE
784                           *              DEVICE DISPLAY.
785                           *
786                           *      ENTRY:D0 HAS BYTE TO BE TRANSFERED
787                           *      EXIT:A0 IS MODIFIED
788                           *
789 0 000005F4 207C0000E000   OUTDIS MOVE.L  #AC68,A0            DUART BASE ADDRESS
790 0 000005FA 082800020001   ODLOOP BTST.B  #TXRDY,SRA(A0)      CHECK IF TRANSMITTER READY
791 0 00000600 67F8                  BEQ.S   ODLOOP              IF NOT LOOP
792 0 00000602 11400003              MOVE.B  D0,THRA(A0)         NOW SEND CHARACTER
793 0 00000606 4E75                  RTS

795                           *
796                           *      OUTMES- GENERALLY SELECTS ONE OF MANY OUTPUT ROUTINES
797                           *      ENTERED BY TRAP. REG D7 POINTS AT ROUTINE. NO REGISTERS AFFECTED
798                           *

800 0 00000608 48E7FFFE       OUTMES MOVEM.L D0-D7/A0-A6,-(A7)
801 0 0000060C 41F90000061E          LEA.L   OUTTAB,A0           TOP OF TABLE
802 0 00000612 30707000               MOVE    0(A0,D7),A0         CALCULATE JUMP ADDRESS
803 0 00000616 4E90                  JSR     (A0)                GO TO IT
804 0 00000618 4CDF7FFF              MOVEM.L (A7)+,D0-D7/A0-A6
805 0 0000061C 4E73                  RTE

807                           *
808                           *      DISPLAY OUTPUT TABLE
809                           *
810 0 0000061E 0662           OUTTAB DC.W    OUTMLP              LOAD, CRLF, AND OUT TO DISPLAY
811 0 00000620 0646                  DC.W    OUTP                OUT MULTIPLE CHARS TO DISPLAY
812 0 00000622 0640                  DC.W    OUTFL               FIND, LOAD, AND OUT TO DISPLAY
813 0 00000624 066A                  DC.W    LOADF               FIND AND LOAD
814 0 00000626 066C                  DC.W    LODMES              LOAD A MESSAGE

816                           *
817                           *      FINDS THE MESSAGE NUMBER IN D0 AND POINTS
818                           *      WITH A1.
819                           *
821 0 00000628 2F01           FNDMSG MOVE.L  D1,-(A7)            SAVE REG D1
822 0 0000062A 43FAFD68              LEA.L   MSGTAB,A1           TOP OF MESSAGE TABLE
823 0 0000062E 4281                  CLR.L   D1                  TEMP MESSAGE POINTER IS ZERO 825 0 00000630 B001           FM0    CMP.B   D1,D0               IS THIS THE ONE?
826 0 00000632 6708                  BEQ.S   FM2                 YES, BRANCH 828 0 00000634 4A19           FM1    TST.B   (A1)+               ELSE CHECK FOR END OF MESSAGE
829 0 00000636 66FC                  BNE.S   FM1
830 0 00000638 5241                  ADDQ    #1,D1               ADJUST TEMP MESSAGE POINTER
831 0 0000063A 60F4                  BRA.S   FM0                 CONTINUE SEARCH 833 0 0000063C 221F           FM2    MOVE.L  (A7)+,D1            DONE
834 0 0000063E 4E75                  RTS
```

```
836                                *
837                                *       FIND THE MESSAGE AND LOAD IT IN THE DISPLAY
838                                *       BUFFER. SEND IT WITH CRLF.
839                                *

841 0 00000640 6128        OUTFL   BSR.S    LOADF
842 0 00000642 43EE0054            LEA.L    DISBUF(A6),A1

844                                *
845                                *       OUTPUTS A CLEAR DISPLAY COMMAND(CRLF) THEN
846                                *       FALLS THRU TO OUTPUT DISPLAY BUFFER.

848 0 00000646 61A2        OUTP    BSR      PCRLF                GO SEND CLEAR DISPLAY 850 0 00000648 720F        OUT     MOVEQ    #15,D1               SIXTEEN CHARACTERS 852 0 0000064A 1019        OUTLP   MOVE.B   (A1)+,D0             GET A CHARACTER
853 0 0000064C 6708                BEQ.S    OUT1
854 0 0000064E 61A4                BSR      OUTDIS               SEND IT
855 0 00000650 51C9FFF8            DBRA     D1,OUTLP             LOOP UNTIL DONE
856 0 00000654 4E75                RTS

858                                *
859                                *       FINISHES WITH SPACES IF LESS THAN 16 CHARS
860                                *

862 0 00000656 103C0020    OUT1    MOVE.B   #SPACE,D0            FILL WITH SPACES
863 0 0000065A 6198                BSR      OUTDIS
864 0 0000065C 51C9FFF8            DBRA     D1,OUT1
865 0 00000660 4E75                RTS

867                                *
868                                *       SENDS CRLF, LOADS INTO DISPLAY BUFFER,
869                                *       AND SENDS TO DISPLAY.
870                                *

872 0 00000662 6108        OUTMLP  BSR.S    LODMES               LOAD MESSAGE FROM REG A1
873 0 00000664 43EE0054            LEA.L    DISBUF(A6),A1        GET DISPLAY BUFFER
874 0 00000668 60DC                BRA.S    OUTP                 SEND IT!

876 0 0000066A 61BC        LOADF   BSR      FNDMSG               FIND THE MESSAGE THEN

878                                *
879                                *       LOADS THE MESSAGE POINTED AT BY REG A1
880                                *       INTO DISPLAY BUFFER
881                                *

883 0 0000066C 41EE0054    LODMES  LEA.L    DISBUF(A6),A0        GET DISPLAY BUFFER
884 0 00000670 720F                MOVEQ    #15,D1               DO 16 CHARACTERS 886 0 00000672 1019        LDMS0   MOVE.B   (A1)+,D0             GET A CHARACTER
887 0 00000674 6708                BEQ.S    LDMS1                END OF MESSAGE BRANCH
888 0 00000676 10C0                MOVE.B   D0,(A0)+             ELSE PUT IN BUFFER
889 0 00000678 51C9FFF8            DBRA     D1,LDMS0             CONTINUE
890 0 0000067C 4E75                RTS 892 0 0000067E 10FC0020    LDMS1   MOVE.B   #SPACE,(A0)+         ELSE FILL WITH SPACES
893 0 00000682 51C9FFFA            DBRA     D1,LDMS1             CONTINUE
894 0 00000686 4E75                RTS

896                                *
897                                *       UPDATES NUMBUF IF NEEDED AND CHECKS
898                                *       FOR LONG WORD MESSAGES.
899                                *       REGS AFFECTED:D0,D1,D7
900                                *

902 0 00000688 1E2E00CE    NUM     MOVE.B   KEYSAV(A6),D7        GET DEPRESSED KEY
903 0 0000068C 4BF90000008C        LEA.L    NUMTAB,A5            POINT AT NUMBER TABLE
904 0 00000692 10357000            MOVE.B   0(A5,D7),D0          CONVERT TO VALUE
905 0 00000696 222E0064            MOVE.L   NUMBUF(A6),D1        UPDATE INPUT BUFFER
906 0 0000069A E189                LSL.L    #8,D1
907 0 0000069C 8200                OR.B     D0,D1
908 0 0000069E 2D410064            MOVE.L   D1,NUMBUF(A6)
909 0 000006A2 4A2E00C8            TST.B    CMDFLG(A6)           CHECK IF KEY WORD
910 0 000006A6 6700009A            BEQ      NUM00                IF YES BRANCH AROUND
911 0 000006AA 0C2E000700C8        CMP.B    #LOCKS,CMDFLG(A6)
912 0 000006B0 67000090            BEQ      NUM00

914 0 000006B4 50EE00C4            ST       ENTERD(A6)           FLAG KEY ENTERED
915 0 000006B8 0C2E000100C8        CMP.B    #1,CMDFLG(A6)        IN BUILD MODE?
916 0 000006BE 670000A6            BEQ      NUM4                 YES, BRANCH
917 0 000006C2 0C2E000300C8        CMP.B    #3,CMDFLG(A6)        IN EDIT MODE?
918 0 000006C8 67000118            BEQ      NUM6                 YES, BRANCH
919 0 000006CC 0C2E000400C8        CMP.B    #4,CMDFLG(A6)        IN SAVE MODE?
920 0 000006D2 670000EE            BEQ      NUM5                 YES, BRANCH
```

```
922  0  000006D6  2001              NUM0     MOVE.L   D1,D0
923  0  000006D8  2F01                       MOVE.L   D1,-(A7)
924  0  000006DA  4281                       CLR.L    D1
925  0  000006DC  4284                       CLR.L    D4
926  0  000006DE  7403                       MOVEQ    #3,D2

928  0  000006E0  6162              ASC40    BSR.S    HEXIT
929  0  000006E2  4A01                       TST.B    D1
930  0  000006E4  6616                       BNE.S    ASC42
931  0  000006E6  E18C                       LSL.L    #8,D4
932  0  000006E8  00040020                   OR.B     #SPACE,D4
933  0  000006EC  51CAFFF2                   DBRA     D2,ASC40
934  0  000006F0  2D7C20202030               MOVE.L   #$20202030,DISDTA(A6)
              0060
935  0  000006F8  6014                       BRA.S    ASC43

937  0  000006FA  6148              ASC41    BSR.S    HEXIT 939  0  000006FC  00010030          ASC42    OR.B     #'0',D1
940  0  00000700  E18C                       LSL.L    #8,D4
941  0  00000702  8801                       OR.B     D1,D4
942  0  00000704  4241                       CLR      D1
943  0  00000706  51CAFFF2                   DBRA     D2,ASC41
944  0  0000070A  2D440060                   MOVE.L   D4,DISDTA(A6)

946  0  0000070E  221F              ASC43    MOVE.L   (A7)+,D1
947  0  00000710  4A2E00CC                   TST.B    DPFLAG(A6)
948  0  00000714  6724                       BEQ.S    NUM1
949  0  00000716  102E00CC                   MOVE.B   DPFLAG(A6),D0     CHECK AND ADJUST DECIMAL POINT
950  0  0000071A  02400003                   AND      #3,D0
951  0  0000071E  0C000002                   CMP.B    #2,D0
952  0  00000722  6732                       BEQ.S    NUMERR 954  0  00000724  223C00000080               MOVE.L   #$80,D1
955  0  0000072A  6002                       BRA.S    NUM3

957  0  0000072C  E189              NUM2     LSL.L    #8,D1
958  0  0000072E  51C8FFFC          NUM3     DBRA     D0,NUM2
959  0  00000732  83AE0060                   OR.L     D1,DISDTA(A6)     STICK IN BUFFER
960  0  00000736  522E00CC                   ADD.B    #1,DPFLAG(A6)     ADJUST DECIMAL POINT 962  0  0000073A                    NUM1     PRINT1                    DISPLAY NEW DATA
963  0  00000742  4E75              NUM00    RTS 965  0  00000744  E988              HEXIT    LSL.L    #5,D0
966  0  00000746  E311                       ROXL.B   #1,D1
967  0  00000748  E388                       LSL.L    #1,D0
968  0  0000074A  E311                       ROXL.B   #1,D1
969  0  0000074C  E388                       LSL.L    #1,D0
970  0  0000074E  E311                       ROXL.B   #1,D1
971  0  00000750  E388                       LSL.L    #1,D0
972  0  00000752  E311                       ROXL.B   #1,D1
973  0  00000754  4E75                       RTS 975  0  00000756  F000              NUMERR   DC.W     MSG40             TOO MANY DECIMAL POINTS
976  0  00000758  42AE0064                   CLR.L    NUMBUF(A6)        START OVER
977  0  0000075C  422E00CC                   CLR.B    DPFLAG(A6)
978  0  00000760  51EE00C4                   SF       ENTERD(A6)
979  0  00000764  4E75                       RTS

981                                 *
982                                 *        NUM4 THRU NUM6 CHECK THE NEED OF SPECIAL MESSAGES
983                                 *        IF NEEDED IT INSERTS THE CORRECT MESSAGE IN THE
984                                 *        DISPLAY BUFFER.
985                                 *        NUM4=BUILD MODE
986                                 *        NUM5=SAVE MODE
987                                 *        NUM6=EDIT MODE
988                                 *

990  0  00000766  0C2E000200CD  NUM4         CMP.B    #2,STEPNO(A6)     FLAG STEP?
991  0  0000076C  6614                       BNE.S    NUM41             IF NO THE BRANCH 993  0  0000076E  4A81              NUM400   TST.L    D1                CHECK CUST/PROP
994  0  00000770  6604                       BNE.S    NUM40             BRANCH FOR PROP MSG
995  0  00000772  F009                       DC.W     MSG49             CUSTOM MSG
996  0  00000774  4E75                       RTS 998  0  00000776  0C8100000001  NUM40        CMP.L    #1,D1             CHECK FOR ERROR
999  0  0000077C  6658                       BNE.S    NUM51             BRANCH IF YES
1000 0  0000077E  F007                       DC.W     MSG47             PROPORTIONAL MSG
1001 0  00000780  4E75                       RTS 1003 0  00000782  0C2E000F00CD  NUM41        CMP.B    #15,STEPNO(A6)    NEEDS SYNC FORMAT MSG?
1004 0  00000788  6614                       BNE.S    NUM44             IF NO, BRANCH
```

```
1006 0 0000078A 5341              NUM410    SUBQ     #1,D1
1007 0 0000078C 6B48                        BMI.S    NUM51
1008 0 0000078E 0C410006                    CMP      #6,D1
1009 0 00000792 6C42                        BGE.S    NUM51
1010 0 00000794 E589                        LSL.L    #2,D1
1011 0 00000796 49FAFBE4                    LEA.L    JMTAB,A4
1012 0 0000079A 4EF41000                    JMP      0(A4,D1)

1014 0 0000079E 0C2E001300CD NUM44          CMP.B    #19,STEPNO(A6)    CHECK FOR H PATTERN MESSAGES
1015 0 000007A4 6708                        BEQ.S    NUM440            BRANCH IF YES
1016 0 000007A6 50EE00C4                    ST       ENTERD(A6)        ELSE RETURN TO MAIN ROUTINE
1017 0 000007AA 6000FF2A                    BRA      NUM0

1019 0 000007AE 4A81              NUM440    TST.L    D1                CHECK FOR CUSTOM MESSAGE
1020 0 000007B0 6604                        BNE.S    NUM45             IF NO BRANCH
1021 0 000007B2 F009                        DC.W     MSG49
1022 0 000007B4 4E75                        RTS 1024 0 000007B6 0C8100000001 NUM45          CMP.L    #1,D1             CHECK FOR ERROR
1025 0 000007BC 6618                        BNE.S    NUM51             BRANCH IF YES
1026 0 000007BE F008                        DC.W     MSG48             STANDARD MESSAGE
1027 0 000007C0 4E75                        RTS 1029 0 000007C2 4A81              NUM5      TST.L    D1                CHECK FOR NO MESSAGE
1030 0 000007C4 6604                        BNE.S    NUM50             BRANCH IF NOT
1031 0 000007C6 F00D                        DC.W     MSG53
1032 0 000007C8 4E75                        RTS 1034 0 000007CA 0C8100000001 NUM50          CMP.L    #1,D1             CHECK FOR ERROR
1035 0 000007D0 6604                        BNE.S    NUM51             BRANCH FOR ERROR
1036 0 000007D2 F00C                        DC.W     MSG52             ELSE YES MESSAGE
1037 0 000007D4 4E75                        RTS 1039 0 000007D6 F003              NUM51     DC.W     MSG43
1040 0 000007D8 42AE0064                    CLR.L    NUMBUF(A6)
1041 0 000007DC 51EE00C4                    SF       ENTERD(A6)
1042 0 000007E0 4E75                        RTS 1045 0 000007E2 0C2E000300CD NUM6           CMP.B    #3,STEPNO(A6)     ANSWER STEP?
1046 0 000007E8 661A                        BNE.S    NUM60             IF NO, THEN RETURN
1047 0 000007EA 0C2E000200C1                CMP.B    #2,PARMNO(A6)     FLAG STEP? BRANCH IF TRUE
1048 0 000007F0 6700FF7C                    BEQ      NUM400
1049 0 000007F4 0C2E000F00C1                CMP.B    #15,PARMNO(A6)
1050 0 000007FA 678E                        BEQ      NUM410
1051 0 000007FC 0C2E001300C1                CMP.B    #19,PARMNO(A6)
1052 0 00000802 67AA                        BEQ      NUM440
1053 0 00000804 50EE00C4         NUM60      ST       ENTERD(A6)
1054 0 00000808 6000FECC                    BRA      NUM0

1056
1057                              *          NUMTAB CONVERTS POSITION INTO VALUE
1058                              *          FOR THE KEYPAD.
1059                              *

1061 0 0000080C 00000000          NUMTAB    DC.B     0,0,0,0
1062 0 00000810 07080900                    DC.B     7,8,9,0
1063 0 00000814 01020300                    DC.B     1,2,3,0
1064 0 00000818 04050600                    DC.B     4,5,6,0

1066
1067                              *          ENTERED UPON RECEIPT OF THE BUILD
1068                              *          COMMAND KEY. INITIALIZES CONTROL FLAGS
1069                              *          BEFORE ASKING FOR DATA.
1070                              *

1072 0 0000081C 4A2E00C5          BUILD     TST.B    LOKOUT(A6)        CHECK FOR LOCK OUT
1073 0 00000820 6B20                        BMI.S    BLDR              BRANCH IF YES
1074 0 00000822 1E3C0001                    MOVE.B   #BCMD,D7          D7=BUILD COMMAND VALUE
1075 0 00000826 6146                        BSR.S    CMDCHK            CHECK FOR VALID ENTRY
1076 0 00000828 61001060                    BSR      PUSH              SAVE OLD RASTER
1077 0 0000082C 1D7C000000CD                MOVE.B   #0,STEPNO(A6)     ELSE SET FLAGS
1078 0 00000832                             PRINT3   #0,#4             DISPLAY FIRST STEP
1079 0 0000083A                             LAMPIT   #BLDMSK
1080 0 00000842 4E75              BLDR      RTS 1082
1083                              *          RECALL IS ENTERED ON RECEIPT OF RECALL COMMAND
1084                              *          KEY CLOSURE. TESTS FOR ERRORS AND SETS UP MODE.
1085                              *

1087 0 00000844 1E3C0002          RECALL    MOVE.B   #RCMD,D7          RECALL COMMAND VALUE
1088 0 00000848 6124                        BSR.S    CMDCHK            CHECK FOR ERRORS
1089 0 0000084A 6014                        BRA.S    EDIT1

1091
1092                              *          EDIT IS ENTERED ON RECEIPT OF COMMAND KEY CLOSURE.
1093                              *          SETS UP FLAGS AND CHECK FOR ERRORS.
1094                              *
```

```
1096 0 0000084C 4A2E00C5    EDIT     TST.B    LOKOUT(A6)              CHECK LOCKOUT IN FORCE
1097 0 00000850 6B1A                 BMI.S    EDITR                   BRANCH IF YES 1099 0 00000852 1E3C0003             MOVE.B   #ECMD,D7                ELSE CHECK COMMAND STATUS
1100 0 00000856 6116                 BSR.S    CMDCHK
1101 0 00000858                      LAMPIT   #EDTMSK 1103 0 00000860 422E00CD    EDIT1    CLR.B    STEPNO(A6)              SET UP FLAGS
1104 0 00000864                      PRINT3   #33,#4                  DISPLAY FIRST STEP 1106 0 0000086C 4E75        EDITR    RTS

1108                        *
1109                        *        CHECKS FOR VALID COMMAND CHANGE AND SETS
1110                        *        MODE OPERATING FLAGS.
1111                        *

1113 0 0000086E 4AEE00C9    CMDCHK   TAS      FCNFLG(A6)              ALREADY IN MODE?
1114 0 00000872 6762                 BEQ.S    CCHK1                   IF NO BRANCH
1115 0 00000874 1D6E00C800D4         MOVE.B   CMDFLG(A6),WORKB(A6)    ELSE SAVE PREVIOUS COMMAND
1116 0 0000087A 0C070002             CMP.B    #RCMD,D7                FIND CURRENT COMMAND
1117 0 0000087E 6610                 BNE.S    CCHK2                   BRANCH IF NOT RECALL
1118 0 00000880 0C2E000500C8         CMP.B    #SERCMD,CMDFLG(A6)      ELSE CHECK FOR SUB-COMMAND
1119 0 00000886 6724                 BEQ.S    CCHK01                  IF SEARCH BRANCH
1120 0 00000888 0C2E000600C8         CMP.B    #LISCMD,CMDFLG(A6)
1121 0 0000088E 671C                 BEQ.S    CCHK01                  IF LIST BRANCH 1123 0 00000890 BF2E00D4    CCHK2    EOR.B    D7,WORKB(A6)            ELSE COMPARE OLD TO NEW
1124 0 00000894 6710                 BEQ.S    CCHK0                   IF OK THEN BRANCH 1126 0 00000896 227C00000922 CCHKE   MOVE.L   #KEYMSG,A1              ELSE SEND ERROR MESSAGE
1127 0 0000089C                      PRINT2   #2
1128 0 000008A0 4FEF0004             LEA.L    4(A7),A7                ADJUST STACK PAST OLD ROUTINE
1129 0 000008A4 4E75                 RTS 1131 0 000008A6 0C070001    CCHK0    CMP.B    #BCMD,D7
1132 0 000008AA 6604                 BNE.S    CCHK10
1133 0 000008AC 61000FF6    CCHK01   BSR      PULL 1135 0 000008B0 4FEF0004    CCHK10   LEA.L    4(A7),A7                FLAG NOT OK 1137 0 000008B4 610006E4    DELCMD   BSR      RATCAL
1138 0 000008B8                      PRINT1

1140 0 000008C0 6100F978    DELCMD1  BSR      LAMPOF
1141 0 000008C4 422E00C8             CLR.B    CMDFLG(A6)
1142 0 000008C8 422E00CD             CLR.B    STEPNO(A6)
1143 0 000008CC 422E00C9             CLR.B    FCNFLG(A6)
1144 0 000008D0 422E00CC             CLR.B    DPFLAG(A6)
1145 0 000008D4 4E75                 RTS 1147 0 000008D6 1D4700C8    CCHK1    MOVE.B   D7,CMDFLG(A6)           UPDATE TO NEW COMMAND
1148 0 000008DA 42AE0064             CLR.L    NUMBUF(A6)
1149 0 000008DE 4E75                 RTS

1151                        *
1152                        *        ENTERED WHEN ENTER KEY IS DEPRESSED.
1153                        *        CONVERTS PARAMETER VALUE TO BINARY THRU
1154                        *        OTHER UTILITIES AND GOES TO ACTIVE MODE
1155                        *        ROUTINE.
1156                        *

1158 0 000008E0 2D6E00640068 ENTER   MOVE.L   NUMBUF(A6),PARM(A6)     MOVE KEYED VALUE TO PARM
1159 0 000008E6 41EE0068             LEA.L    PARM(A6),A0
1160 0 000008EA 6100F8C8             BSR      DBEXP                   CONVERT TO BINARY
1161 0 000008EE 42AE0064             CLR.L    NUMBUF(A6)              FIX FOR NEXT ENTRY
1162 0 000008F2 9C86                 SUB.L    D6,D6
1163 0 000008F4 1C2E00C8             MOVE.B   CMDFLG(A6),D6           GET ACTIVE MODE
1164 0 000008F8 E30E                 LSL.B    #1,D6
1165 0 000008FA 4BF900000912         LEA.L    OPSTAB,A5               TOP OF OPERATION TABLE
1166 0 00000900 0C06001C             CMP.B    #28,D6                  CHECK OUT OF RANGE
1167 0 00000904 6290                 BHI.S    CCHKE                   IF YES THEN ERROR
1168 0 00000906 30756000             MOVE     0(A5,D6),A0
1169 0 0000090A 4E90                 JSR      (A0)                    ELSE GO TO ROUTINE
1170 0 0000090C 422E00CC             CLR.B    DPFLAG(A6)              CLEAR DECIMAL ON RETURN
1171 0 00000910 4E75                 RTS

1173                        *        OPERATIONS TABLE--
1174                        *        0=LOCK CHANGE
1175                        *        1=BUILD
1176                        *        2=RECALL
1177                        *        3=EDIT
1178                        *        4=SAVE
1179                        *        5=SEARCH
1180
```

```
1181                                    *          6=LIST
1182                                    *          7=SET SECONDARY LOCK
1183                                    *

1185 0 00000912 0930        OPSTAB      DC.W       LOKCHG              CHANGE TECH LOCK-OUT
1186 0 00000914 09B6                    DC.W       BLD                 BUILD A NEW RASTER
1187 0 00000916 0B86                    DC.W       RECL                RECALL A RASTER
1188 0 00000918 0D08                    DC.W       EDT                 EDIT EXISTING RASTER
1189 0 0000091A 18B0                    DC.W       SAVIT               SAVE A RASTER
1190 0 0000091C 1A0A                    DC.W       SEARCH              SEARCH FOR A RASTER
1191 0 0000091E 0C42                    DC.W       LIST                LIST RASTERS
1192 0 00000920 096A                    DC.W       LOKSET              SET SECONDARY LOCK 1194 0 00000922 494E56414C49 KEYMSG     DC.B       'INVALID ENTRY',0

1196 0 00000930 2F07        LOKCHG      MOVE.L     D7,-(A7)
1197 0 00000932 2E2E0068                MOVE.L     PARM(A6),D7         GET ENTRY
1198 0 00000936 0CAE000002CF            CMP.L      #$02CF,PARM(A6)     CHECK FOR PRIMARY KEY
                0068
1199 0 0000093E 6614                    BNE.S      LKOUT1              IF NOT TRY SECONDARY
1200 0 00000940 4A2E00CC                TST.B      DPFLAG(A6)          CHECK FOR CHANGE COMMAND
1201 0 00000944 6B18                    BMI.S      LKOUT2              BRANCH FOR CHANGE 1203 0 00000946 086E000700C5 LKOUT0     BCHG.B     #7,LOKOUT(A6)       ELSE CHANGE LOCKOUT FLAG 1205 0 0000094C 42AE0068    LOKR        CLR.L      PARM(A6)            REMOVE EVIDENCE
1206 0 00000950 2E1F                    MOVE.L     (A7)+,D7
1207 0 00000952 4E75                    RTS 1209 0 00000954 BE7900027FFE LKOUT1     CMP        LOKSEC,D7           SECONDARY LOCK
1210 0 0000095A 66F0                    BNE.S      LOKR                IF NO, INVALID
1211 0 0000095C 60E8                    BRA.S      LKOUT0              ELSE VALID KEY 1213 0 0000095E 1D7C000700C8 LKOUT2     MOVE.B     #LOCKS,CMDFLG(A6)   SET FOR SECONDARY LOCK CHANGE
1214 0 00000964 51EE00CC                SF         DPFLAG(A6)
1215 0 00000968 60E2                    BRA.S      LOKR 1217 0 0000096A 48E78104    LOKSET      MOVEM.L    D0/D7/A5,-(A7)
1218 0 0000096E 4BF900027FFE            LEA.L      LOKSEC,A5           SECONDARY LOCK
1219 0 00000974 4287                    CLR.L      D7
1220 0 00000976 0C75FFFF7000            CMP        #$FFFF,0(A5,D7)     CHECK FOR UNINITIALIZED
1221 0 0000097C 670E                    BEQ.S      LOKS1               SKIP ERASE IF SO
1222 0 0000097E 103C00FF                MOVE.B     #$FF,D0
1223 0 00000982 6100102E                BSR        LWAIT               ELSE ERASE THE LOCK
1224 0 00000986 5287                    ADDQ.L     #1,D7
1225 0 00000988 61001028                BSR        LWAIT 1227 0 0000098C 4287        LOKS1       CLR.L      D7                  RENEW ADDRESS
1228 0 0000098E 202E0068                MOVE.L     PARM(A6),D0         GET NEW LOCK
1229 0 00000992 3F00                    MOVE       D0,-(A7)            SAVE IT
1230 0 00000994 E048                    LSR        #8,D0               UPPER BYTE FIRST
1231 0 00000996 6100101A                BSR        LWAIT               INSTALL IT
1232 0 0000099A 5287                    ADDQ.L     #1,D7               LOWER BYTE NOW
1233 0 0000099C 301F                    MOVE       (A7)+,D0
1234 0 0000099E 61001012                BSR        LWAIT
1235 0 000009A2 086E000700C5            BCHG.B     #7,LOKOUT(A6)       CHANGE THE LOCKOUT FLAG
1236 0 000009A8 42AE0068                CLR.L      PARM(A6)            ERASE THE EVIDENCE
1237 0 000009AC 422E00C8                CLR.B      CMDFLG(A6)
1238 0 000009B0 4CDF2081                MOVEM.L    (A7)+,D0/D7/A5
1239 0 000009B4 4E75                    RTS

1241                                    *
1242                                    *          DATA PROCESSOR FOR THE BUILD ROUTINE
1243                                    *

1245 0 000009B6 4A2E00C4    BLD         TST.B      ENTERD(A6)          CHECK ENTRY ERROR
1246 0 000009BA 6700FEDA                BEQ        CCHKE
1247 0 000009BE 51EE00C4                SF         ENTERD(A6)          CONTINUE ON NO ERROR 1249 0 000009C2 4AAE0068                TST.L      PARM(A6)
1250 0 000009C6 660000A8                BNE        BLD02
1251 0 000009CA 4A2E00CC                TST.B      DPFLAG(A6)
1252 0 000009CE 6A0000A0                BPL        BLD02
1253 0 000009D2 422E00CC                CLR.B      DPFLAG(A6)
1254 0 000009D6 532E00CD                SUB.B      #1,STEPNO(A6)
1255 0 000009DA 6B00FED0                BMI        CCHK01
1256 0 000009DE 0C2E001E00CD            CMP.B      #30,STEPNO(A6)
1257 0 000009E4 6606                    BNE.S      BLDJ
1258 0 000009E6 1D7C001B00CD            MOVE.B     #27,STEPNO(A6)

1260 0 000009EC            BLDJ         PRINT3     STEPNO(A6),#6
1261 0 000009F4 4280                    CLR.L      D0
1262 0 000009F6 102E00CD                MOVE.B     STEPNO(A6),D0
1263 0 000009FA 1D4000C1                MOVE.B     D0,PARMNO(A6)
1264 0 000009FE 4BF900001AEE            LEA.L      MEMLIS,A5
1265 0 00000A04 10350000                MOVE.B     0(A5,D0),D0
1266 0 00000A08 6B12                    BMI.S      BLD050
1267 0 00000A0A 3D7600000070            MOVE       0(A6,D0),SAVPRM(A6)
1268 0 00000A10 61000446    BLD05       BSR        EDT26
```

```
1269 0 00000A14 1D6E00C100CD              MOVE.B   PARMNO(A6),STEPNO(A6)
1270 0 00000A1A 4E75                      RTS 1272 0 00000A1C 0240007F        BLD050    AND      #$7F,D0
1273 0 00000A20 08800006                  BCLR.L   #6,D0
1274 0 00000A24 660E                      BNE.S    BLD051
1275 0 00000A26 12360000                  MOVE.B   0(A6,D0),D1
1276 0 00000A2A 024100FF                  AND      #$FF,D1
1277 0 00000A2E 3D410070                  MOVE     D1,SAVPRM(A6)
1278 0 00000A32 60DC                      BRA.S    BLD05

1280 0 00000A34 0C2E000200CD    BLD051    CMP.B    #2,STEPNO(A6)
1281 0 00000A3A 6714                      BEQ.S    BLD052
1282 0 00000A3C 0C2E001300CD              CMP.B    #19,STEPNO(A6)
1283 0 00000A42 671C                      BEQ.S    BLD054
1284 0 00000A44 122E003A                  MOVE.B   FLAG(A6),D1
1285 0 00000A48 02410007                  AND      #7,D1
1286 0 00000A4C 6000FD3C                  BRA      NUM410

1288 0 00000A50 082E0007003A   BLD052     BTST.B   #7,FLAG(A6)
1289 0 00000A56 6604                      BNE.S    BLD053
1290 0 00000A58 F009                      DC.W     MSG49                 CUSTOM
1291 0 00000A5A 4E75                      RTS 1293 0 00000A5C F007           BLD053     DC.W     MSG47                 PROPORTIONAL
1294 0 00000A5E 4E75                      RTS 1296 0 00000A60 082E0006003A   BLD054     BTST.B   #6,FLAG(A6)
1297 0 00000A66 6604                      BNE.S    BLD055
1298 0 00000A68 F009                      DC.W     MSG49                 CUSTOM
1299 0 00000A6A 4E75                      RTS 1301 0 00000A6C F008           BLD055     DC.W     MSG48                 STANDARD
1302 0 00000A6E 4E75                      RTS 1304 0 00000A70 202E0068       BLD02      MOVE.L   PARM(A6),D0
1305 0 00000A74 1E2E00CD                  MOVE.B   STEPNO(A6),D7
1306 0 00000A78 024700FF                  AND      #$FF,D7
1307 0 00000A7C 0C070002                  CMP.B    #2,D7                 PROPORTIONAL STEP YET?
1308 0 00000A80 660C                      BNE.S    BLD07                 NO, THEN BRANCH
1309 0 00000A82 4A00                      TST.B    D0                    ELSE CHECK IF ANSWER YES
1310 0 00000A84 66000BB4                  BNE      PROP                  BRANCH IF SO
1311 0 00000A88 08AE0007003A              BCLR.B   #7,FLAG(A6)

1313 0 00000A8E 0C07000F       BLD07      CMP.B    #15,D7
1314 0 00000A92 6654                      BNE.S    BLD072
1315 0 00000A94 0C000003                  CMP.B    #3,D0
1316 0 00000A98 6604                      BNE.S    SKPAFP 1318 0 00000A9A 426E0006                  CLR      HFRONT(A6)
1319 0 00000A9E 4A00           SKPAFP     TST.B    D0
1320 0 00000AA0 6604                      BNE.S    BLD070
1321 0 00000AA2 F002                      DC.W     MSG42
1322 0 00000AA4 4E75                      RTS 1324 0 00000AA6 0C000007       BLD070     CMP.B    #7,D0
1325 0 00000AAA 6D04                      BLT.S    BLD071
1326 0 00000AAC F001                      DC.W     MSG41
1327 0 00000AAE 4E75                      RTS 1329 0 00000AB0 4E4F           BLD071     TRAP     #15
1330 0 00000AB2 4A2E00CA                  TST.B    ERROR(A6)
1331 0 00000AB6 6B000096                  BMI      BLD08
1332 0 00000ABA 4A2E00BC                  TST.B    WARN(A6)
1333 0 00000ABE 6B000094                  BMI      BLD080
1334 0 00000AC2 022E00C0003A              AND.B    #$C0,FLAG(A6)
1335 0 00000AC8 812E003A                  OR.B     D0,FLAG(A6)
1336 0 00000ACC 0C000004                  CMP.B    #4,D0
1337 0 00000AD0 6C50                      BGE.S    BLD078
1338 0 00000AD2 7E12                      MOVEQ    #18,D7
1339 0 00000AD4 1D7C0006001C  BLD079      MOVE.B   #6,VFP(A6)
1340 0 00000ADA 1D7C0006001D              MOVE.B   #6,VPOST(A6)
1341 0 00000AE0 3D7C0006001E              MOVE     #6,VSYNC(A6)
1342 0 00000AE6 603A                      BRA.S    BLD078

1344 0 00000AE8 0C070013       BLD072     CMP.B    #19,D7
1345 0 00000AEC 660E                      BNE.S    BLD073
1346 0 00000AEE 4A00                      TST.B    D0
1347 0 00000AF0 66000BAC                  BNE      PVID
1348 0 00000AF4 08AE0006003A              BCLR.B   #6,FLAG(A6)
1349 0 00000AFA 6026                      BRA.S    BLD078

1351 0 00000AFC 0C070010       BLD073     CMP.B    #16,D7
1352 0 00000B00 660E                      BNE.S    BLD074
1353 0 00000B02 4E4F                      TRAP     #15
1354 0 00000B04 4A2E00CA                  TST.B    ERROR(A6)
1355 0 00000B08 6B44                      BMI.S    BLD08
```

```
1356 0 00000B0A 1D40001C              MOVE.B    D0,VFP(A6)
1357 0 00000B0E 6060                  BRA.S     BLD06

1359 0 00000B10 0C070012    BLD074    CMP.B     #18,D7
1360 0 00000B14 660E                  BNE.S     BLD075
1361 0 00000B16 4E4F                  TRAP      #15
1362 0 00000B18 4A2E00CA              TST.B     ERROR(A6)
1363 0 00000B1C 6B30                  BMI.S     BLD08
1364 0 00000B1E 1D40001D              MOVE.B    D0,VPOST(A6)
1365 0 00000B22 604C        BLD078    BRA.S     BLD06

1367 0 00000B24 0C070021    BLD075    CMP.B     #33,D7
1368 0 00000B28 661C                  BNE.S     BLD01
1369 0 00000B2A 4A00                  TST.B     D0
1370 0 00000B2C 6604                  BNE.S     BLD076
1371 0 00000B2E F002                  DC.W      MSG42
1372 0 00000B30 4E75                  RTS 1374 0 00000B32 0C000045    BLD076    CMP.B     #69,D0
1375 0 00000B36 6504                  BLO.S     BLD077
1376 0 00000B38 F001                  DC.W      MSG41
1377 0 00000B3A 4E75                  RTS 1379 0 00000B3C 1D40003B    BLD077    MOVE.B    D0,FCODE(A6)
1380 0 00000B40 4E4D                  TRAP      #13
1381 0 00000B42 60000D6C              BRA       SAVIT 1383 0 00000B46 4E4F        BLD01     TRAP      #15              CHECK FOR PARAMETER ERROR
1384 0 00000B48 4A2E00CA              TST.B     ERROR(A6)
1385 0 00000B4C 670C                  BEQ.S     BLD03            BRANCH IF NO ERRORS 1387 0 00000B4E 422E00CA    BLD08     CLR.B     ERROR(A6)
1388 0 00000B52 4E75                  RTS                        ELSE GO TRY AGAIN
1389 0 00000B54 422E00BC    BLD080    CLR.B     WARN(A6)
1390 0 00000B58 4E75                  RTS 1392 0 00000B5A 202E0068    BLD03     MOVE.L    PARM(A6),D0
1393 0 00000B5E 4BF900001AEE          LEA.L     MEMLIS,A5
1394 0 00000B64 12357000               MOVE.B    0(A5,D7),D1
1395 0 00000B68 024100FF              AND       #$FF,D1
1396 0 00000B6C 3D801000              MOVE      D0,0(A6,D1)      SAVE VALID PARAMETER 1398 0 00000B70 5247        BLD06     ADDQ      #1,D7            UPDATE COUNTER
1399 0 00000B72 0C07001C              CMP.B     #28,D7
1400 0 00000B76 6602                  BNE.S     BLD060
1401 0 00000B78 7E1F                  MOVEQ     #31,D7

1403 0 00000B7A 1D4700CD    BLD060    MOVE.B    D7,STEPNO(A6)    UPDATE COUNT
1404 0 00000B7E 3007                  MOVE      D7,D0
1405 0 00000B80                       PRINT2    #4               DISPLAY IT
1406 0 00000B84 4E75                  RTS

1408                        *
1409                        *         PROCESS THE RECALL DATA
1410                        *

1412 0 00000B86 4A2E00C4    RECL      TST.B     ENTERD(A6)       CHECK INVALID ENTRY
1413 0 00000B8A 6700FD0A              BEQ       CCHKE
1414 0 00000B8E 51EE00C4              SF        ENTERD(A6)

1416 0 00000B92 202E0068              MOVE.L    PARM(A6),D0      GET RASTER NUMBER
1417 0 00000B96 6632                  BNE.S     RECL0            BRANCH IF NOT ZERO
1418 0 00000B98 4A2E00CC              TST.B     DPFLAG(A6)       ELSE CHECK FOR SUB COMMAND
1419 0 00000B9C 6A28                  BPL.S     RECL00           BRANCH IF NO
1420 0 00000B9E 61000CEA              BSR       PUSH
1421 0 00000BA2 51EE00CC              SF        DPFLAG(A6)
1422 0 00000BA6 1D7C000500C8          MOVE.B    #SERCMD,CMDFLG(A6)  SET TO SEARCH MODE
1423 0 00000BAC 422E00D3              CLR.B     SERFLG(A6)
1424 0 00000BB0 422E00CD              CLR.B     STEPNO(A6)
1425 0 00000BB4                       PRINT3    #0,#4
1426 0 00000BBC                       LAMPIT    #SRCHMK          ASK FOR NUMBER LINES
1427 0 00000BC4 4E75                  RTS 1429 0 00000BC6 F002        RECL00    DC.W      MSG42
1430 0 00000BC8 4E75                  RTS 1432 0 00000BCA 4A2E00CC    RECL0     TST.B     DPFLAG(A6)       CHECK FOR MODIFIED STEP
1433 0 00000BCE 6B4A                  BMI.S     RECL3            BRANCH IF YES 1435 0 00000BD0 3F00                  MOVE      D0,-(A7)         SAVE PARAMETER
1436 0 00000BD2 0C400063              CMP       #99,D0           CHECK IF DEFAULT
1437 0 00000BD6 670C                  BEQ.S     RECL02           BRANCH IF YES
1438 0 00000BD8 0C400044              CMP       #NORAST,D0       CHECK BEYOND THE RANGE
1439 0 00000BDC 6F0E                  BLE.S     RECL1            BRANCH IF NO
1440 0 00000BDE 4A5F                  TST       (A7)+            ELSE ERROR
```

```
1441 0 00000BE0 F001                       DC.W      MSG41
1442 0 00000BE2 4E75                       RTS 1444 0 00000BE4 227C000000C0    RECL02     MOVE.L    #DEFALT,A1        POINT AT DEFAULT VALUES
1445 0 00000BEA 6010                       BRA.S     RECL2

1447 0 00000BEC 5340            RECL1      SUBQ      #1,D0             ADJUST RASTER NUMBER
1448 0 00000BEE 227C00002700 0              MOVE.L    #PARMLS,A1        POINT AT EEPROM
1449 0 00000BF4 C0FC003C                   MULU      #60,D0            OFFSET TO NEW FORMAT
1450 0 00000BF8 43F10000                   LEA.L     0(A1,D0),A1

1452 0 00000BFC 301F            RECL2      MOVE      (A7)+,D0
1453 0 00000BFE B029003B                   CMP.B     FCODE(A1),D0      CHECK UNIMPLEMENTED RASTER LOC.
1454 0 00000C02 6704                       BEQ.S     RECL20            BRANCH IF OK
1455 0 00000C04 F005                       DC.W      MSG45             ELSE ERROR
1456 0 00000C06 4E75                       RTS 1458 0 00000C08 303C003B        RECL20     MOVE      #FCOD,D0
1459 0 00000C0C 204E                       MOVE.L    A6,A0

1461 0 00000C0E 10D9            RECLLP     MOVE.B    (A1)+,(A0)+       LOAD NEW RASTER FORMAT
1462 0 00000C10 51C8FFFC                   DBRA      D0,RECLLP 1464 0 00000C14 4E4D                       TRAP      #13               DO MEMORY CHANGES
1465 0 00000C16 6000FC9C                   BRA       DELCMD 1467 0 00000C1A 51EE00CC        RECL3      SF        DPFLAG(A6)        RESET DECIMAL FLAG
1468 0 00000C1E 61000C6A                   BSR       PUSH
1469 0 00000C22 1D7C000600C8               MOVE.B    #LISCMD,CMDFLG(A6) SHOW LIST COMMAND
1470 0 00000C28                            LAMPIT    #SRCHMK
1471 0 00000C30 487900027000               PEA.L     PARMLS            TOP OF LIST
1472 0 00000C36 2D5F003C                   MOVE.L    (A7)+,LISPTR(A6)  INIT LIST POINTER
1473 0 00000C3A 3D7C000100BA               MOVE      #1,TCODE(A6)      SET TO FIRST RASTER
1474 0 00000C40 600C                       BRA.S     LIST1

1476 0 00000C42 4A2E00C4        LIST       TST.B     ENTERD(A6)        CHECK FOR LOAD FLAG
1477 0 00000C46 67000088                   BEQ       LISLOD            BRANCH FOR LOAD
1478 0 00000C4A 51EE00C4                   SF        ENTERD(A6)

1480 0 00000C4E 226E003C        LIST1      MOVE.L    LISPTR(A6),A1     CURRENT POINTER
1481 0 00000C52 204E                       MOVE.L    A6,A0             FRAME POINTER 1483 0 00000C54 0C6E004500BA               CMP       #69,TCODE(A6)
1484 0 00000C5A 6778                       BEQ.S     LISDON            BRANCH IF FINISHED
1485 0 00000C5C 302E00BA                   MOVE      TCODE(A6),D0
1486 0 00000C60 B029003B                   CMP.B     FCODE(A1),D0      CHECK FOR NOT IMPLEMENTED
1487 0 00000C64 6742                       BEQ.S     LIST3             BRANCH IF IMPLEMENTED
1488 0 00000C66 48E781C0                   MOVEM.L   D0/D7/A0-A1,-(A7)
1489 0 00000C6A 41F90000 0CEA              LEA.L     NOTIMP,A0
1490 0 00000C70 43EE0054                   LEA.L     DISBUF(A6),A1
1491 0 00000C74 7E0F                       MOVEQ     #15,D7

1493 0 00000C76 12D8            LIST01     MOVE.B    (A0)+,(A1)+
1494 0 00000C78 51CFFFFC                   DBRA      D7,LIST01
1495 0 00000C7C 48C0                       EXT.L     D0
1496 0 00000C7E 6100046A                   BSR       UPACK
1497 0 00000C82 00403030                   OR        #$3030,D0
1498 0 00000C86 43EE0054                   LEA.L     DISBUF(A6),A1
1499 0 00000C8A 13400006                   MOVE.B    D0,6(A1)
1500 0 00000C8E E048                       LSR       #8,D0
1501 0 00000C90 0C000030                   CMP.B     #$30,D0
1502 0 00000C94 6704                       BEQ.S     LIST02
1503 0 00000C96 13400005                   MOVE.B    D0,5(A1)
1504 0 00000C9A                 LIST02     PRINT1
1505 0 00000CA2 4CDF0381                   MOVEM.L   (A7)+,D0/D7/A0-A1
1506 0 00000CA6 6016                       BRA.S     LIST5

1508 0 00000CA8 303C003B        LIST3      MOVE      #FCOD,D0

1510 0 00000CAC 10D9            LIST4      MOVE.B    (A1)+,(A0)+       LOAD IT
1511 0 00000CAE 51C8FFFC                   DBRA      D0,LIST4
1512 0 00000CB2 610002E6                   BSR       RATCAL            CALCULATE FIELD RATE
1513 0 00000CB6                            PRINT1

1515 0 00000CBE 526E00BA        LIST5      ADD       #1,TCODE(A6)      UPDATE RASTER
1516 0 00000CC2 06AE0000003C               ADD.L     #60,LISPTR(A6)    POINT TO NEW RASTER
              003C
1517 0 00000CCA 51EE00CC                   SF        DPFLAG(A6)
1518 0 00000CCE 4E75                       RTS 1520 0 00000CD0 4E4D            LISLOD     TRAP      #13               LOAD IT ACTIVE
1521 0 00000CD2 600E                       BRA.S     LSD1
```

```
1523 0 00000CD4 43F900001AA8 LISDON    LEA.L    LSTMSG,A1
1524 0 00000CDA 61000BC8               BSR      PULL 1526 0 00000CDE                        PRINT2   #0

1528 0 00000CE2 422E00D3      LSD1     CLR.B    SERFLG(A6)
1529 0 00000CE6 6000FBD8               BRA      DELCMD1

1531 0 00000CEA 524154452020  NOTIMP   DC.B     'RATE   NOT IMPL',0,0
1532 0 00000CFC 504152414D45  PRMMSG   DC.B     'PARAMETER?',0

1534                             *
1535                             *     PROCESS EDIT DATA
1536                             *

1538 0 00000D08 4A2E00CD      EDT      TST.B    STEPNO(A6)
1539 0 00000D0C 6658                   BNE.S    EDTS
1540 0 00000D0E 4A2E00C4               TST.B    ENTERD(A6)
1541 0 00000D12 6700FB82               BEQ      CCHKE
1542 0 00000D16 51EE00C4               SF       ENTERD(A6)

1544 0 00000D1A 202E0068               MOVE.L   PARM(A6),D0
1545 0 00000D1E 6740                   BEQ.S    EDT03
1546 0 00000D20 204E                   MOVE.L   A6,A0
1547 0 00000D22 0C400063               CMP      #99,D0
1548 0 00000D26 6608                   BNE.S    EDT00

1550 0 00000D28 227C000000C0           MOVE.L   #DEFALT,A1
1551 0 00000D2E 6026                   BRA.S    EDT01

1553 0 00000D30 0C400045      EDT00    CMP      #69,D0
1554 0 00000D34 6C000AD8               BGE      CHKER2
1555 0 00000D38 3F00                   MOVE     D0,-(A7)
1556 0 00000D3A 5340                   SUBQ     #1,D0
1557 0 00000D3C 227C00027000           MOVE.L   #PARMLS,A1
1558 0 00000D42 C0FC003C               MULU     #60,D0
1559 0 00000D46 43F10000               LEA.L    0(A1,D0),A1
1560 0 00000D4A 301F                   MOVE     (A7)+,D0
1561 0 00000D4C B029003B               CMP.B    FCODE(A1),D0     UN-INITIALIZED FORMAT LOCATION
1562 0 00000D50 6704                   BEQ.S    EDT01
1563 0 00000D52 F006                   DC.W     MSG46
1564 0 00000D54 4E75                   RTS 1566 0 00000D56 303C003B      EDT01    MOVE     #FCOD,D0

1568 0 00000D5A 10D9          EDT02    MOVE.B   (A1)+,(A0)+
1569 0 00000D5C 51C8FFFC               DBRA     D0,EDT02

1571 0 00000D60 1D7C000100CD  EDT03    MOVE.B   #1,STEPNO(A6)

1573 0 00000D66 0C2E000200CD  EDTS     CMP.B    #2,STEPNO(A6)
1574 0 00000D6C 671C                   BEQ.S    EDT20
1575 0 00000D6E 0C2E000300CD           CMP.B    #3,STEPNO(A6)
1576 0 00000D74 67000158               BEQ      EDT30

1578 0 00000D78 43FAFF82      EDT10    LEA.L    PRMMSG,A1
1579 0 00000D7C                        PRINT2   #0
1580 0 00000D80 522E00CD               ADD.B    #1,STEPNO(A6)
1581 0 00000D84 51EE00C6               SF       BITS(A6)
1582 0 00000D88 4E75                   RTS 1584 0 00000D8A 4A2E00C4      EDT20    TST.B    ENTERD(A6)
1585 0 00000D8E 6700FB06               BEQ      CCHKE
1586 0 00000D92 51EE00C4               SF       ENTERD(A6)

1588 0 00000D96 202E0068               MOVE.L   PARM(A6),D0
1589 0 00000D9A 67000B14               BEQ      SAVIT
1590 0 00000D9E 5340                   SUBQ     #1,D0

1592 0 00000DA0 0C40001B               CMP      #27,D0
1593 0 00000DA4 6F14                   BLE.S    EDT28
1594 0 00000DA6 0C00001F               CMP.B    #31,D0
1595 0 00000DAA 6C04                   BGE.S    EDT21
1596 0 00000DAC F006                   DC.W     MSG46
1597 0 00000DAE 4E75                   RTS 1599 0 00000DB0 0C400021      EDT21    CMP      #33,D0
1600 0 00000DB4 6F04                   BLE.S    EDT28

1602 0 00000DB6 F001                   DC.W     MSG41
1603 0 00000DB8 4E75                   RTS
```

```
1605 0 00000DBA 1D4000C1        EDT28    MOVE.B    D0,PARMNO(A6)       SAVE PARAMETER NUMBER
1606 0 00000DBE                          PRINT3    PARMNO(A6),#6
1607 0 00000DC6 4BF900001AEE              LEA.L    MEMLIS,A5
1608 0 00000DCC 10350000                  MOVE.B   0(A5,D0),D0         GET PARM TABLE OFFSET
1609 0 00000DD0 6B16                      BMI.S    BYTTYP              BRANCH IF BIT/BYTE TYPE
1610 0 00000DD2 41F60000                  LEA.L    0(A6,D0),A0         ELSE WORD TYPE
1611 0 00000DD6 2D48006C                  MOVE.L   A0,PRMADR(A6)       SAVE PARAMETER ADDRESS
1612 0 00000DDA 3D500070                  MOVE     (A0),SAVPRM(A6)     GET PARAMETER
1613 0 00000DDE                           PRINT3   PARMNO(A6),#6
1614 0 00000DE6 6070                      BRA.S    EDT26

1616 0 00000DE8 1D7C008000C6   BYTTYP    MOVE.B    #$80,BITS(A6)       SET TO BYTE TYPE
1617 0 00000DEE 0240007F                  AND      #$7F,D0             MASK BIT FLAGS
1618 0 00000DF2 08800006                  BCLR.L   #6,D0               CHECK FOR BIT TYPE
1619 0 00000DF6 6E10                      BNE.S    BITTYP              BRANCH IF SO
1620 0 00000DF8 41F60000                  LEA.L    0(A6,D0),A0         ELSE BYTE TYPE
1621 0 00000DFC 2D48006C                  MOVE.L   A0,PRMADR(A6)       SAVE PARAMETER ADDRESS
1622 0 00000E00 1010                      MOVE.B   (A0),D0             GET OLD PARAMETER
1623 0 00000E02 3D400070                  MOVE     D0,SAVPRM(A6)       SAVE IT
1624 0 00000E06 6050                      BRA.S    EDT26

1626             00000071       SAVPRS   EQU      SAVPRM+1

1628 0 00000E08 08EE00000OC6   BITTYP    BSET.B    #0,BITS(A6)         SET TO BIT TYPE
1629 0 00000E0E 1D7C000300CD              MOVE.B   #3,STEPNO(A6)
1630 0 00000E14 41F60000                  LEA.L    0(A6,D0),A0
1631 0 00000E18 2D48006C                  MOVE.L   A0,PRMADR(A6)
1632 0 00000E1C 1010                      MOVE.B   (A0),D0
1633 0 00000E1E 3D400070                  MOVE     D0,SAVPRM(A6)
1634 0 00000E22 0C2E000200C1              CMP.B    #2,PARMNO(A6)       PROP/CUST
1635 0 00000E28 6722                      BEQ.S    EDT24
1636 0 00000E2A 0C2E001300C1              CMP.B    #19,PARMNO(A6)      H PATT
1637 0 00000E30 670A                      BEQ.S    EDT22               ELSE SYNFRM
1638 0 00000E32 02400007                  AND      #7,D0
1639 0 00000E36 3200                      MOVE     D0,D1
1640 0 00000E38 6000F950                  BRA      NUM410

1642 0 00000E3C 082E00060071   EDT22     BTST.B    #6,SAVPRS(A6)
1643 0 00000E42 6604                      BNE.S    EDT23

1645 0 00000E44 F009           EDT220    DC.W      MSG49
1646 0 00000E46 4E75                      RTS 1648 0 00000E48 F008           EDT23     DC.W      MSG48
1649 0 00000E4A 4E75                      RTS 1651 0 00000E4C 082E00070071   EDT24     BTST.B    #7,SAVPRS(A6)
1652 0 00000E52 67F0                      BEQ.S    EDT220
1653 0 00000E54 F007                      DC.W     MSG47
1654 0 00000E56 4E75                      RTS 1656 0 00000E58 302E0070       EDT26     MOVE      SAVPRM(A6),D0

1658 0 00000E5C 6100F376                  BSR      BINDEC
1659 0 00000E60 45EE0060                  LEA.L    DISDTA(A6),A2
1660 0 00000E64 7403                      MOVEQ    #3,D2
1661 0 00000E66 51EE00D7                  SF       FCHAR(A6)
1662 0 00000E6A 4281                      CLR.L    D1

1664 0 00000E6C 6100024C       JUST10    BSR      ROT 1666 0 00000E70 6506           JUST12    BCS.S    JUST13
1667 0 00000E72 51CAFFF8                  DBRA     D2,JUST10
1668 0 00000E76 6010                      BRA.S    JUST20

1670 0 00000E78 14FC0020       JUST13    MOVE.B   #SPACE,(A2)+
1671 0 00000E7C 4281                      CLR.L    D1
1672 0 00000E7E 51CAFFEC                  DBRA     D2,JUST10
1673 0 00000E82 157C0030FFFF              MOVE.B   #'0',-1(A2)

1675 0 00000E88 51EE00D7       JUST20    SF       FCHAR(A6)
1676 0 00000E8C 102E00C1                  MOVE.B   PARMNO(A6),D0
1677 0 00000E90 6720                      BEQ.S    EDT27
1678 0 00000E92 0C000017                  CMP.B    #23,D0
1679 0 00000E96 6E1A                      BGT.S    EDT27
1680 0 00000E98 0C000002                  CMP.B    #2,D0
1681 0 00000E9C 6714                      BEQ.S    EDT27
1682 0 00000E9E 0C00000B                  CMP.B    #11,D0
1683 0 00000EA2 6D06                      BLT.S    JUST21
1684 0 00000EA4 0C000014                  CMP.B    #20,D0
1685 0 00000EA8 6D08                      BLT.S    EDT27

1687 0 00000EAA 00AE00008000   JUST21    OR.L     #$8000,DISDTA(A6)
                0060
```

```
1689 0 00000EB2                    EDT27   PRINT1
1690 0 00000EBA 1D7C000300CD               MOVE.B   #3,STEPNO(A6)
1691 0 00000EC0 4E75                       RTS 1693 0 00000EC2 51EE00CA           EDTE    SF       ERROR(A6)
1694 0 00000EC6 4E75                       RTS
1695 0 00000EC8 51EE00BC           EDTW    SF       WARN(A6)
1696 0 00000ECC 4E75                       RTS 1698 0 00000ECE 4A2E00C4           EDT30   TST.B    ENTERD(A6)
1699 0 00000ED2 6728                       BEQ.S    EDT31
1700 0 00000ED4 51EE00C4                   SF       ENTERD(A6)
1701 0 00000ED8 1E2E00C1                   MOVE.B   PARMNO(A6),D7
1702 0 00000EDC 4E4F                       TRAP     #15
1703 0 00000EDE 4A2E00CA                   TST.B    ERROR(A6)
1704 0 00000EE2 6BDE                       BMI.S    EDTE
1705 0 00000EE4 4A2E00BC                   TST.B    WARN(A6)
1706 0 00000EE8 6BDE                       BMI.S    EDTW 1708 0 00000EEA 206E006C           EDT32   MOVE.L   PRMADR(A6),A0
1709 0 00000EEE 202E0068                   MOVE.L   PARM(A6),D0
1710 0 00000EF2 4A2E00C6                   TST.B    BITS(A6)
1711 0 00000EF6 6B12                       BMI.S    EDT33
1712 0 00000EF8 3080                       MOVE     D0,(A0)

1714 0 00000EFA 4E4D               EDT320  TRAP     #13                    REDO MEMORY 1716 0 00000EFC 1D7C000100CD       EDT31   MOVE.B   #1,STEPNO(A6)
1717 0 00000F02 51EE00C4                   SF       ENTERD(A6)
1718 0 00000F06 6000FE70                   BRA      EDT10

1720 0 00000F0A 08AE000700C6       EDT33   BCLR.B   #7,BITS(A6)            CLEAR BIT/BYTE FLAG
1721 0 00000F10 08AE000000C6               BCLR.B   #0,BITS(A6)            CHECK FOR BIT TYPE
1722 0 00000F16 673E                       BEQ.S    EDT36                  BRANCH IF BYTE TYPE 1724 0 00000F18 0C2E000200C1               CMP.B    #2,PARMNO(A6)          ELSE BIT TYPE
1725 0 00000F1E 6716                       BEQ.S    EDT34
1726 0 00000F20 0C2E001300C1               CMP.B    #19,PARMNO(A6)
1727 0 00000F26 671E                       BEQ.S    EDT35
1728 0 00000F28 1010                       MOVE.B   (A0),D0
1729 0 00000F2A 024000C0                   AND      #$C0,D0
1730 0 00000F2E 80AE0068                   OR.L     PARM(A6),D0
1731 0 00000F32 1080                       MOVE.B   D0,(A0)
1732 0 00000F34 60C4                       BRA.S    EDT320

1734 0 00000F36 E248               EDT34   LSR      #1,D0
1735 0 00000F38 6406                       BCC.S    EDT340
1736 0 00000F3A 610006FE                   BSR      PROP
1737 0 00000F3E 60BA                       BRA.S    EDT320

1739 0 00000F40 08900007           EDT340  BCLR.B   #7,(A0)
1740 0 00000F44 60B6                       BRA.S    EDT31

1742 0 00000F46 E248               EDT35   LSR      #1,D0
1743 0 00000F48 6406                       BCC.S    EDT350
1744 0 00000F4A 61000752                   BSR      PVID
1745 0 00000F4E 60AA                       BRA.S    EDT320

1747 0 00000F50 08900006           EDT350  BCLR.B   #6,(A0)
1748 0 00000F54 60A6                       BRA.S    EDT31

1750 0 00000F56 0C2E001000C1       EDT36   CMP.B    #16,PARMNO(A6)
1751 0 00000F5C 6606                       BNE.S    EDT37
1752 0 00000F5E 1D40001C                   MOVE.B   D0,VFP(A6)
1753 0 00000F62 6096               EDT360  BRA.S    EDT320

1755 0 00000F64 0C2E001200C1       EDT37   CMP.B    #18,PARMNO(A6)
1756 0 00000F6A 6606                       BNE.S    EDT38
1757 0 00000F6C 1D40001D                   MOVE.B   D0,VPOST(A6)
1758 0 00000F70 60F0                       BRA.S    EDT360

1760 0 00000F72 1D40003B           EDT38   MOVE.B   D0,FCODE(A6)
1761 0 00000F76 60EA                       BRA.S    EDT360

1763                               *
1764                               *       DECPT--PROCESSES AN INCOMING DECIMAL
1765                               *       POINT FROM THE KEYBOARD AND TRACKS POSITION.
1766                               *
1767 0 00000F78 00AE00000080       DECPT   OR.L     #$80,DISDTA(A6)
              0060
```

```
1768 0 00000F80 1D7C008100CC           MOVE.B    ##81,DPFLAG(A6)
1769 0 00000F86 50EE00C4                ST       ENTERD(A6)
1770 0 00000F8A                         PRINT1
1771 0 00000F92 4E75                    RTS 1773 0 00000F94 5241544500    RATMSG   DC.B      'RATE',0

1775 0 00000F9A 48E7E0F0      RATCAL   MOVEM.L   D0-D2/A0-A3,-(A7)
1776 0 00000F9E 43FAFFF4               LEA.L     RATMSG,A1
1777 0 00000FA2                        PRINT2    #8
1778 0 00000FA6 43EE0054               LEA.L     DISBUF(A6),A1
1779 0 00000FAA 45E90005               LEA.L     5(A1),A2
1780 0 00000FAE 47E90008               LEA.L     8(A1),A3

1782 0 00000FB2 4280                   CLR.L     D0
1783 0 00000FB4 102E003B               MOVE.B    FCODE(A6),D0
1784 0 00000FB8 610000E8               BSR       ROTATE
1785 0 00000FBC 244B                   MOVE.L    A3,A2

1787 0 00000FBE 4280                   CLR.L     D0
1788 0 00000FC0 3016                   MOVE      NOLINE(A6),D0
1789 0 00000FC2 610000DE               BSR       ROTATE
1790 0 00000FC6 14FC002F               MOVE.B    #'/',(A2)+

1792 0 00000FCA 203C01312D00           MOVE.L    #DIVD,D0            GET DIVIDEND
1793 0 00000FD0 4281                   CLR.L     D1
1794 0 00000FD2 2401                   MOVE.L    D1,D2
1795 0 00000FD4 3416                   MOVE      NOLINE(A6),D2       NUMBER OF LINES
1796 0 00000FD6 80C2                   DIVU      D2,D0               FIRST TRIAL DIVIDE
1797 0 00000FD8 6820                   BVC.S     RAT0                CHECK FOR OVERFLOW 1799 0 00000FDA C4FC000A               MULU      #10,D2              ADJUST FOR OVERFLOW
1800 0 00000FDE 80C2                   DIVU      D2,D0               TRY AGAIN
1801 0 00000FE0 3F00                   MOVE      D0,-(A7)            SAVE FIRST QUOTIENT
1802 0 00000FE2 4240                   CLR       D0
1803 0 00000FE4 4840                   SWAP      D0                  REMAINDER TO LOWER WORD
1804 0 00000FE6 C0FC000A               MULU      #10,D0              ADJUST REMAINDER
1805 0 00000FEA 80D6                   DIVU      NOLINE(A6),D0
1806 0 00000FEC 3800                   MOVE      D0,D4               SAVE REMAINDER
1807 0 00000FEE 4280                   CLR.L     D0
1808 0 00000FF0 301F                   MOVE      (A7)+,D0            RESTORE FIRST QUOTIENT
1809 0 00000FF2 C0FC000A               MULU      #10,D0              ADJUST FOR TENTHS
1810 0 00000FF6 D044                   ADD       D4,D0               ADD TENTHS
1811 0 00000FF8 6014                   BRA.S     RAT1

1813 0 00000FFA 2600          RAT0     MOVE.L    D0,D3
1814 0 00000FFC 02800000FFFF           AND.L     #$FFFF,D0           CLEAR OUT REMAINDER
1815 0 00001002 4243                   CLR       D3
1816 0 00001004 4843                   SWAP      D3                  GET REMAINDER
1817 0 00001006 E34B                   LSL       #1,D3               CHECK FOR HALF VALUE
1818 0 00001008 B656                   CMP       NOLINE(A6),D3
1819 0 0000100A 6D02                   BLT.S     RAT1                BRANCH LESS THAN HALF
1820 0 0000100C 5240                   ADDQ      #1,D0               ADJUST QUOTIENT BY ONE 1822 0 0000100E 342E0002      RAT1     MOVE      HLINE(A6),D2        HOR. LINE TIME 2ND DIVISOR
1823 0 00001012 80C2                   DIVU      D2,D0
1824 0 00001014 2600                   MOVE.L    D0,D3
1825 0 00001016 02800000FFFF           AND.L     #$FFFF,D0           CLEAR REMAINDER
1826 0 0000101C 0C4003E7               CMP       #999,D0             CHECK OUT OF RANGE
1827 0 00001020 6E6E                   BGT.S     ASTER               BRANCH IF YES
1828 0 00001022 0C400099               CMP       ##99,D0             CHECK FOR SHORT ROOM
1829 0 00001026 6E70                   BGT.S     NODEC               IF YES ROUND OFF 1831 0 00001028 4243                   CLR       D3                  CLEAR REMAINDER
1832 0 0000102A 4843                   SWAP      D3
1833 0 0000102C C6FC0064               MULU      #100,D3             ADJUST FOR HUNDREDTHS
1834 0 00001030 86EE0002               DIVU      HLINE(A6),D3
1835 0 00001034 02830000FFFF           AND.L     #$FFFF,D3           CLEAR OUT REMAINDER
1836 0 0000103A 3F00                   MOVE      D0,-(A7)            SAVE FINAL QUOTIENT
1837 0 0000103C 3003                   MOVE      D3,D0
1838 0 0000103E 6100F194               BSR       BINDEC              CONVERT TO DECIMAL
1839 0 00001042 3200                   MOVE      D0,D1               TWO COPIES
1840 0 00001044 0241000F               AND       ##$0F,D1            MASK ALL EXCEPT HUNDREDTHS
1841 0 00001048 0C010005               CMP.B     #5,D1               GREATER THAN HALF?
1842 0 0000104C 6D04                   BLT.S     RAT2                NO, BRANCH
1843 0 0000104E 06400010               ADD       ##10,D0             ADJUST FOR IT 1845 0 00001052 E848          RAT2     LSR       #4,D0               ADJUST TO TENTHS
1846 0 00001054 3200                   MOVE      D0,D1               TWO COPIES
1847 0 00001056 0241000F               AND       ##$0F,D1            MASK IT
1848 0 0000105A 4280                   CLR.L     D0
1849 0 0000105C 0C01000A               CMP.B     #10,D1              CHECK OVERFLOW
1850 0 00001060 6D02                   BLT.S     RAT3
1851 0 00001062 720A                   MOVEQ.L   #10,D1              ADJUST OVERFLOW 1853 0 00001064 301F          RAT3     MOVE      (A7)+,D0            GET QUOTIENT
1854 0 00001066 C0FC000A               MULU      #10,D0              ADJUST FOR TENTHS
1855 0 0000106A D041                   ADD       D1,D0               PUT IN TENTHS
```

```
1856 0 0000106C 6100F166              BSR       BINDEC              BCD IT
1857 0 00001070 2200                  MOVE.L    D0,D1               TWO COPIES
1858 0 00001072 E049                  LSR       #8,D1
1859 0 00001074 670C                  BEQ.S     TWOLAB              CHECK FOR SMALL NUMBER
1860 0 00001076 6176                  BSR.S     UNPACK              STRETCH IT .
1861 0 00001078 008000030B030         OR.L      #$30B030,D0         ASCIT
1862 0 0000107E 60000094              BRA       STUFIT              GO PUT IT IN 1864 0 00001082 616A        TWOLAB    BSR.S     UNPACK
1865 0 00001084 E188                  LSL.L     #8,D0
1866 0 00001086 0080000B03020         OR.L      #$B03020,D0         ASCIT
1867 0 0000108C 60000086              BRA       STUFIT 1869 0 00001090 203C002A2A2A ASTER    MOVE.L    #$2A2A2A,D0         FILL WITH ASTERISKS
1870 0 00001096 607C                  BRA.S     STUFIT 1872 0 00001098 6150        NODEC     BSR.S     UPACK
1873 0 0000109A 008000303030          OR.L      #$303030,D0
1874 0 000010A0 6072                  BRA.S     STUFIT 1876 0 000010A2 6100F130    ROTATE    BSR       BINDEC 1878 0 000010A6 7403                  MOVEQ     #3,D2
1879 0 000010A8 51EE00D7              SF        FCHAR(A6)
1880 0 000010AC 4281                  CLR.L     D1

1882 0 000010AE 610A        RTLP      BSR.S     ROT
1883 0 000010B0 51CAFFFC              DBRA      D2,RTLP
1884 0 000010B4 51EE00D7              SF        FCHAR(A6)
1885 0 000010B8 4E75                  RTS 1887 0 000010BA E348        ROT       LSL       #1,D0
1888 0 000010BC E351                  ROXL      #1,D1
1889 0 000010BE E348                  LSL       #1,D0
1890 0 000010C0 E351                  ROXL      #1,D1
1891 0 000010C2 E348                  LSL       #1,D0
1892 0 000010C4 E351                  ROXL      #1,D1
1893 0 000010C6 E348                  LSL       #1,D0
1894 0 000010C8 E351                  ROXL      #1,D1
1895 0 000010CA 4A2E00D7              TST.B     FCHAR(A6)
1896 0 000010CE 6B04                  BMI.S     ROT1
1897 0 000010D0 4A01                  TST.B     D1
1898 0 000010D2 670E                  BEQ.S     ROT2

1900 0 000010D4 00010030    ROT1      OR.B      #'0',D1
1901 0 000010D8 50EE00D7              ST        FCHAR(A6)
1902 0 000010DC 14C1                  MOVE.B    D1,(A2)+
1903 0 000010DE 4281                  CLR.L     D1
1904 0 000010E0 4E75                  RTS 1906 0 000010E2 4281        ROT2      CLR.L     D1
1907 0 000010E4 44FC0001              MOVE      #1,CCR
1908 0 000010E8 4E75                  RTS 1910 0 000010EA 6100F0E8    UPACK     BSR       BINDEC 1912 0 000010EE 48E76000    UNPACK    MOVEM.L   D1-D2,-(A7)
1913 0 000010F2 7403                  MOVEQ     #3,D2
1914 0 000010F4 4281                  CLR.L     D1
1916 0 000010F6 E248        UPLOOP    LSR       #1,D0
1917 0 000010F8 E291                  ROXR.L    #1,D1
1918 0 000010FA E248                  LSR       #1,D0
1919 0 000010FC E291                  ROXR.L    #1,D1
1920 0 000010FE E248                  LSR       #1,D0
1921 0 00001100 E291                  ROXR.L    #1,D1
1922 0 00001102 E248                  LSR       #1,D0
1923 0 00001104 E291                  ROXR.L    #1,D1
1924 0 00001106 E889                  LSR.L     #4,D1
1925 0 00001108 51CAFFEC              DBRA      D2,UPLOOP 1927 0 0000110C 2001                  MOVE.L    D1,D0
1928 0 0000110E 4CDF0006              MOVEM.L   (A7)+,D1-D2
1929 0 00001112 4E75                  RTS 1931 0 00001114 15400002    STUFIT    MOVE.B    D0,2(A2)            LOAD IT
1932 0 00001118 E088                  LSR.L     #8,D0               BYTE TWO
1933 0 0000111A 15400001              MOVE.B    D0,1(A2)            LOAD IT
1934 0 0000111E E088                  LSR.L     #8,D0
```

```
1935 0 00001120 1480                    MOVE.B    D0,(A2)              LOAD LAST ONE
1936 0 00001122 4CDF0F07                MOVEM.L   (A7)+,D0-D2/A0-A3
1937 0 00001126 4E75                    RTS 1939 0 00001128 41F900026000  PROC      LEA.L     PIT,A0
1940 0 0000112E 022800FC0012            AND.B     #$FC,PBDATA(A0)
1941 0 00001134 227C00005000            MOVE.L    #FRAME,A1                TEMP FORMAT FRAME
1942 0 0000113A 323C0FFF                MOVE      #$0FFF,D1
1943 0 0000113E 1001                    MOVE.B    D1,D0
1944 0 00001140 6100043A                BSR       MBLANK
1945 0 00001144 51EE00BD                SF        MILFLG(A6)
1946 0 00001148 4A6E0006                TST       HFRONT(A6)
1947 0 0000114C 6608                    BNE.S     SKMIL
1948 0 0000114E 50EE00BD                ST        MILFLG(A6)
1949 0 00001152 50EE00BD                ST        MILFLG(A6)

1951                          *
1952                          *         DO END OF LINE
1953                          *
1954 0 00001156 322E0002      SKMIL     MOVE      HLINE(A6),D1
1955 0 0000115A                         SHUFL
1956 0 0000115E 45F11000                LEA.L     0(A1,D1),A2
1957 0 00001162 022A007FFFFF            AND.B     #EOL,-1(A2)
1958 0 00001168 2D4A004C                MOVE.L    A2,EOLADR(A6)
1959                          *
1960                          *         DO HORIZONTAL DRIVE
1961                          *
1962 0 0000116C 322E000E                MOVE      HDRIV(A6),D1
1963 0 00001170                         SHUFL
1964 0 00001174 103C00FD                MOVE.B    #HDR,D0
1965 0 00001178 61000412                BSR       MAND
1966                          *
1967                          *         DO HORIZONTAL BLANKING
1968                          *
1969 0 0000117C 322E0004                MOVE      HBLANK(A6),D1
1970 0 00001180                         SHUFL
1971 0 00001184 103C00FE                MOVE.B    #HBL,D0
1972 0 00001188 61000402                BSR       MAND
1973                          *
1974                          *         CALCULATE ACTIVE LINE START
1975                          *
1976 0 0000118C 45F11001                LEA.L     1(A1,D1),A2
1977 0 00001190 2D4A0050                MOVE.L    A2,ACTSTR(A6)
1978                          *
1979                          *         DO 40H CLOCK
1980                          *
1981 0 00001194 4CFA002FEED4            MOVEM.L   ZERO,D0-D3/D5
1982 0 0000119A 302E0002                MOVE      HLINE(A6),D0
1983 0 0000119E 906E0004                SUB       HBLANK(A6),D0
1984 0 000011A2 E348                    LSL       #1,D0
1985 0 000011A4 3A00                    MOVE      D0,D5
1986 0 000011A6 E348                    LSL       #1,D0
1987 0 000011A8 80FC0021                DIVU      #$21,D0
1988 0 000011AC 02800000FFFF            AND.L     #$FFFF,D0
1989 0 000011B2 3600                    MOVE      D0,D3                  D3=SPACING
1990 0 000011B4 C0FC0010                MULU      #$10,D0
1991 0 000011B8 9A40                    SUB       D0,D5
1992 0 000011BA E24D                    LSR       #1,D5                  D5=POSITION
1993 0 000011BC 3403                    MOVE      D3,D2
1994 0 000011BE E24A                    LSR       #1,D2
1995 0 000011C0 3202                    MOVE      D2,D1
1996 0 000011C2 E249                    LSR       #1,D1
1997 0 000011C4 103C00EF                MOVE.B    #C40,D0
1998 0 000011C8 4879000011FA            PEA.L     PROC0

2000 0 000011CE 226E0050      DOCLKS    MOVE.L    ACTSTR(A6),A1          START OF ACTIVE LINE
2001 0 000011D2 43F15000                LEA.L     0(A1,D5),A1

2003 0 000011D6 B3EE004C      DC1       CMPA.L    EOLADR(A6),A1          CHECK IF BEYOND EOL
2004 0 000011DA 621C                    BHI.S     DC2
2005 0 000011DC 610003AE                BSR       MAND
2006 0 000011E0 2A49                    MOVE.L    A1,A5
2007 0 000011E2 43F12000                LEA.L     0(A1,D2),A1            ADD HALF SPACING 2009 0 000011E6 B3EE004C                CMPA.L    EOLADR(A6),A1
2010 0 000011EA 620C                    BHI.S     DC2
2011 0 000011EC 6100039E                BSR       MAND
2012 0 000011F0 224D                    MOVE.L    A5,A1
2013 0 000011F2 43F13000                LEA.L     0(A1,D3),A1            ADD FULL SPACING
2014 0 000011F6 60DE                    BRA.S     DC1
2016 0 000011F8 4E75          DC2       RTS

2018                          *
2019                          *         DO FIRST SERRATION HALF
2020                          *
```

```
2022 0 000011FA 43F85000    PROC0   LEA.L    FRAME,A1
2023 0 000011FE 322E0006            MOVE     HFRONT(A6),D1
2024 0 00001202 E349                LSL      #1,D1
2025 0 00001204 3F01                MOVE     D1,-(A7)
2026 0 00001206 5341                SUBQ     #1,D1
2027 0 00001208 6B12                BMI.S    PROC1
2028 0 0000120A 4A2E00BD            TST.B    MILFLG(A6)
2029 0 0000120E 6704                BEQ.S    PROC01
2030 0 00001210 4257                CLR      (A7)
2031 0 00001212 6008                BRA.S    PROC1

2033 0 00001214 103C00DF    PROC01  MOVE.B   #HS2,D0
2034 0 00001218 61000372            BSR      MAND

2036                        *
2037                        *       DO FIRST EQUALIZING
2038                        *

2040 0 0000121C 321F        PROC1   MOVE     (A7)+,D1
2041 0 0000121E 43F11000            LEA.L    0(A1,D1),A1
2042 0 00001222 2F09                MOVE.L   A1,-(A7)
2043 0 00001224 322E000C            MOVE     EQUAL(A6),D1
2044 0 00001228                     SHUFL
2045 0 0000122C 103C00BF            MOVE.B   #HE2,D0
2046 0 00001230 6100035A            BSR      MAND

2048                        *
2049                        *       DO SECOND EQUALIZING
2050                        *

2052 0 00001234 4283                CLR.L    D3
2053 0 00001236 362E0002            MOVE     HLINE(A6),D3
2054 0 0000123A D3C3                ADD.L    D3,A1
2055 0 0000123C 6100034E            BSR      MAND

2057                        *
2058                        *       DO SECOND SERRATION
2059                        *

2061 0 00001240 4A2E00BD            TST.B    MILFLG(A6)
2062 0 00001244 6B14                BMI.S    PROC11
2063 0 00001246 4281                CLR.L    D1
2064 0 00001248 322E000A            MOVE     SERR(A6),D1
2065 0 0000124C                     SHUFL
2066 0 00001250 93C1                SUB.L    D1,A1
2067 0 00001252 103C00DF            MOVE.B   #HS2,D0
2068 0 00001256 61000334            BSR      MAND

2070                        *
2071                        *       DO LAST HALF FIRST SERRATION
2072                        *

2074 0 0000125A 5343        PROC11  SUBQ     #1,D3
2075 0 0000125C D3C3                ADD.L    D3,A1
2076 0 0000125E 4A2E00BD            TST.B    MILFLG(A6)
2077 0 00001262 6B0C                BMI.S    PROC10
2078 0 00001264 362E0006            MOVE     HFRONT(A6),D3
2079 0 00001268 E34B                LSL      #1,D3
2080 0 0000126A 9243                SUB      D3,D1
2081 0 0000126C 6100031E            BSR      MAND

2083                        *
2084                        *       DO H SYNC
2085                        *

2087 0 00001270 225F        PROC10  MOVE.L   (A7)+,A1
2088 0 00001272 322E0008            MOVE     HSYNC(A6),D1
2089 0 00001276                     SHUFL
2090 0 0000127A 103C00FB            MOVE.B   #HSY,D0
2091 0 0000127E 6100030C            BSR      MAND

2093                        *
2094                        *       DO H TRIGGER
2095                        *

2097 0 00001282 43F85000            LEA.L    FRAME,A1
2098 0 00001286 322E0010            MOVE     HTRIGP(A6),D1
2099 0 0000128A E349                LSL      #1,D1
2100 0 0000128C 43F11000            LEA.L    0(A1,D1),A1
2101 0 00001290 342E0012            MOVE     HTRIGW(A6),D2
2102 0 00001294 6732                BEQ.S    PROCH1D
2103 0 00001296 E34A                LSL      #1,D2
2104 0 00001298 5342                SUBQ     #1,D2
2105 0 0000129A 4281                CLR.L    D1
2106 0 0000129C 103C00F7            MOVE.B   #HTR,D0

2108 0 000012A0 610002EA    PROC3   BSR      MAND
2109 0 000012A4 B3EE004C            CMPA.L   EOLADR(A6),A1
```

```
2110 0 000012A8 6E0A                           BGT.S    PROC4
2111 0 000012AA 43E90001                       LEA.L    1(A1),A1
2112 0 000012AE 51CAFFF0                       DBRA     D2,PROC3
2113 0 000012B2 6014                           BRA.S    PROCH1D 2115 0 000012B4 43F85000        PROC4          LEA.L    FRAME,A1
2116 0 000012B8 5341                           SUBQ     #1,D1
2117 0 000012BA 6B0C                           BMI.S    PROCH1D 2119 0 000012BC 610002CE        PROC5          BSR      MAND
2120 0 000012C0 43E90001                       LEA.L    1(A1),A1
2121 0 000012C4 51C9FFF6                       DBRA     D1,PROC5

2123 0 000012C8 227C00005000    PROCH1D        MOVE.L   #FRAME,A1
2124 0 000012CE 247C00020000                   MOVE.L   #HORIZ,A2

2126 0 000012D4 4A2E00BD                       TST.B    MILFLG(A6)
2127 0 000012D8 6712                           BEQ.S    PROC12
2128 0 000012DA 322E0002                       MOVE     HLINE(A6),D1
2129 0 000012DE 023100DF10FE                   AND.B    #HS2,-2(A1,D1)
2130 0 000012E4 E349                           LSL      #1,D1
2131 0 000012E6 023100DF10FE                   AND.B    #HS2,-2(A1,D1)

2133 0 000012EC 610002B6        PROC12         BSR      LDSYN 2135 0 000012F0 227C00005000                   MOVE.L   #FRAME,A1
2136 0 000012F6 323C0FFF                       MOVE     #$0FFF,D1
2137 0 000012FA 1001                           MOVE.B   D1,D0
2138 0 000012FC 6100027E                       BSR      MBLANK

2140                            *
2141                            *
2142                            *              DO 2H COUNT
2143 0 00001300 43F85000                       LEA.L    FRAME,A1
2144 0 00001304 322E0002                       MOVE     HLINE(A6),D1
2145 0 00001308 023100FE10FF                   AND.B    #HC2,-1(A1,D1)
2146 0 0000130E E349            PROC6          LSL      #1,D1
2147 0 00001310 023100FE10FF                   AND.B    #HC2,-1(A1,D1)
2148                            *
2149                            *              DO V BARS
2150                            *
2151 0 00001316 326E0050                       MOVE     ACTSTR(A6),A1
2152 0 0000131A 3A2E0020                       MOVE     VBARP(A6),D5
2153 0 0000131E E34D                           LSL      #1,D5

2155 0 00001320 342E0022                       MOVE     VBARS(A6),D2
2156 0 00001324 3602                           MOVE     D2,D3
2157 0 00001326 E34B                           LSL      #1,D3
2158 0 00001328 4281                           CLR.L    D1
2159 0 0000132A 103C00FD                       MOVE.B   #VBC,D0
2160 0 0000132E 6100FE9E                       BSR      DOCLKS
2161                            *
2162                            *              DO HGATE
2163                            *
2164 0 00001332 4E71                           NOP
2165                            *
2166                            *              DO H WINDOW
2167                            *
2168 0 00001334 226E0050                       MOVE.L   ACTSTR(A6),A1
2169 0 00001338 322E0024                       MOVE     HWINS(A6),D1
2170 0 0000133C                                SHUFL
2171 0 00001340 3401                           MOVE     D1,D2
2172 0 00001342 43F11001                       LEA.L    1(A1,D1),A1
2173 0 00001346 322E0026                       MOVE     HWINE(A6),D1
2174 0 0000134A                                SHUFL
2175 0 0000134E 9242                           SUB      D2,D1
2176 0 00001350 5241                           ADDQ     #1,D1
2177 0 00001352 103C00F7                       MOVE.B   #HWIN,D0
2178 0 00001356 61000234                       BSR      MAND 2180 0 0000135A 227C00005000                   MOVE.L   #FRAME,A1
2181 0 00001360 247C00021000                   MOVE.L   #HORIZU,A2
2182 0 00001366 6100023C                       BSR      LDSYN 2184 0 0000136A 227C00005000    PROCV          MOVE.L   #FRAME,A1
2185 0 00001370 323C0FFF                       MOVE     #$0FFF,D1
2186 0 00001374 1001                           MOVE.B   D1,D0
2187 0 00001376 61000204                       BSR      MBLANK

2189                            *
2190                            *              DO VERTICAL BLANKING
2191                            *
```

```
2192 0 0000137A 322E0014           MOVE    VBLANK(A6),D1
2193 0 0000137E 5341               SUBQ    #1,D1
2194 0 00001380 103C00FE           MOVE.B  #VBL,D0
2195 0 00001384 61000206           BSR     MAND
2196 0 00001388 45F11001           LEA.L   1(A1,D1),A2         SAVE END OF BLANKING
2197                          *
2198                          *    DO VERTICAL DRIVE
2199                          *
2200 0 0000138C 322E0016           MOVE    VDRIV(A6),D1
2201 0 00001390 5341               SUBQ    #1,D1
2202 0 00001392 103C00FD           MOVE.B  #VDR,D0
2203 0 00001396 610001F4           BSR     MAND
2204                          *
2205                          *    DO VERTICAL FRONT PORCH
2206                          *
2207 0 0000139A 2F09               MOVE.L  A1,-(A7)
2208 0 0000139C 4281               CLR.L   D1
2209 0 0000139E 122E001C           MOVE.B  VFP(A6),D1
2210 0 000013A2 5341               SUBQ    #1,D1
2211 0 000013A4 4A2E00BD           TST.B   MILFLG(A6)
2212 0 000013A8 6B40               BMI.S   MILV
2213 0 000013AA 303C00EF           MOVE    #LIN3,D0
2214 0 000013AE 610001DC           BSR     MAND
2215                          *
2216                          *    DO VERTICAL SYNC
2217                          *
2218 0 000013B2 43F11001           LEA.L   1(A1,D1),A1
2219 0 000013B6 322E001E           MOVE    VSYNC(A6),D1
2220 0 000013BA 5341               SUBQ    #1,D1
2221 0 000013BC 6B08               BMI.S   PRCV10
2222 0 000013BE 103C00DF           MOVE.B  #VSY,D0
2223 0 000013C2 610001C8           BSR     MAND
2224                          *
2225                          *    DO VERTICAL POST
2226                          *
2227 0 000013C6 2257     PRCV10    MOVE.L  (A7),A1
2228 0 000013C8 4281               CLR.L   D1
2229 0 000013CA 4287               CLR.L   D7
2230 0 000013CC 122E001D           MOVE.B  VPOST(A6),D1
2231 0 000013D0 1E2E001C           MOVE.B  VFP(A6),D7
2232 0 000013D4 D247               ADD     D7,D1
2233 0 000013D6 D26E001E           ADD     VSYNC(A6),D1
2234 0 000013DA 5341               SUBQ    #1,D1
2235 0 000013DC 6B08               BMI.S   PRCV13
2236 0 000013DE 303C00BF           MOVE    #LIN9,D0
2237 0 000013E2 610001A8           BSR     MAND
2238 0 000013E6 6000008A PRCV13    BRA     PRCV11

2240 0 000013EA 5341     MILV      SUBQ    #1,D1
2241 0 000013EC 303C00EF           MOVE    #LIN3,D0
2242 0 000013F0 6100019A           BSR     MAND 2244 0 000013F4 3A16               MOVE    NOLINE(A6),D5
2245 0 000013F6 023100EF50FF       AND.B   #LIN3,-1(A1,D5)
2246 0 000013FC 023100BF50FF       AND.B   #LIN9,-1(A1,D5)

2248                          *
2249                          *    DO VERTICAL SYNC
2250                          *

2252 0 00001402 43F11001           LEA.L   1(A1,D1),A1
2253 0 00001406 322E001E           MOVE    VSYNC(A6),D1
2254 0 0000140A 303C00DF           MOVE    #VSY,D0
2255 0 0000140E 6100017C           BSR     MAND

2257                          *
2258                          *    DO VERTICAL POST
2259                          *

2261 0 00001412 2257               MOVE.L  (A7),A1
2262 0 00001414 4CFA0082EC54       MOVEM.L ZERO,D1/D7
2263 0 0000141A 122E001D           MOVE.B  VPOST(A6),D1
2264 0 0000141E 1E2E001C           MOVE.B  VFP(A6),D7
2265 0 00001422 D26E001E           ADD     VSYNC(A6),D1
2266 0 00001426 D247               ADD     D7,D1
2267 0 00001428 5541               SUBQ    #2,D1
2268 0 0000142A 303C00BF           MOVE    #LIN9,D0
2269 0 0000142E 6100015C           BSR     MAND

2271                          *
2272                          *    DO VERTICAL TRIGGER
2273                          *

2275 0 00001432 49F15000           LEA.L   0(A1,D5),A4
2276 0 00001436 322E0018           MOVE    VTRIGP(A6),D1
2277 0 0000143A 6610               BNE.S   MILV10
2278 0 0000143C 0231007F50FF       AND.B   #VTR,-1(A1,D5)
2279 0 00001442 342E001A           MOVE    VTRIGW(A6),D2
2280 0 00001446 672A               BEQ.S   PRCV11
2281 0 00001448 5542               SUBQ    #2,D2
2282 0 0000144A 600A               BRA.S   MILV20
```

```
2284 0 0000144C 5341              MILV10    SUBQ      #1,D1
2285 0 0000144E 342E001A                    MOVE      VTRIGW(A6),D2
2286 0 00001452 671E                        BEQ.S     PRCV11
2287 0 00001454 5342                        SUBQ      #1,D2

2289 0 00001456 43F11000          MILV20    LEA.L     0(A1,D1),A1
2290 0 0000145A 303C007F                    MOVE      #VTR,D0
2291 0 0000145E 4281                        CLR.L     D1

2293 0 00001460 B9C9              MILV30    CMPA.L    A1,A4
2294 0 00001462 6A02                        BPL.S     MILV31
2295 0 00001464 2257                        MOVE.L    (A7),A1

2297 0 00001466 61000124          MILV31    BSR       MAND
2298 0 0000146A 43E90001                    LEA.L     1(A1),A1
2299 0 0000146E 51CAFFF0                    DBRA      D2,MILV30

2301                                *
2302                                *       DO VERTICAL WINDOW
2303                                *

2305 0 00001472 342E002C          PRCV11    MOVE      VWINS(A6),D2
2306 0 00001476 43F22000                    LEA.L     0(A2,D2),A1
2307 0 0000147A 322E002E                    MOVE      VWINE(A6),D1
2308 0 0000147E 9242                        SUB       D2,D1
2309 0 00001480 103C00FB                    MOVE.B    #VWIN,D0
2310 0 00001484 61000106                    BSR       MAND
2311                                *
2312                                *       DO VERTICAL TRIGGER
2313                                *
2314 0 00001488 4A2E00BD                    TST.B     MILFLG(A6)
2315 0 0000148C 6B30                        BMI.S     PRCV12
2316 0 0000148E 2257                        MOVE.L    (A7),A1
2317 0 00001490 3216                        MOVE      NOLINE(A6),D1
2318 0 00001492 49F11000                    LEA.L     0(A1,D1),A4
2319 0 00001496 322E0018                    MOVE      VTRIGP(A6),D1
2320 0 0000149A 43F11000                    LEA.L     0(A1,D1),A1
2321 0 0000149E 342E001A                    MOVE      VTRIGW(A6),D2
2322 0 000014A2 671A                        BEQ.S     PRCV12
2323 0 000014A4 5342                        SUBQ      #1,D2
2324 0 000014A6 103C007F                    MOVE.B    #VTR,D0
2325 0 000014AA 4281                        CLR.L     D1

2327 0 000014AC B9C9              PROCV4    CMPA.L    A1,A4
2328 0 000014AE 6A02                        BPL.S     PROCV5

2330 0 000014B0 2257                        MOVE.L    (A7),A1

2332 0 000014B2 610000D8          PROCV5    BSR       MAND
2333 0 000014B6 43E90001                    LEA.L     1(A1),A1
2334 0 000014BA 51CAFFF0                    DBRA      D2,PROCV4

2336 0 000014BE 225F              PRCV12    MOVE.L    (A7)+,A1
2337 0 000014C0 3216                        MOVE      NOLINE(A6),D1
2338 0 000014C2 023100F710FE                AND.B     #EOF,-2(A1,D1)
2339 0 000014C8 47F11000                    LEA.L     0(A1,D1),A3
2340 0 000014CC 43F85000                    LEA.L     FRAME,A1
2341 0 000014D0 45F900024000                LEA.L     VERT,A2
2342 0 000014D6 610000CC                    BSR       LDSYN 2344 0 000014DA 43F85000          PROC2V    LEA.L     FRAME,A1
2345 0 000014DE 323C0FFF                    MOVE      #$0FFF,D1
2346 0 000014E2 1001                        MOVE.B    D1,D0
2347 0 000014E4 61000096                    BSR       MBLANK 2349 0 000014E8 322E0014                    MOVE      VBLANK(A6),D1
2350 0 000014EC 43F11000                    LEA.L     0(A1,D1),A1
2351 0 000014F0 2449                        MOVE.L    A1,A2
2352 0 000014F2 322E0028                    MOVE      HBARP(A6),D1
2353 0 000014F6 43F11000                    LEA.L     0(A1,D1),A1

2355 0 000014FA 342E002A                    MOVE      HBARS(A6),D2
2356 0 000014FE 7201                        MOVEQ.L   #1,D1
2357 0 00001500 103C00FE                    MOVE.B    #HBR,D0

2359 0 00001504 61000086          PROC2V1   BSR       MAND
2360 0 00001508 43F12000                    LEA.L     0(A1,D2),A1
2361 0 0000150C B3CB                        CMPA.L    A3,A1
2362 0 0000150E 6DF4                        BLT.S     PROC2V1

2364 0 00001510 4CFA0006EB58                MOVEM.L   ZERO,D1-D2
2365 0 00001516 322E0036                    MOVE      APLS(A6),D1
```

```
2366 0 0000151A 3401              MOVE       D1,D2
2367 0 0000151C 43F21000          LEA.L      0(A2,D1),A1
2368 0 00001520 322E0038          MOVE       APLE(A6),D1
2369 0 00001524 9242              SUB        D2,D1
2370 0 00001526 103C00FB          MOVE.B     #APL,D0
2371 0 0000152A 6160              BSR.S      MAND 2373 0 0000152C 43F85000          LEA.L      FRAME,A1
2374 0 00001530 45F900025000      LEA.L      VERTU,A2
2375 0 00001536 616C              BSR.S      LDSYN 2377 0 00001538 41F900026000      LEA.L      PIT,A0
2378 0 0000153E 002800030012      OR.B       #3,PBDATA(A0)
2379 0 00001544 102E003A          MOVE.B     FLAG(A6),D0
2380 0 00001548 02400007          AND        #7,D0
2381 0 0000154C 0C000004          CMP.B      #4,D0
2382 0 00001550 6C02              BGE.S      SKPADJ
2383 0 00001552 5340              SUBQ       #1,D0
2384 0 00001554 E948     SKPADJ   LSL        #4,D0
2385 0 00001556 11400018          MOVE.B     D0,PCDATA(A0)
2386 0 0000155A 4A6E0030          TST        BOUNCE(A6)
2387 0 0000155E 671A              BEQ.S      PROC2V2
2388 0 00001560 42680026          CLR        CPRH(A0)
2389 0 00001564 322E0030          MOVE       BOUNCE(A6),D1
2390 0 00001568 5341              SUBQ       #1,D1
2391 0 0000156A 1141002A          MOVE.B     D1,CPRL(A0)
2392 0 0000156E E049              LSR        #8,D1
2393 0 00001570 11410028          MOVE.B     D1,CPRM(A0)
2394 0 00001574 08E800000020      BSET.B     #0,TCR(A0)
2395 0 0000157A 4E73     PROC2V2  RTE 2397 0 0000157C 48E74040 MBLANK   MOVEM.L    D1/A1,-(A7)
2398 0 00001580 12C0     MBLP     MOVE.B     D0,(A1)+
2399 0 00001582 51C9FFFC          DBRA       D1,MBLP
2400 0 00001586 4CDF0202          MOVEM.L    (A7)+,D1/A1
2401 0 0000158A 4E75              RTS 2403 0 0000158C 48E7E040 MAND     MOVEM.L    D0-D2/A1,-(A7)
2404 0 00001590 4A41              TST        D1
2405 0 00001592 6B0A              BMI.S      MAND1

2407 0 00001594 1411     MANDLP   MOVE.B     (A1),D2
2408 0 00001596 C400              AND.B      D0,D2
2409 0 00001598 12C2              MOVE.B     D2,(A1)+
2410 0 0000159A 51C9FFF8          DBRA       D1,MANDLP
2411 0 0000159E 4CDF0207 MAND1    MOVEM.L    (A7)+,D0-D2/A1
2412 0 000015A2 4E75              RTS 2414 0 000015A4 48E70070 LDSYN    MOVEM.L    A1-A3,-(A7)
2415 0 000015A8 47E90FFF          LEA.L      $0FFF(A1),A3
2416 0 000015AC B7C9     LDSYN1   CMPA.L     A1,A3
2417 0 000015AE 6B04              BMI.S      LDSYNR
2418 0 000015B0 14D9              MOVE.B     (A1)+,(A2)+
2419 0 000015B2 60F8              BRA.S      LDSYN1

2421 0 000015B4 4CDF0E00 LDSYNR   MOVEM.L    (A7)+,A1-A3
2422 0 000015B8 4E75              RTS 2424 0 000015BA 48E760C0 DCHECK   MOVEM.L    D1-D2/A0-A1,-(A7)
2425 0 000015BE 6100EC14          BSR        BINDEC
2426 0 000015C2 7403              MOVEQ      #3,D2

2428 0 000015C4 4281     DLOOP    CLR.L      D1
2429 0 000015C6 E288              LSR.L      #1,D0
2430 0 000015C8 E211              ROXR.B     #1,D1
2431 0 000015CA E288              LSR.L      #1,D0
2432 0 000015CC E211              ROXR.B     #1,D1
2433 0 000015CE E288              LSR.L      #1,D0
2434 0 000015D0 E211              ROXR.B     #1,D1
2435 0 000015D2 E288              LSR.L      #1,D0
2436 0 000015D4 E211              ROXR.B     #1,D1
2437 0 000015D6 E809              LSR.B      #4,D1

2439 0 000015D8 0C010005          CMP.B      #5,D1
2440 0 000015DC 6406              BHS.S      DCHEK1
2441 0 000015DE 42AE0048          CLR.L      ADDL(A6)
2442 0 000015E2 6008              BRA.S      DCHEK2
```

```
2444 0 000015E4 2D7C00000001  DCHEK1   MOVE.L     #1,ADDL(A6)
              0048

2446 0 000015EC 2D400044      DCHEK2   MOVE.L     D0,ADDU(A6)
2447 0 000015F0 41EE0048               LEA.L      ADDL(A6),A0
2448 0 000015F4 43E80004               LEA.L      4(A0),A1

2450 0 000015F8 C109                   ABCD       -(A1),-(A0)
2451 0 000015FA C109                   ABCD       -(A1),-(A0)
2452 0 000015FC C109                   ABCD       -(A1),-(A0)
2453 0 000015FE C109                   ABCD       -(A1),-(A0)
2454 0 00001600 2010                   MOVE.L     (A0),D0
2455 0 00001602 51CAFFC0               DBRA       D2,DLOOP
2456 0 00001606 6100EB84               BSR        DECBIN
2457 0 0000160A 2010                   MOVE.L     (A0),D0
2458 0 0000160C 4CDF0306               MOVEM.L    (A7)+,D1-D2/A0-A1
2459 0 00001610 4E75                   RTS 2461 0 00001612 06D600FA02EE  MTAB     DC.W       $06D6,$00FA,$02EE,$02EE
2462 0 0000161A 017703E803E8           DC.W       $0177,$03E8,$03E8
2463 0 00001620 017701900190           DC.W       $0177,$0190,$0190

2465 0 00001626 000400060008  PTAB     DC.W       HBLANK,HFRONT,HSYNC,SERR
2466 0 0000162E 000C000E0012           DC.W       EQUAL,HDRIV,HTRIGW
2467 0 00001634 001400160016           DC.W       VBLANK,VDRIV,VTRIGW 2469 0 0000163A 47FAFFEA      PROP     LEA.L      PTAB,A3
2470 0 0000163E 45FAFFD2               LEA.L      MTAB,A2
2471 0 00001642 7406                   MOVEQ      #6,D2
2472 0 00001644 08EE0007003A           BSET.B     #7,FLAG(A6)

2474 0 0000164A 302E0002      PROP10   MOVE       HLINE(A6),D0
2475 0 0000164E 321A                   MOVE       (A2)+,D1
2476 0 00001650 C0C1                   MULU       D1,D0
2477 0 00001652 6100FF66               BSR        DCHECK
2478 0 00001656 3E1B                   MOVE       (A3)+,D7
2479 0 00001658 3D807000               MOVE       D0,0(A6,D7)
2480 0 0000165C 51CAFFEC               DBRA       D2,PROP10

2482 0 00001660 7402                   MOVEQ      #2,D2
2483 0 00001662 3016          PROP12   MOVE       NOLINE(A6),D0
2484 0 00001664 321A                   MOVE       (A2)+,D1
2485 0 00001666 C0C1                   MULU       D1,D0
2486 0 00001668 6100FF50               BSR        DCHECK
2487 0 0000166C 3E1B                   MOVE       (A3)+,D7
2488 0 0000166E 0C420001               CMP        #1,D2
2489 0 00001672 6F02                   BLE.S      PROP13
2490 0 00001674 E348                   LSL        #1,D0
2491 0 00001676 3D807000      PROP13   MOVE       D0,0(A6,D7)
2492 0 0000167A 51CAFFE6               DBRA       D2,PROP12

2494 0 0000167E 426E0010               CLR        HTRIGP(A6)
2495 0 00001682 426E0018               CLR        VTRIGP(A6)
2496 0 00001686 0C2E000300C8           CMP.B      #ECMD,CMDFLG(A6)
2497 0 0000168C 670E                   BEQ.S      PROP14
2498 0 0000168E 1D7C000F00CD           MOVE.B     #15,STEPNO(A6)
2499 0 00001694                        PRINT3     #15,#4
2500 0 0000169C 4E75          PROP14   RTS 2502 0 0000169E 08EE0006003A  PVID     BSET.B     #6,FLAG(A6)

2504 0 000016A4 302E0002               MOVE       HLINE(A6),D0
2505 0 000016A8 906E0004               SUB        HBLANK(A6),D0
2506 0 000016AC 3F00                   MOVE       D0,-(A7)

2508 0 000016AE C0FC025E               MULU       #$25E,D0
2509 0 000016B2 6100FF06               BSR        DCHECK
2510 0 000016B6 3D400022               MOVE       D0,VBARS(A6)
2511 0 000016BA C0FC0010               MULU       #16,D0
2512 0 000016BE 3217                   MOVE       (A7),D1
2513 0 000016C0 9240                   SUB        D0,D1
2514 0 000016C2 E249                   LSR        #1,D1
2515 0 000016C4 6402                   BCC.S      PVID0
2516 0 000016C6 5241                   ADDQ       #1,D1
2517 0 000016C8 3D410020      PVID0    MOVE       D1,VBARP(A6)

2519 0 000016CC 301F                   MOVE       (A7)+,D0
2520 0 000016CE E248                   LSR        #1,D0
2521 0 000016D0 3200                   MOVE       D0,D1
```

```
2522 0 000016D2 E248              LSR       #1,D0
2523 0 000016D4 3D400024          MOVE      D0,HWINS(A6)
2524 0 000016D8 D041              ADD       D1,D0
2525 0 000016DA 3D400026          MOVE      D0,HWINE(A6)

2527 0 000016DE 0C2E000300C8      CMP.B     #ECMD,CMDFLG(A6)
2528 0 000016E4 670E              BEQ.S     PVID1
2529 0 000016E6 1D7C001800CD      MOVE.B    #24,STEPNO(A6)
2530 0 000016EC                   PRINT3    #24,#4
2531 0 000016F4 4E75      PVID1   RTS 2533 0 000016F6 48E7FFFE  CHECK   MOVEM.L   D0-D7/A0-A6,-(A7)
2534 0 000016FA 242E0068          MOVE.L    PARM(A6),D2
2535 0 000016FE 1A2E00CC          MOVE.B    DPFLAG(A6),D5

2537 0 00001702 E34F              LSL       #1,D7
2538 0 00001704 49F90000171A      LEA       CKLIST,A4
2539 0 0000170A 38747000          MOVE      0(A4,D7),A4
2540 0 0000170E 4E94              JSR       (A4)
2541 0 00001710 2D420068          MOVE.L    D2,PARM(A6)
2542 0 00001714 4CDF7FFF          MOVEM.L   (A7)+,D0-D7/A0-A6
2543 0 00001718 4E73              RTE 2545 0 0000171A 17B8     CKLIST   DC.W      CHK1              NUM LINES
2546 0 0000171C 17CA              DC.W      CHK2              H LINE TIME
2547 0 0000171E 1804              DC.W      CHKDON            FLAG
2548 0 00001720 17EA              DC.W      CHK4              H BLANK
2549 0 00001722 175E              DC.W      CHK50             H FRONT PORCH
2550 0 00001724 17EE              DC.W      CHK5              H SYNC
2551 0 00001726 17EA              DC.W      CHK4              2H SERR
2552 0 00001728 17EA              DC.W      CHK4              2H EQUAL
2553 0 0000172A 17EE              DC.W      CHK5              H DRIVE
2554 0 0000172C 17EE              DC.W      CHK5              H TRIG PHASE
2555 0 0000172E 17EE              DC.W      CHK5              H TRIG WIDTH
2556 0 00001730 17F8              DC.W      CHK6              V BLANK
2557 0 00001732 17FC              DC.W      CHK60             VDRIVE
2558 0 00001734 17FC              DC.W      CHK60             V TRIG PHASE
2559 0 00001736 17FC              DC.W      CHK60             V TRIG WIDTH
2560 0 00001738 1792              DC.W      CHK7              SYNC FORMAT FLAG
2561 0 0000173A 17DA              DC.W      CHK3              V FRONT PORCH  ***********
2562 0 0000173C 17FC              DC.W      CHK60             V SYNC  **************
2563 0 0000173E 17DA              DC.W      CHK3              V POST  ****************
2564 0 00001740 1804              DC.W      CHKDON            PATTERN FLAG
2565 0 00001742 183A              DC.W      CHK8              V BAR POS
2566 0 00001744 183A              DC.W      CHK8              V BAR SPACE
2567 0 00001746 183E              DC.W      CHK9              H WINDOW START
2568 0 00001748 184E              DC.W      CHK10             H WINDOW STOP
2569 0 0000174A 1860              DC.W      CHK12             H BAR POSITION
2570 0 0000174C 1860              DC.W      CHK12             H BAR SPACING
2571 0 0000174E 1860              DC.W      CHK12             V WINDOW START
2572 0 00001750 1874              DC.W      CHK13             V WINDOW STOP
2573 0 00001752 1858              DC.W      CHK11             BOUNCE
2574 0 00001754 1804              DC.W      CHKDON
2575 0 00001756 1804              DC.W      CHKDON
2576 0 00001758 1860              DC.W      CHK12
2577 0 0000175A 1874              DC.W      CHK13
2578 0 0000175C 187C              DC.W      CHK15             RASTER NUM 2580 0 0000175E 610000CE  CHK50   BSR       ADJDEC
2581 0 00001762 B46E0002          CMP       HLINE(A6),D2
2582 0 00001766 6C0000A6          BGE       CHKER2
2583 0 0000176A 1E2E003A          MOVE.B    FLAG(A6),D7
2584 0 0000176E 02470007          AND       #7,D7
2585 0 00001772 4A42              TST       D2
2586 0 00001774 6612              BNE.S     CHK51
2587 0 00001776 0C470001          CMP       #1,D7
2588 0 0000177A 670000A2          BEQ       CWARN1
2589 0 0000177E 0C470002          CMP       #2,D7
2590 0 00001782 6700009E          BEQ       CWARN2
2591 0 00001786 607C              BRA.S     CHKDON 2593 0 00001788 0C470003  CHK51   CMP       #3,D7
2594 0 0000178C 67000098          BEQ       CWARN3
2595 0 00001790 6072              BRA.S     CHKDON 2597 0 00001792 4A42      CHK7    TST       D2
2598 0 00001794 677C              BEQ.S     CHKER3
2599 0 00001796 0C420007          CMP       #7,D2
2600 0 0000179A 6C72              BGE.S     CHKER2
2601 0 0000179C 4A6E0006          TST       HFRONT(A6)
2602 0 000017A0 6708              BEQ.S     CHK70
2603 0 000017A2 0C420003          CMP       #3,D2
2604 0 000017A6 665C              BNE.S     CHKDON
2605 0 000017A8 607C              BRA.S     CWARN3
```

```
2607 0 000017AA 0C420001    CHK70   CMP     #1,D2
2608 0 000017AE 676E                BEQ.S   CWARN1
2609 0 000017B0 0C420002            CMP     #2,D2
2610 0 000017B4 676C                BEQ.S   CWARN2
2611 0 000017B6 604C                BRA.S   CHKDON 2613 0 000017B8 0C420064    CHK1    CMP     #100,D2
2614 0 000017BC 6D54                BLT.S   CHKER3
2615 0 000017BE 4A05                TST.B   D5
2616 0 000017C0 6B54                BMI.S   CHKER8
2617 0 000017C2 0C421000            CMP     #4096,D2
2618 0 000017C6 6E46                BGT.S   CHKER2
2619 0 000017C8 603A                BRA.S   CHKDON 2621 0 000017CA 6162        CHK2    BSR.S   ADJDEC
2622 0 000017CC 0C4207F8            CMP     #2040,D2
2623 0 000017D0 6E3C                BGT.S   CHKER2
2624 0 000017D2 0C420064            CMP     #100,D2
2625 0 000017D6 6D3A                BLT.S   CHKER3
2626 0 000017D8 602A                BRA.S   CHKDON 2628 0 000017DA B456        CHK3    CMP     NOLINE(A6),D2
2629 0 000017DC 6C30                BGE.S   CHKER2
2630 0 000017DE 0C420100            CMP     #256,D2
2631 0 000017E2 6E2A                BGT.S   CHKER2
2632 0 000017E4 4A05                TST.B   D5
2633 0 000017E6 6B2E                BMI.S   CHKER8
2634 0 000017E8 601A                BRA.S   CHKDON 2636 0 000017EA 4A42        CHK4    TST     D2
2637 0 000017EC 6724                BEQ.S   CHKER3

2639 0 000017EE 613E        CHK5    BSR.S   ADJDEC
2640 0 000017F0 B46E0002            CMP     HLINE(A6),D2
2641 0 000017F4 6C18                BGE.S   CHKER2
2642 0 000017F6 600C                BRA.S   CHKDON 2644 0 000017F8 4A42        CHK6    TST     D2
2645 0 000017FA 6716                BEQ.S   CHKER3

2647 0 000017FC B456        CHK60   CMP     NOLINE(A6),D2
2648 0 000017FE 6C0E                BGE.S   CHKER2
2649 0 00001800 4A05                TST.B   D5
2650 0 00001802 6B12                BMI.S   CHKER8

2652 0 00001804 51EE00CA    CHKDON  SF      ERROR(A6)
2653 0 00001808 51EE00BC            SF      WARN(A6)
2654 0 0000180C 4E75                RTS 2656 0 0000180E F001        CHKER2  DC.W    MSG41
2657 0 00001810 6006                BRA.S   CHKER 2659 0 00001812 F002        CHKER3  DC.W    MSG42
2660 0 00001814 6002                BRA.S   CHKER 2662 0 00001816 F00E        CHKER8  DC.W    MSG54

2664 0 00001818 50EE00CA    CHKER   ST      ERROR(A6)
2665 0 0000181C 4E75                RTS 2667 0 0000181E F013        CWARN1  DC.W    MSG59
2668 0 00001820 6006                BRA.S   CWARNE 2670 0 00001822 F014        CWARN2  DC.W    MSG60
2671 0 00001824 6002                BRA.S   CWARNE 2673 0 00001826 F015        CWARN3  DC.W    MSG61

2675 0 00001828 50EE00BC    CWARNE  ST      WARN(A6)
2676 0 0000182C 4E75                RTS 2678 0 0000182E 0C050082    ADJDEC  CMP.B   #$82,D5
2679 0 00001832 6704                BEQ.S   ADJR
2680 0 00001834 C4FC000A            MULU    #10,D2
2681 0 00001838 4E75        ADJR    RTS 2683 0 0000183A 4A42        CHK8    TST     D2
2684 0 0000183C 67D4                BEQ.S   CHKER3
```

```
2686 0 0000183E 61EE              CHK9    BSR.S     ADJDEC 2688 0 00001840 322E0002          CHK90   MOVE      HLINE(A6),D1
2689 0 00001844 926E0004                  SUB       HBLANK(A6),D1
2690 0 00001848 B441                       CMP       D1,D2
2691 0 0000184A 6CC2                       BGE.S     CHKER2
2692 0 0000184C 60B6                       BRA.S     CHKDON 2694 0 0000184E 61DE              CHK10   BSR.S     ADJDEC
2695 0 00001850 B46E0024                  CMP       HWINS(A6),D2
2696 0 00001854 6DBC                       BLT.S     CHKER3
2697 0 00001856 60E8                       BRA.S     CHK90

2699 0 00001858 0C420001          CHK11   CMP       #1,D2
2700 0 0000185C 67B4                       BEQ.S     CHKER3
2701 0 0000185E 60A4                       BRA.S     CHKDON
2702 0 00001860 4A42              CHK12   TST       D2
2703 0 00001862 67AE                       BEQ.S     CHKER3

2705 0 00001864 3216              CHK120  MOVE      NOLINE(A6),D1
2706 0 00001866 926E0014                  SUB       VBLANK(A6),D1
2707 0 0000186A B441                       CMP       D1,D2
2708 0 0000186C 6CA0                       BGE.S     CHKER2
2709 0 0000186E 4A05                       TST.B     D5
2710 0 00001870 6BA4                       BMI.S     CHKER8
2711 0 00001872 6090                       BRA.S     CHKDON 2713 0 00001874 B46E002C          CHK13   CMP       VWINS(A6),D2
2714 0 00001878 6D98                       BLT.S     CHKER3
2715 0 0000187A 60E8                       BRA.S     CHK120

2717 0 0000187C 0C420044          CHK15   CMP       #NORAST,D2
2718 0 00001880 6E8C                       BGT.S     CHKER2
2719 0 00001882 4A05                       TST.B     D5
2720 0 00001884 6B90                       BMI.S     CHKER8
2721 0 00001886 6000FF7C                  BRA       CHKDON 2723 0 0000188A 48E780C0          PUSH    MOVEM.L   D0/A0-A1,-(A7)
2724 0 0000188E 204E                       MOVE.L    A6,A0
2725 0 00001890 43F84F00                  LEA.L     TBUF,A1

2727 0 00001894 303C003B          PUSH0   MOVE      #FCODE,D0

2729 0 00001898 12D8              PUSH1   MOVE.B    (A0)+,(A1)+
2730 0 0000189A 51C8FFFC                  DBRA      D0,PUSH1
2731 0 0000189E 4CDF0301                  MOVEM.L   (A7)+,D0/A0-A1
2732 0 000018A2 4E75                       RTS 2734 0 000018A4 48E780C0          PULL    MOVEM.L   D0/A0-A1,-(A7)
2735 0 000018A8 224E                       MOVE.L    A6,A1
2736 0 000018AA 41F84F00                  LEA.L     TBUF,A0
2737 0 000018AE 60E4                       BRA.S     PUSH0

2739 0 000018B0 51EE00C4          SAVIT   SF        ENTERD(A6)
2740 0 000018B4 4A2E00D2                  TST.B     SAVERR(A6)
2741 0 000018B8 6B64                       BMI.S     SAV21
2742 0 000018BA 4AEE00D1                  TAS       SAVFLG(A6)
2743 0 000018BE 6612                       BNE.S     SAV10
2744 0 000018C0 1D7C000400C8              MOVE.B    #SAVCMD,CMDFLG(A6)
2745 0 000018C6 43F9000019E0              LEA.L     SAVMSG,A1
2746 0 000018CC                            PRINT2    #0
2747 0 000018D0 4E75                       RTS 2749 0 000018D2 4AAE0068          SAV10   TST.L     PARM(A6)
2750 0 000018D6 6602                       BNE.S     SAV20
2751 0 000018D8 604A                       BRA.S     SAV210

2753 0 000018DA 102E003B          SAV20   MOVE.B    FCODE(A6),D0
2754 0 000018DE 6706                       BEQ.S     SAV26
2755 0 000018E0 0C400063                  CMP       #99,D0
2756 0 000018E4 6606                       BNE.S     SAV27

2758 0 000018E6 F005              SAV26   DC.W      MSG45
2759 0 000018E8 600000BC                  BRA       NEVER1
```

```
2761 0 000018EC 5340            SAV27    SUBQ     #1,D0
2762 0 000018EE C0FC003C                 MULU     #60,D0
2763 0 000018F2 41F900027000             LEA.L    PARMLS,A0
2764 0 000018F8 41F00000                 LEA.L    0(A0,D0),A0
2765 0 000018FC 2D480040                 MOVE.L   A0,STRPTR(A6)
2766 0 00001900 703B                     MOVEQ    #59,D0

2768 0 00001902 0C1800FF        SAV200   CMP.B    #$FF,(A0)+
2769 0 00001906 6606                     BNE.S    SAV201
2770 0 00001908 51C8FFF8                 DBRA     D0,SAV200
2771 0 0000190C 6018                     BRA.S    SAV22
2772 0 0000190E 43F9000019D4   SAV201   LEA.L    OVWMSG,A1
2773 0 00001914                          PRINT2   #0
2774 0 00001918 50EE00D2                 ST       SAVERR(A6)
2775 0 0000191C 4E75                     RTS 2777 0 0000191E 4AAE0068        SAV21    TST.L    PARM(A6)
2778 0 00001922 6602                     BNE.S    SAV22
2779 0 00001924 604C            SAV210   BRA.S    SAV231

2781 0 00001926 43F9000019FF   SAV22    LEA.L    WATMSG,A1
2782 0 0000192C                          PRINT2   #0
2783 0 00001930                          LAMPIT   #SAVMSK 2785 0 00001938 6100EBB6        SAV29    BSR      KEYSCN
2786 0 0000193C 4A2E00CF                 TST.B    KFLAG(A6)
2787 0 00001940 6702                     BEQ.S    SAV30
2788 0 00001942 602E                     BRA.S    SAV231

2790 0 00001944 287C0000E000   SAV30    MOVE.L   #AC68,A4
2791 0 0000194A 182D0004                 MOVE.B   IPCR(A5),D4
2792 0 0000194E 02040008                 AND.B    #8,D4
2793 0 00001952 66E4                     BNE.S    SAV29

2795 0 00001954 43F9000019EA            LEA.L    WRKMSG,A1
2796 0 0000195A                          PRINT2   #0
2797 0 0000195E 2A6E0040                 MOVE.L   STRPTR(A6),A5
2798 0 00001962 7E3B                     MOVEQ    #59,D7

2800 0 00001964 10367000        SAV23    MOVE.B   0(A6,D7),D0
2801 0 00001968 B0357000                 CMP.B    0(A5,D7),D0
2802 0 0000196C 6E10                     BNE.S    SAV24

2804 0 0000196E 51CFFFF4        SAV230   DBRA     D7,SAV23
2805 0 00001972 422E00D2        SAV231   CLR.B    SAVERR(A6)
2806 0 00001976 422E00D1                 CLR.B    SAVFLG(A6)
2807 0 0000197A 6000EF38                 BRA      DELCMD 2809 0 0000197E 3F00            SAV24    MOVE     D0,-(A7)
2810 0 00001980 103C00FF        SAV240   MOVE.B   #$FF,D0
2811 0 00001984 612C                     BSR.S    LWAIT
2812 0 00001986 B0357000                 CMP.B    0(A5,D7),D0
2813 0 0000198A 66F4                     BNE.S    SAV240
2814 0 0000198C 301F                     MOVE     (A7)+,D0
2815 0 0000198E 6122            SAV241   BSR.S    LWAIT
2816 0 00001990 B0357000                 CMP.B    0(A5,D7),D0
2817 0 00001994 66F8                     BNE.S    SAV241
2818 0 00001996 60D6                     BRA.S    SAV230

2820 0 00001998 6100F600        NEVER    BSR      RATCAL
2821 0 0000199C 43F9000019F4            LEA.L    BADMSG,A1
2822 0 000019A2                          PRINT2   #0
2823 0 000019A6 422E00D1        NEVER1   CLR.B    SAVFLG(A6)
2824 0 000019AA 422E00D2                 CLR.B    SAVERR(A6)
2825 0 000019AE 6000EF10                 BRA      DELCMD1

2827 0 000019B2 49F900026000   LWAIT    LEA.L    PIT,A4
2828 0 000019B8 08EC00020012            BSET.B   #2,PBDATA(A4)
2829 0 000019BE 1B807000                 MOVE.B   D0,0(A5,D7)
2830 0 000019C2 3A3C0C08                 MOVE     #$C08,D5

2832 0 000019C6 4E71            LWAITL   NOP
2833 0 000019C8 51CDFFFC                 DBRA     D5,LWAITL 2835 0 000019CC 08AC00020012   LWAITR   BCLR.B   #2,PBDATA(A4)
2836 0 000019D2 4E75                     RTS 2838 0 000019D4 204F56455257   OVWMSG   DC.B     ' OVERWRITE?',0
2839 0 000019E0 205341564520   SAVMSG   DC.B     ' SAVE IT?',0
2840 0 000019EA 20574F524B49   WRKMSG   DC.B     ' WORKING-',0
```

```
2841 0 000019F4 204241442057  BADMSG  DC.B    ' BAD WRITE',0
2842 0 000019FF 205741495449  WATMSG  DC.B    ' WAITING-',0

2844 0 00001A0A 4AEE00D3      SEARCH  TAS     SERFLG(A6)          CHECK ALREADY BEEN HERE
2845 0 00001A0E 6B1E                  BMI.S   SERCH1              BRANCH IF YES 2847 0 00001A10 4A2E00C4              TST.B   ENTERD(A6)          ELSE CHECK KEY ENTRY
2848 0 00001A14 6700EE80              BEQ     CCHKE               BRANCH IF ERROR
2849 0 00001A18 51EE00C4              SF      ENTERD(A6)
2850 0 00001A1C 202E0068              MOVE.L  PARM(A6),D0         GET NUMBER OF LINES
2851 0 00001A20 3D400074              MOVE    D0,SWORK(A6)        SAVE IT
2852 0 00001A24 422E00C0              CLR.B   OCCUR(A6)           START AT RASTER ONE
2853 0 00001A28 51EE00BF              SF      FRAST(A6)           FLAG FIRST ONE
2854 0 00001A2C 600A                  BRA.S   SERCH2              GO GET IT 2856 0 00001A2E 4A2E00C4      SERCH1  TST.B   ENTERD(A6)          CHECK IF LOAD CMD
2857 0 00001A32 675E                  BEQ.S   SLOAD               IF YES THEN BRANCH
2858 0 00001A34 51EE00C4              SF      ENTERD(A6)

2860 0 00001A38 322E0074      SERCH2  MOVE    SWORK(A6),D1        GET NO. LINES
2861 0 00001A3C 4283                  CLR.L   D3
2862 0 00001A3E 2003                  MOVE.L  D3,D0
2863 0 00001A40 102E00C0              MOVE.B  OCCUR(A6),D0        CURRENT RASTER NUMBER
2864 0 00001A44 43F900027000          LEA.L   PARMLS,A1           GET TOP OF LIST 2866 0 00001A4A B2713000      SERCH3  CMP     NOLINE(A1,D3),D1    CHECK FOR RIGHT NO. LINES
2867 0 00001A4E 6718                  BEQ.S   SERCH5              IF YES THEN BRANCH 2869 0 00001A50 0643003C      SERCH4  ADD     #60,D3              ELSE LOOK ELSEWHERE
2870 0 00001A54 0C430FFF              CMP     #$FFF,D3
2871 0 00001A58 6DF0                  BLT.S   SERCH3              CHECK END OF STORE
2872 0 00001A5A 4A2E00BF              TST.B   FRAST(A6)
2873 0 00001A5E 6736                  BEQ.S   NSERCH              CHECK FOR FIRST TIME
2874 0 00001A60 43F900001AA8          LEA.L   LSTMSG,A1
2875 0 00001A66 6034                  BRA.S   SERCH6              SEND LAST 2877 0 00001A68 51C8FFE6      SERCH5  DBRA    D0,SERCH4           CONTINUE LOOPING
2878 0 00001A6C 303C003B              MOVE    #FCOD,D0
2879 0 00001A70 43F13000              LEA.L   0(A1,D3),A1         POINT AT CURRENT FORMAT
2880 0 00001A74 204E                  MOVE.L  A6,A0               POINT AT FRAME 2882 0 00001A76 10D9          SERCH7  MOVE.B  (A1)+,(A0)+         LOAD IT
2883 0 00001A78 51C8FFFC              DBRA    D0,SERCH7
2884 0 00001A7C 6100F51C              BSR     RATCAL              CALCULATE FRAME RATE
2885 0 00001A80                       PRINT1                      SEND TO DISPLAY
2886 0 00001A88 522E00C0              ADD.B   #1,OCCUR(A6)        UPDATE CURRENT RASTER
2887 0 00001A8C 50EE00BF              ST      FRAST(A6)           SHOW FOUND ONE
2888 0 00001A90 4E75                  RTS 2890 0 00001A92 4E4D          SLOAD   TRAP    #13                 MAKE ACTIVE
2891 0 00001A94 600E                  BRA.S   SERCH8              AND QUIT 2893 0 00001A96 43F900001AB3  NSERCH  LEA.L   NOTMSG,A1           IF YES THEN STOP 2895 0 00001A9C                SERCH6 PRINT2  #0                  SEND TO DISPLAY
2896 0 00001AA0 6100FE02              BSR     PULL 2898 0 00001AA4 6000EE1A      SERCH8  BRA     DELCMD1

2900 0 00001AA8 4C4153542045  LSTMSG  DC.B    'LAST ENTRY',0
2901 0 00001AB3 204E4F542046  NOTMSG  DC.B    ' NOT FOUND',0

2903 0 00001ABE 2F01          ASKIT   MOVE.L  D1,-(A7)
2904 0 00001AC0 223C20202020          MOVE.L  #'    ',D1

2906 0 00001AC6 E989          ASKIT1  LSL.L   #4,D1
2907 0 00001AC8 E348                  LSL     #1,D0
2908 0 00001ACA E391                  ROXL.L  #1,D1
2909 0 00001ACC E348                  LSL     #1,D0
2910 0 00001ACE E391                  ROXL.L  #1,D1
2911 0 00001AD0 E348                  LSL     #1,D0
2912 0 00001AD2 E391                  ROXL.L  #1,D1
2913 0 00001AD4 E348                  LSL     #1,D0
2914 0 00001AD6 E391                  ROXL.L  #1,D1
2915 0 00001AD8 00010030              OR.B    #'0',D1
2916 0 00001ADC 0C010039              CMP.B   #'9',D1
2917 0 00001AE0 6F02                  BLE.S   ASKIT2
2918 0 00001AE2 5E01                  ADD.B   #7,D1
```

```
2920  0  00001AE4  51CAFFE0     ASKIT2    DBRA      D2,ASKIT1
2921  0  00001AE8  2001                   MOVE.L    D1,D0
2922  0  00001AEA  221F                   MOVE.L    (A7)+,D1
2923  0  00001AEC  4E75                   RTS 2925  0  00001AEE  0002FA040608 MEMLIS    DC.B      0,2,$FA,4,6,8,10
2926  0  00001AF5  0C0E10121416           DC.B      12,14,16,18,20,22
2927  0  00001AFB  181AFA9C1E             DC.B      24,26,$FA,$9C,30
2928  0  00001B00  9DFA20222426           DC.B      $9D,$FA,32,34,36,38
2929  0  00001B06  282A2C2E3032           DC.B      40,42,44,46,48,50
2930  0  00001B0C  343638BB               DC.B      52,54,56,$BB
2931                                      END

****** TOTAL ERRORS      0--
****** TOTAL WARNINGS    0--

SYMBOL TABLE LISTING

SYMBOL NAME     SECT    VALUE          CROSS-REF (LINENUMBERS)

AC68                    0000E000   -7      355
ACTSTR                  00000050   -140    1977    2000   2151   2168   744    767    789    2790
ADDERR           0      000002CC   -572    272
ADDL                    00000048   -138    2441    2444   2447
ADDU                    00000044   -137    2446
ADJDEC           0      0000182E   -2678   2580    2621   2639   2686   2694
ADJR             0      00001838   -2681   2679
AINTAB           0      00000030   -281    356
APL                     000000FB   -206    2370
APLE                    00000038   -130    2368
APLS                    00000036   -129    2365
ASC40            0      000006E0   -928    933
ASC41            0      000006FA   -937    943
ASC42            0      000006FC   -939    930
ASC43            0      0000070E   -946    935
ASKIT            0      00001ABE   -2903   548     552    557
ASKIT1           0      00001AC6   -2906   2920
ASKIT2           0      00001AE4   -2920   2917
ASTER            0      00001090   -1869   1827
BADMSG           0      000019F4   -2841   2821
BCMD                    00000001   -34     1074    1131
BDLP1            0      000001DC   -472    492
BDLP2            0      000001E8   -479    491
BDSKIP           0      000001F4   -486    483
BE0              0      0000026C   -540    574
BE1              0      000002A2   -560    562
BE2              0      000002B8   -566    568
BINDEC           0      000001D4   -468    1658    1838   1856   1876   1910   2425
BITS                    000000C6   -161    1581    1616   1628   1710   1720   1721
BITTYP           0      00000E08   -1628   1619
BLD              0      000009B6   -1245   1186
BLD01            0      00000B46   -1383   1368
BLD02            0      00000A70   -1304   1250    1252
BLD03            0      00000B5A   -1392   1385
BLD05            0      00000A10   -1268   1278
BLD050           0      00000A1C   -1272   1266
BLD051           0      00000A34   -1280   1274
BLD052           0      00000A50   -1288   1281
BLD053           0      00000A5C   -1293   1289
BLD054           0      00000A60   -1296   1283
BLD055           0      00000A6C   -1301   1297
BLD06            0      00000B70   -1398   1357    1365
BLD060           0      00000B7A   -1403   1400
BLD07            0      00000A8E   -1313   1308
BLD070           0      00000AA6   -1324   1320
BLD071           0      00000AB0   -1329   1325
BLD072           0      00000AE8   -1344   1314
BLD073           0      00000AFC   -1351   1345
BLD074           0      00000B10   -1359   1352
BLD075           0      00000B24   -1367   1360
BLD076           0      00000B32   -1374   1370
BLD077           0      00000B3C   -1379   1375
BLD078           0      00000B22   -1365   1337    1342   1349
BLD079           0      00000AD4   -1339
BLD08            0      00000B4E   -1387   1331    1355   1363
BLD080           0      00000B54   -1389   1333
BLDJ             0      000009EC   -1259   1257
BLDMSK                  000000C1   -43     1079
BLDR             0      00000842   -1080   1073
BOUNCE                  00000030   -126    2386    2389
BRKPT            0      000002DA   -576    279
BUILD            0      0000081C   -1072   733
BUSERR           0      00000260   -537    271
BYTTYP           0      00000DE8   -1616   1609
C40                     000000EF   -185    1997
CCHK0            0      000008A6   -1131   1124
CCHK01           0      000008AC   -1133   1119    1121   1255
CCHK1            0      000008D6   -1147   1114
CCHK10           0      000008B0   -1135   1132
CCHK2            0      00000890   -1123   1117
```

| Label | Addr | | | | | | | | | | | | |
|---|---|---|---|---|---|---|---|---|---|---|---|---|---|
| CCHKE | 00000896 | 0 | -1126 | 1167 | 1246 | | | | | | | | |
| CHECK | 000016F6 | 0 | -2533 | 312 | | 1413 | 1541 | 1585 | 2848 | | | | |
| CHK1 | 000017B8 | 0 | -2613 | 2545 | | | | | | | | | |
| CHK10 | 0000184E | 0 | -2694 | 2568 | | | | | | | | | |
| CHK11 | 00001858 | 0 | -2699 | 2573 | | | | | | | | | |
| CHK12 | 00001860 | 0 | -2702 | 2569 | 2570 | 2571 | 2576 | | | | | | |
| CHK120 | 00001864 | 0 | -2705 | 2715 | 2577 | | | | | | | | |
| CHK13 | 00001874 | 0 | -2713 | 2572 | | | | | | | | | |
| CHK15 | 0000187C | 0 | -2717 | 2578 | | | | | | | | | |
| CHK2 | 000017CA | 0 | -2621 | 2546 | | | | | | | | | |
| CHK3 | 000017DA | 0 | -2628 | 2561 | 2563 | 2552 | | | | | | | |
| CHK4 | 000017EA | 0 | -2636 | 2548 | 2551 | 2554 | 2555 | | | | | | |
| CHK5 | 000017EE | 0 | -2639 | 2550 | 2553 | | | | | | | | |
| CHK50 | 00001758 | 0 | -2580 | 2549 | | | | | | | | | |
| CHK51 | 00001788 | 0 | -2593 | 2586 | | | | | | | | | |
| CHK6 | 000017F8 | 0 | -2644 | 2556 | 2558 | 2559 | 2562 | | | | | | |
| CHK60 | 000017FC | 0 | -2647 | 2557 | | | | | | | | | |
| CHK7 | 00001792 | 0 | -2597 | 2560 | | | | | | | | | |
| CHK70 | 000017AA | 0 | -2607 | 2602 | | | | | | | | | |
| CHK8 | 0000183A | 0 | -2686 | 2565 | 2566 | | | | | | | | |
| CHK9 | 0000183E | 0 | -2688 | 2567 | | | | | | | | | |
| CHKDON | 00001840 | 0 | -2688 | 2697 | 2564 | 2574 | 2575 | 2591 | 2595 | 2604 | 2611 | 2619 | 2626 | 2634 | 2642 | 2692 |
| | 00001804 | 0 | -2652 | 2547 | 2721 | | | | | | | | |
| | | | | 2701 | 2660 | | | | | | | | |
| CHKER | 00001818 | 0 | -2664 | 2657 | 2582 | 2600 | 2618 | 2623 | 2629 | 2631 | 2641 | 2648 | 2691 | 2708 | 2718 |
| CHKER2 | 0000180E | 0 | -2656 | 1554 | 2588 | 2625 | 2637 | 2645 | 2684 | 2696 | 2700 | 2703 | 2714 | | |
| CHKER3 | 00001812 | 0 | -2659 | 2598 | 2614 | 2650 | 2710 | 2720 | | | | | | |
| CHKER8 | 00001816 | 0 | -2662 | 2616 | | | | | | | | | |
| CKLIST | 0000171A | 0 | -2545 | 2538 | 2633 | | | | | | | | |
| CLRM | 00000134 | 0 | -376 | 377 | | | | | | | | | |
| CMDCHK | 0000086E | 0 | -1113 | 1075 | 1088 | 1100 | 1115 | 1118 | 1120 | 1141 | 1147 | 1163 | 1213 | 1237 |
| CMDFLG | 000000C8 | 0 | -162 | 909 | 911 | 915 | 917 | 919 | | | | | | |
| | | | | 1469 | 2496 | 2527 | 2744 | | | | | | |
| | | | | 1422 | 2388 | | | | | | | | |
| CPRH | 00000026 | 0 | -65 | 294 | 2391 | | | | | | | | |
| CPRL | 0000002A | 0 | -67 | 295 | 2393 | | | | | | | | |
| CPRM | 00000028 | 0 | -66 | 295 | | | | | | | | | |
| CR | 0000000D | 0 | -21 | 779 | | | | | | | | | |
| CWARN1 | 0000181E | 0 | -2667 | 2588 | 2608 | | | | | | | | |
| CWARN2 | 00001822 | 0 | -2670 | 2590 | 2610 | | | | | | | | |
| CWARN3 | 00001826 | 0 | -2673 | 2594 | 2605 | | | | | | | | |
| CWARNE | 00001828 | 0 | -2675 | 2668 | 2671 | | | | | | | | |
| DBEXP | 000001B4 | 0 | -447 | 1160 | | | | | | | | | |
| DBLOOP | 00000198 | 0 | -426 | 435 | | | | | | | | | |
| DBLP1 | 0000019E | 0 | -452 | 455 | | | | | | | | | |
| DC1 | 000011D5 | 0 | -2003 | 2014 | | | | | | | | | |
| DC2 | 000011FB | 0 | -2016 | 2004 | 2010 | 2509 | | | | | | | |
| DCHECK | 000015BA | 0 | -2424 | 2477 | 2486 | | | | | | | | |
| DCHEK1 | 000015E4 | 0 | -2444 | 2440 | | | | | | | | | |
| DCHEK2 | 000015EC | 0 | -2446 | 2442 | | | | | | | | | |
| DECBIN | 0000018C | 0 | -421 | 2456 | | | | | | | | | |
| DECPT | 00000F78 | 0 | -1767 | 731 | | 1444 | 1550 | | | | | | |
| DEFALT | 000000C0 | 0 | -319 | 380 | 1465 | 2007 | | | | | | | |
| DELCMD | 000008B4 | 0 | -1137 | 1137 | 1465 | 2898 | | | | | | | |
| DELCMD1 | 000008C0 | 0 | -1140 | 1529 | 1778 | 563 | 572 | 595 | 842 | 873 | 883 | 962 | 1138 | 1490 | 1498 | 1504 |
| DISBUF | 00000054 | 0 | -141 | 388 | 934 | 944 | 959 | 2885 | | | | | | |
| DISDTA | 00000060 | 0 | 1513 | 1689 | 1770 | | | | | | | | |
| DIVD | 01312D00 | 0 | -142 | 594 | | | | | | | | | |
| DLOOP | 000015C4 | 0 | -41 | 1732 | | | | | 1659 | 1687 | 1767 | | | |
| DOCLKS | 000011CE | 0 | -2428 | 2455 | | | | | | | | | |
| DPFLAG | 000000CC | 0 | -2000 | 2160 | | | | | | | | | |
| | | | | 947 | 949 | 960 | 977 | 1144 | 1170 | 1200 | 1214 | 1251 | 1253 | 1418 | 1421 | 1432 |
| | | | | 1517 | 1768 | 2535 | | | | | | | |
| ECHO | 000000C2 | 0 | -157 | 390 | 748 | | | | | | | 1418 | 1421 | 1432 |

| | | | | | | | | | | | | | | | | |
|---|---|---|---|---|---|---|---|---|---|---|---|---|---|---|---|---|
| ECMD | 0 | 000000003 | -36 | 1099 | | | | | | | | | | | | |
| EDIT | 0 | 00000084C | -1096 | 734 | | | | | | | | | | | | |
| EDIT1 | 0 | 000000860 | -1103 | 1089 | | | | | | | | | | | | |
| EDITR | 0 | 00000086C | -1106 | 1097 | | | | | | | | | | | | |
| EDT | 0 | 000000D08 | -1538 | 1188 | | | | | | | | | | | | |
| EDT00 | 0 | 000000D30 | -1553 | 1548 | | | | | | | | | | | | |
| EDT01 | 0 | 000000D56 | -1566 | 1551 | | | | | | | | | | | | |
| EDT02 | 0 | 000000D5A | -1568 | 1569 | | | | | | | | | | | | |
| EDT03 | 0 | 000000D60 | -1571 | 1545 | | | | | | | | | | | | |
| EDT10 | 0 | 000000D78 | -1578 | 1718 | | | | | | | | | | | | |
| EDT20 | 0 | 000000D8A | -1584 | 1574 | | | | | | | | | | | | |
| EDT21 | 0 | 000000DB0 | -1599 | 1595 | | | | | | | | | | | | |
| EDT22 | 0 | 000000E3C | -1642 | 1637 | | | | | | | | | | | | |
| EDT220 | 0 | 000000E44 | -1645 | 1652 | | | | | | | | | | | | |
| EDT23 | 0 | 000000E48 | -1648 | 1643 | | | | | | | | | | | | |
| EDT24 | 0 | 000000E4C | -1651 | 1635 | | | | | | | | | | | | |
| EDT26 | 0 | 000000E58 | -1656 | 1268 | 1614 | | | | | | | | | | | | |
| EDT27 | 0 | 000000EB2 | -1688 | 1677 | 1673 | | | | | | | | | | | | |
| EDT28 | 0 | 000000EBA | | 1605 | 1593 | 1600 | | | | | | | | | | | |
| EDT30 | 0 | 000000ECE | -1698 | 1576 | | | | | | | | | | | | |
| EDT31 | 0 | 000000EFC | -1716 | 1699 | 1740 | | | | | | | | | | | | |
| EDT32 | 0 | 000000EEA | -1708 | | 1748 | | | | | | | | | | | | |
| EDT320 | 0 | 000000EFA | -1714 | 1732 | 1737 | | | | | | | | | | | | |
| EDT33 | 0 | 000000F0A | -1720 | 1711 | | | | | | | | | | | | |
| EDT34 | 0 | 000000F36 | -1734 | 1725 | | | | | | | | | | | | |
| EDT340 | 0 | 000000F40 | -1739 | 1735 | | | | | | | | | | | | |
| EDT35 | 0 | 000000F46 | -1742 | 1727 | | | | | | | | | | | | |
| EDT350 | 0 | 000000F50 | -1747 | 1743 | | | | | | | | | | | | |
| EDT36 | 0 | 000000F56 | -1750 | 1722 | | | | | | | | | | | | |
| EDT360 | 0 | 000000F62 | -1753 | 1758 | 1761 | | | | | | | | | | | | |
| EDT37 | 0 | 000000F64 | -1755 | 1751 | | | | | | | | | | | | |
| EDT38 | 0 | 000000F72 | -1760 | 1756 | | | | | | | | | | | | |
| EDTE | 0 | 000000EC2 | -1693 | 1704 | | | | | | | | | | | | |
| EDTMSK | | 000000081 | -44 | 1101 | | | | | | | | | | | | |
| EDTS | 0 | 000000DE6 | -1573 | 1539 | | | | | | | | | | | | |
| EDTW | 0 | 000000EC8 | -1695 | 1706 | | | | | | | | | | | | |
| ENTER | 0 | 000000EE0 | -1158 | 731 | | | | | | | | | | | | |
| ENTERD | 0 | 0000000C4 | 1584 | 1586 | | | | | | | | | | | | |
| EOF | | 0000000F7 | -198 | 2338 | | | | | | | | | | | | |
| EOL | | 00000007F | -188 | 1957 | | | | | | | | | | | | |
| EOLADR | | 00000004C | -139 | 1958 | 2003 | 1041 | 1053 | 1245 | 1247 | 1412 | 1414 | 1476 | 1478 | 1540 | 1542 | | |
| EQUAL | | 00000000C | -107 | 2043 | 2466 | 1717 | 1763 | 2739 | 2847 | 2849 | 2056 | 2858 | | | | | |
| ERROR | | 0000000CA | -164 | 719 | 1330 | 2109 | | | | | | | | | | | |
| FCHAR | | 00000000D7 | -176 | 1661 | 1675 | 1354 | 1384 | 1387 | 1693 | 1703 | 2652 | 2664 | 2583 | 2184 | 2340 | 2344 | |
| FCNFLG | | 0000000C9 | -163 | 1113 | 1143 | 1879 | 1895 | 1901 | | | | | | | | | |
| FCOD | | 000000038 | -133 | 381 | 1458 | 1508 | 2078 | 1760 | 1703 | 2727 | 2753 | 2502 | | | | | |
| FCODE | | 00000003B | -132 | 133 | 1379 | 1453 | 1561 | 1335 | 1348 | 2379 | 2472 | | | | | | |
| FLAG | | 000000031 | -131 | 1284 | 1288 | 1296 | 1334 | | | | | | | | | | |
| FM0 | | 000000630 | -825 | 831 | | | | | | | | | | | | |
| FM1 | | 000000634 | -828 | 829 | | | | | | | | | | | | |
| FM2 | | 00000063C | -833 | 826 | | | | | | | | | | | | |
| FNDMSG | | 000000628 | -821 | 876 | 1941 | 2022 | 2097 | 2115 | 2123 | 2135 | 2143 | 2180 | | | | | |
| FRAME | | 000000050000 | -9 | 10 | 11 | | | | | | | | | | | |
| FRAST | | | 2373 | | | | | | | | | | | | | | |
| HBARP | | 0000000BF | -154 | 2853 | 2872 | | | | | | | | | | | | |
| HBARS | | 000000028 | -122 | 2352 | | 2887 | 2689 | | | | | | | | | | |
| HBL | | 00000002A | -123 | 2355 | | | | | | | | | | | | |
| HBLANK | | 0000000FE | -181 | 1971 | 1983 | 2465 | 2505 | | | | | | | | | | |
| HBR | | 000000004 | -103 | 1969 | | | | | | | | | | | | |
| HC2 | | 0000000FE | -204 | 2357 | | | | | | | | | | | | |
| HDR | | 0000000FE | -190 | 2145 | 2147 | | | | | | | | | | | | |
| HDRIV | | 00000000E | -108 | 1962 | 2466 | | | | | | | | | | | | |

| Symbol | | Address | Col1 | Col2 | Col3 | Col4 | Col5 | Col6 | Col7 | Col8 | Col9 | Col10 | Col11 |
|---|---|---|---|---|---|---|---|---|---|---|---|---|---|
| HE2 | 0 | 000000BF | -187 | 2045 | | | | | | | | | |
| HEXIT | | 00000744 | -965 | 928 | 937 | | | | | | | | |
| HFRONT | 0 | 00000005 | -104 | 1318 | 1946 | 2023 | 2078 | 2465 | 2601 | 2144 | 2474 | 2504 | 2581 | 2640 | 2688 |
| HLINE | | 00000002 | -102 | 1822 | 1834 | 1954 | 1982 | 2053 | 2128 | | | | |
| HMSG | 0 | 00000312 | -603 | 540 | | | | | | | | | |
| HORIZ | | 00200000 | -12 | 13 | | | | | | | | | |
| HORIZU | | 00210000 | -13 | 2181 | | | | | | | | | |
| HOTSTR | 0 | 00000116 | -364 | 570 | 2124 | | | | | | | | |
| HS2 | | 000000DF | -186 | 2033 | 2067 | | | | | | | | |
| HSY | | 000000FB | -183 | 2090 | | | | | | | | | |
| HSYNC | | 00000008 | -105 | 2088 | 2465 | | | | | | | | |
| HTR | | 000000F7 | -184 | 2106 | | | | | | | | | |
| HTRIGP | | 00000010 | -109 | 2098 | 2494 | | | | | | | | |
| HTRIGW | | 00000012 | -110 | 2101 | 2466 | | | | | | | | |
| HWIN | | 000000F7 | -193 | 2177 | | | | | | | | | |
| HWINE | | 00000026 | -121 | 2173 | | | | | | | | | |
| HWINS | | 00000024 | -120 | 2169 | 2523 | 2695 | | | | | | | |
| ICHAR | 0 | 000000D5 | -174 | 374 | 391 | 406 | | | | | | | |
| INACLP | 0 | 0000010A | -359 | 362 | | | | | | | | | |
| INCH | 0 | 00000598 | -743 | 298 | | | | | | | | | |
| INCH1 | 0 | 000005BC | -753 | 749 | 747 | 750 | 753 | 757 | | | | |
| INCHN | 0 | 000005C5 | -757 | 746 | | | | | | | | | |
| INIF1 | 0 | 00000148 | -383 | 384 | | | | | | | | | |
| IPCR | | 00000004 | -33 | 683 | | | | | | | | | |
| ISSP | | 00004E00 | -11 | 269 | | | | | | | | | |
| JMTAB | | 0000037C | -609 | 1011 | | | | | | | | | |
| JUST10 | 0 | 00000E6C | -1664 | 1667 | | | | | | | | | |
| JUST12 | 0 | 00000E70 | -1666 | | | | | | | | | | |
| JUST13 | 0 | 00000E78 | -1670 | 1666 | 1672 | | | | | | | | |
| JUST20 | 0 | 00000EB8 | -1675 | 1668 | | | | | | | | | |
| JUST21 | 0 | 00000EAA | -1687 | 1683 | | | | | | | | | |
| KEY | 0 | 000000D0 | -169 | 668 | 696 | 693 | 704 | | | | | | |
| KEYCHG | | 00000538 | -699 | | | | | | | | | | |
| KEYIN | 0 | 0000055E | -719 | 402 | | | | | | | | | |
| KEYMSG | 0 | 00000922 | -1194 | 1126 | | | | | | | | | |
| KEYSAM | 0 | 0000052C | -689 | 706 | | | | | | | | | |
| KEYSAV | 0 | 000000CE | -167 | 687 | 705 | 707 | 709 | 720 | 902 | 710 | 2786 | | |
| KEYSC0 | 0 | 000004FC | -670 | 702 | | | | | | | | | |
| KEYSC1 | 0 | 000004FE | -672 | 685 | | | | | | | | | |
| KEYSCN | 0 | 000004F0 | -666 | 397 | 560 | 566 | 2785 | | | | | | |
| KEYTAB | 0 | 00000578 | -731 | 723 | | | | | | | | | |
| KFLAG | | 0000000F | -168 | 399 | 401 | 561 | 564 | 567 | 689 | | | | |
| KYPST | | 00000532 | -696 | 684 | | | | | | | | | |
| KYPST1 | | 0000053E | -702 | 697 | | | | | | | | | |
| LAMPIT | * | 0000000A | -22 | 1 | | | | | | | | | |
| LAMPOF | 0 | 0000023A | -261 | 1140 | 1079 | 1101 | 1426 | 1470 | 2783 | | | | |
| LAMPON | 0 | 00000212 | -522 | 1079 | 1101 | 1426 | 1470 | | | | | | |
| LDMS0 | 0 | 00000505 | -505 | 2236 | | | | | | | | | |
| LDMS1 | 0 | 00000672 | -886 | 889 | 893 | | | | | | | | | |
| LDSYN | 0 | 0000067E | -892 | 887 | 2182 | 2342 | 2375 | | | | | | |
| LDSYN1 | 0 | 000015A4 | -2414 | 2133 | | | | | | | | | |
| LDSYNR | 0 | 000015AC | -2416 | 2419 | | | | | | | | | |
| LDSYNR | 0 | 000015B4 | -2421 | 2417 | | | | | | | | | |
| LF | | 0000000A | -22 | 781 | | | | | | | | | |
| LIN3 | 0 | 000000EF | -199 | 2213 | 2241 | 2245 | | | | | | | |
| LIN9 | 0 | 000000BF | -201 | 2236 | 2246 | 2268 | | | | | | | |
| LISCMD | | 00000005 | -39 | 1120 | 1469 | | | | | | | | |
| LISDON | 0 | 000000CD4 | -1523 | 1484 | | | | | | | | | |
| LISLOD | 0 | 000000CD0 | -1520 | 1477 | | | | | | | | | |
| LISPTR | | 0000003C | -135 | 1472 | 1480 | 1516 | | | | | | | |
| LIST | 0 | 00000C42 | -1476 | 1191 | | | | | | | | | |
| LIST01 | 0 | 00000C76 | -1493 | 1494 | | | | | | | | | |
| LIST02 | 0 | 00000C9A | -1503 | 1502 | | | | | | | | | |
| LIST1 | 0 | 00000C4E | -1480 | 1474 | | | | | | | | | |

| Symbol | Addr | | | | | | | | | | | | | | |
|---|---|---|---|---|---|---|---|---|---|---|---|---|---|---|---|
| LIST3 | 000000CA8 | -1508 | 1487 | | | | | | | | | | | | |
| LIST4 | 000000CAC | -1510 | 1511 | | | | | | | | | | | | |
| LIST5 | 000000CBE | -1515 | 1506 | | | | | | | | | | | | |
| LKOUT0 | 000000946 | -1203 | 1211 | | | | | | | | | | | | |
| LKOUT1 | 000000954 | -1209 | 1199 | | | | | | | | | | | | |
| LKOUT2 | 000000095E | -1213 | 1201 | | | | | | | | | | | | |
| LMPMSK | 0000003E | -42 | 508 | 525 | | | | | | | | | | | |
| LOADF | 0000066A | -876 | 813 | 841 | | | | | | | | | | | |
| LOCKS | 00000007 | -40 | 911 | 1213 | | | | | | | | | | | |
| LODMES | 0000066C | -883 | 814 | 1215 | | | | | | | | | | | |
| LOKCHG | 000000930 | -1196 | 1185 | 872 | | | | | | | | | | | |
| LOKOUT | 000000C5 | -160 | 309 | 1072 | 1096 | 1203 | 1235 | | | | | | | | |
| LOKR | 000000094C | -1205 | 1210 | 1215 | | | | | | | | | | | | |
| LOKS1 | 0000009BC | -1227 | 1221 | | | | | | | | | | | | |
| LOKSEC | 00027FFE | -18 | 1209 | 1218 | | | | | | | | | | | |
| LOKSET | 0000096A | -1217 | 1192 | | | | | | | | | | | | |
| LSD1 | 000000CE2 | -1528 | 1521 | | | | | | | | | | | | |
| LSTMSG | 00001AA8 | -2900 | 1523 | 2874 | | | | | | | | | | | |
| LWAIT | 000019B2 | -2827 | 1264 | 1225 | 1231 | 1234 | 2811 | 2815 | | | | | | | |
| LWAITL | 0000019C6 | -2832 | 2833 | | | | | | | | | | | | |
| LWAITR | 0000b19CC | -2835 | | | | | | | | | | | | | |
| MAIN | 000000016A | -397 | 400 | 403 | 410 | | | | | | | | | | |
| MAIN1 | 000000016E | -399 | | | | | | | | | | | | | |
| MAIN2 | 000000017E | -405 | | | | | | | | | | | | | |
| MAIN3 | 000000018A | -410 | 407 | | | | | | | | | | | | |
| MAND | 000001BC | -2403 | 1965 | | | | | | | | | | | | |
| MAND1 | 0000159E | -2411 | 2410 | | | | | | | | | | | | |
| MANDLP | 00001594 | -2407 | 1944 | 2138 | 2187 | 2011 | 2034 | 2046 | 2055 | 2068 | 2081 | 2091 | 2108 | 2119 | 2178 |
| MBLANK | 00001507C | -2397 | 2399 | | 2237 | 2242 | 2255 | 2269 | 2297 | 2310 | 2332 | 2359 | 2371 | | |
| MBLP | 000015B0 | -2398 | 2399 | 2347 | | | | | | | | | | | |
| MEMLIS | 00001AEE | -2925 | 1264 | | | | | | | | | | | | |
| MILFLG | 000013EA | -152 | 1945 | 1393 | 1607 | 2028 | 2061 | 2076 | 2126 | 2211 | 2314 | | | | |
| MILV | 00001446 | -2240 | 2277 | 1948 | 1949 | | | | | | | | | | |
| MILV10 | 00001456 | -2284 | 2212 | | | | | | | | | | | | |
| MILV20 | 0000145B | -2289 | 2282 | | | | | | | | | | | | |
| MILV30 | 000014B0 | -2293 | 2299 | | | | | | | | | | | | |
| MILV31 | 00001466 | -2297 | 2294 | | | | | | | | | | | | |
| MONTRAC | 000002DE | -578 | 273 | 274 | 275 | 276 | 277 | 300 | 301 | 302 | 303 | 304 | 305 | 306 | 307 |
| | | 308 | 309 | 311 | | | | | | | | | | | |
| MSG40 | 0000F000 | -75 | 975 | | | | | | | | | | | | |
| MSG41 | 0000F001 | -76 | 1326 | 1376 | 1441 | 1602 | 2656 | | | | | | | | |
| MSG42 | 0000F002 | -77 | 1321 | 1371 | 1429 | 2659 | | | | | | | | | |
| MSG43 | 0000F003 | -78 | 1039 | | | | | | | | | | | | |
| MSG45 | 0000F005 | -80 | 1455 | | | | | | | | | | | | |
| MSG46 | 0000F006 | -81 | 1563 | | | | | | | | | | | | |
| MSG47 | 0000F007 | -82 | 1000 | | | | | | | | | | | | |
| MSG48 | 0000F008 | -83 | 1026 | 1293 | 1653 | | | | | | | | | | |
| MSG49 | 0000F009 | -84 | 995 | 1301 | 1648 | | | | | | | | | | |
| MSG4D | 00000324 | -604 | 593 | 1021 | 1290 | 1298 | 1645 | | | | | | | | |
| MSG4P | 000002E0 | -586 | 280 | | | | | | | | | | | | |
| MSG50 | 0000F00A | -85 | 609 | | | | | | | | | | | | |
| MSG51 | 0000F00B | -86 | 611 | | | | | | | | | | | | |
| MSG52 | 0000F00C | -87 | 1036 | | | | | | | | | | | | |
| MSG53 | 0000F00D | -88 | 1031 | | | | | | | | | | | | |
| MSG54 | 0000F00E | -89 | 2662 | | | | | | | | | | | | |
| MSG55 | 0000F00F | -90 | 613 | | | | | | | | | | | | |
| MSG56 | 0000F010 | -91 | 615 | | | | | | | | | | | | |
| MSG57 | 0000F011 | -92 | 617 | | | | | | | | | | | | |
| MSG58 | 0000F012 | -93 | 619 | | | | | | | | | | | | |
| MSG59 | 0000F013 | -94 | 2667 | | | | | | | | | | | | |
| MSG60 | 0000F014 | -95 | 2670 | | | | | | | | | | | | |
| MSG61 | 0000F015 | -96 | 2673 | | | | | | | | | | | | |
| MSGTAB | 000000394 | -625 | 822 | | | | | | | | | | | | |

| Symbol | Col1 | Col2 | Col3 | Col4 | Col5 | Col6 | Col7 | Col8 | Col9 | Col10 | Col11 | Col12 | Col13 | Col14 |
|---|---|---|---|---|---|---|---|---|---|---|---|---|---|---|
| MTAB | 0 | 000001612 | -2461 | 2470 | | | | | | | | | | |
| NEVER | 0 | 000001998 | -2820 | 2759 | | | | | | | | | | |
| NEVER1 | 0 | 000019A6 | -2823 | 1829 | | | | | | | | | | |
| NODEC | 0 | 00001098 | -1872 | 1788 | | | | | | | | | | |
| NOLINE | 0 | 000000000 | -101 | 1438 | 1795 | 1805 | 1818 | 2244 | 2317 | 2337 | 2483 | 2628 | 2647 | 2705 | 2866 |
| NORAST | 0 | 00000044 | -47 | 1489 | 2717 | | | | | | | | | | |
| NOTIMP | 0 | 000000CEA | -1531 | 2893 | | | | | | | | | | |
| NOTMSG | 0 | 00001AB3 | -2901 | 2873 | | | | | | | | | | |
| NSERCH | 0 | 00001A96 | -2893 | | | | | | | | | | | | |
| NUM | 0 | 000000688 | -902 | 731 | 732 | 733 | 734 | | | | | | | |
| NUM0 | 0 | 000000606 | -922 | 1017 | 1054 | | | | | | | | | |
| NUM00 | 0 | 000000742 | -963 | 910 | 912 | | | | | | | | | | |
| NUM1 | 0 | 0000073A | -961 | 948 | | | | | | | | | | | |
| NUM2 | 0 | 00000072C | -957 | 958 | | | | | | | | | | | |
| NUM3 | 0 | 00000072E | -958 | 955 | | | | | | | | | | | |
| NUM4 | 0 | 000000766 | -990 | 916 | | | | | | | | | | | |
| NUM40 | 0 | 000000776 | -998 | 994 | | | | | | | | | | | |
| NUM400 | 0 | 00000076E | -993 | 1048 | | | | | | | | | | | |
| NUM41 | 0 | 000000782 | -1003 | 991 | | | | | | | | | | | |
| NUM410 | 0 | 00000078A | -1005 | 1050 | 1286 | | | | | | | | | | |
| NUM44 | 0 | 00000079E | -1014 | 1004 | | | | | | | | | | | |
| NUM440 | 0 | 0000007AE | -1019 | 1015 | 1052 | | | | | | | | | | |
| NUM45 | 0 | 0000007B6 | -1024 | 1020 | | | | | | | | | | | |
| NUM5 | 0 | 0000007C2 | -1029 | 1029 | | | | | | | | | | | |
| NUM50 | 0 | 0000007CA | -1034 | 320 | | | | | | | | | | | |
| NUM51 | 0 | 0000007D6 | -1039 | 1030 | 1007 | 1009 | 1025 | 1035 | | | | | | | |
| NUM6 | 0 | 00000070E | -31 | 999 | | | | | | | | | | | |
| NUM60 | 0 | 0000007E2 | -1045 | 918 | | | | | | | | | | | |
| NUMBUF | 0 | 000000804 | -1053 | 1046 | | | | | | | | | | | |
| NUMERR | 0 | 000000064 | -143 | 905 | 908 | 976 | 1040 | 1148 | 1158 | 1161 | | | | | |
| NUMTAB | 0 | 000000755 | -975 | 952 | | | | | | | | | | | |
| OCCUR | 0 | 0000080C | -1061 | 903 | | | | | | | | | | | |
| OCHAR | 00 | 000000C0 | -155 | 2852 | 2863 | 2886 | | | | | | | | | |
| ODLOOP | | 0000005FA | -175 | 750 | 771 | | | | | | | | | | |
| OPROFF | | 0000005FA | -730 | 791 | | | | | | | | | | | |
| OPROFF | 0 | 00000000F | -32 | 513 | 529 | 677 | | | | | | | | | |
| OPRON | 0 | 00000000E | -31 | 510 | 526 | 675 | | | | | | | | | |
| OPSTAB | 0 | 000000912 | -1185 | 1165 | | | | | | | | | | | |
| OUT | 0 | 000000648 | -850 | | | | | | | | | | | | |
| OUT1 | 0 | 000000656 | -862 | 853 | 864 | | | | | | | | | | |
| OUTCHO | 0 | 0000005D8 | -769 | 770 | | | | | | | | | | | |
| OUTCHR | 0 | 0000005D0 | -766 | 297 | | | | | | | | | | | |
| OUTDIS | 0 | 0000005F4 | -789 | 780 | 854 | 863 | | | | | | | | | |
| OUTFL | 0 | 000000640 | -841 | 812 | | | | | | | | | | | |
| OUTLP | 0 | 00000064A | -852 | 855 | | | | | | | | | | | |
| OUTMES | 0 | 000000608 | -800 | 299 | | | | | | | | | | | |
| OUTMLP | 0 | 000000662 | -872 | 810 | | | | | | | | | | | |
| OUTP | 0 | 000000646 | -848 | 811 | 874 | | | | | | | | | | |
| OUTTAB | 0 | 00000061E | -810 | 801 | | | | | | | | | | | |
| OVNMSG | 0 | 000019D4 | -2838 | 2772 | | | | | | | | | | | |
| PACR | 0 | 00000000C | -58 | 293 | | | | | | | | | | | |
| PADATA | 0 | 000000010 | -60 | 290 | | | | | | | | | | | |
| PADDR | 0 | 000000004 | -55 | 291 | | | | | | | | | | | |
| PARM | 0 | 000000068 | -144 | 1158 | 1159 | 1197 | 1198 | 1205 | 1228 | 1236 | 1249 | 1304 | 1392 | 1416 | 1544 1588 |
| PARMLS | | 000027000 | 1709 | 1730 | 2534 | 2541 | 2749 | 2777 | 2850 | | | | | | |
| PARMNO | | 000200C1 | -17 | 18 | 1448 | 1471 | 1557 | 2763 | 2864 | 1606 | 1613 | 1634 | 1636 | 1676 | 1701 1724 |
| | | | -156 | 1047 | 1049 | | | 1269 | 1605 | | | | | | |
| | | | 1726 | 1750 | 1755 | 1051 | 1263 | | | | | | | | |
| PBCR | | 00000000E | -59 | 293 | | | | | | | | | | | |
| PBDATA | | 00000012 | -61 | 290 | 1940 | 2378 | 2828 | 2835 | | | | | | | |
| PBDDR | | 000000006 | -56 | 299 | | | | | | | | | | | |
| PCDATA | | 000000018 | -62 | 292 | | | | | | | | | | | |
| PCDDR | | 00000008 | -57 | 291 | 2385 | | | | | | | | | | |
| PCRLF | 0 | 0000005EA | -779 | 848 | | | | | | | | | | | |
| PGCR | | 000000000 | -53 | 289 | | | | | | | | | | | |

| Symbol | | Address | Col1 | Col2 | Col3 | Col4 | Col5 | Col6 | Col7 | Col8 | Col9 | Col10 | Col11 |
|---|---|---|---|---|---|---|---|---|---|---|---|---|---|
| PIT | 0 | 00025000 | -16 | 364 | | | | | | | | | |
| PLOOP | 0 | 00000122 | -368 | 371 | | | | | | | | | |
| PRCV10 | 0 | 000013C6 | -2227 | 2221 | | | | | | | | | |
| PRCV11 | 0 | 00001472 | -2305 | 2238 | | | | | | | | | |
| PRCV12 | 0 | 000014BE | -2336 | 2315 | | | | | | | | | |
| PRCV13 | 0 | 000013E6 | -2238 | 2235 | | | | | | | | | |
| PRINT1 | MACR | | -228 | 1 | 1939 | 2377 | 595 | 962 | 1138 | 1504 | 1513 | 1689 | 1770 2885 2895 |
| PRINT2 | MACR | | -240 | 1 | | | 541 | 1526 | 1579 | 1777 | 2746 | 2773 | 2782 2796 2822 |
| PRINT3 | MACR | | -251 | 1 | | | 1078 | 1425 | 1606 | 1613 | 2499 | 2530 | 2530 |
| PRMADR | | 0000006C | -145 | 1611 | | | 1104 | | | | | | |
| PRMMSG | 0 | 00000CFC | -1532 | 1578 | | | 1631 | | | | | | |
| PROC | 0 | 00001128 | -1939 | 310 | | | | | | | | | |
| PROC0 | 0 | 000011FA | -2022 | 1998 | | | | | | | | | |
| PROC01 | 0 | 00001214 | -2033 | 2029 | | | | | | | | | |
| PROC1 | 0 | 0000121C | -2040 | 2027 | | | | | | | | | |
| PROC10 | 0 | 00001270 | -2087 | 2077 | | | | | | | | | |
| PROC11 | 0 | 0000125A | -2074 | 2062 | | | | | | | | | |
| PROC12 | 0 | 000012EC | -2133 | 2127 | | | | | | | | | |
| PROC2V | 0 | 000014DA | -2344 | | 2031 | | | | | | | | |
| PROC2V1 | 0 | 00001504 | -2359 | 2362 | | | | | | | | | |
| PROC2V2 | 0 | 0000157A | -2395 | 2387 | | | | | | | | | |
| PROC3 | 0 | 000012A0 | -2108 | 2110 | | | | | | | | | |
| PROC4 | 0 | 000012B4 | -2115 | 2112 | | | | | | | | | |
| PROC5 | 0 | 000012B4 | -2119 | 2121 | | | | | | | | | |
| PROC6 | 0 | 000012BC | -2146 | | | | | | | | | | |
| PROC1D | 0 | 0000130E | -2123 | 2102 | 2113 | 2117 | | | | | | | |
| PROCV | 0 | 000012C8 | -2184 | 2334 | | | | | | | | | |
| PROCV4 | 0 | 0000136A | -2327 | 2328 | | | | | | | | | |
| PROCV5 | 0 | 000014AC | -2332 | 1310 | | | | | | | | | |
| PROP | 0 | 000014B2 | -2469 | 2480 | 1736 | | | | | | | | |
| PROP10 | 0 | 0000163A | -2474 | 2492 | | | | | | | | | |
| PROP12 | 0 | 0000164A | -2483 | 2489 | | | | | | | | | |
| PROP13 | 0 | 00001662 | -2491 | 2497 | | | | | | | | | |
| PROP14 | 0 | 00001676 | -2500 | 289 | | | | | | | | | |
| PSRR | 0 | 0000169C | -54 | 2469 | | | | | | | | | |
| PTAB | 0 | 00000002 | -8 | 365 | | | | | | | | | |
| PTITAB | 0 | 00001626 | -289 | 1133 | 1524 | 2895 | | | | | | | |
| PULL | 0 | 000018A4 | -2734 | 1076 | 1420 | 1468 | | | | | | | |
| PUSH | 0 | 0000188A | -2723 | 2737 | | | | | | | | | |
| PUSH0 | 0 | 00001894 | -2727 | 2730 | | | | | | | | | |
| PUSH1 | 0 | 00001898 | -2729 | 1347 | 1744 | | | | | | | | |
| PVID | 0 | 00000F9A | -2502 | 2515 | | | | | | | | | |
| PVID0 | 0 | 000016C8 | -2517 | 2528 | | | | | | | | | |
| PVID1 | 0 | 000016F4 | -2531 | 9 | | | | | | | | | |
| RAMBAS | 0 | 00040000 | -8 | 1797 | | | | | | | | | |
| RAT0 | 0 | 00000FFA | -1813 | 1811 | 1819 | | | | | | | | |
| RAT1 | 0 | 0000100E | -1822 | 1842 | | | | | | | | | |
| RAT2 | 0 | 00001052 | -1845 | 1850 | | | | | | | | | |
| RAT3 | 0 | 00001064 | -1853 | 387 | 1137 | 1512 | 2820 | 2884 | | | | | |
| RATCAL | 0 | 00000F9A | -1775 | 1776 | 1116 | | | | | | | | |
| RATMSG | 0 | 00000F94 | -1773 | 1087 | | | | | | | | | |
| RCMD | 0 | 00000002 | -35 | 732 | | | | | | | | | |
| RECALL | 0 | 00000844 | -1087 | 1187 | | | | | | | | | |
| RECL | 0 | 00000B86 | -1412 | 1417 | | | | | | | | | |
| RECL00 | 0 | 00000BCA | -1432 | 1419 | | | | | | | | | |
| RECL00 | 0 | 00000BC5 | -1429 | 1437 | | | | | | | | | |
| RECL02 | 0 | 00000BE4 | -1444 | 1439 | | | | | | | | | |
| RECL1 | 0 | 00000BEC | -1447 | 1445 | | | | | | | | | |
| RECL2 | 0 | 00000BFC | -1452 | 1454 | | | | | | | | | |
| RECL20 | 0 | 00000C0B | -1458 | 1433 | | | | | | | | | |
| RECL3 | 0 | 00000C1A | -1467 | 1462 | | | | | | | | | |
| RECLLP | 0 | 00000C0E | -1461 | 30 | | | | | | | | | |
| RHRB | 0 | 0000000B | -29 | 747 | | | | | | | | | |
| ROT | 0 | 000010BA | -1887 | 1664 | 1882 | | | | | | | | |

| | | | | | | | | | | | | |
|---|---|---|---|---|---|---|---|---|---|---|---|---|
| ROT1 | | 000010D4 | -1900 | 1896 | | | | | | | | |
| ROT2 | | 000010E2 | -1906 | 1898 | | | | | | | | |
| ROTATE | | 000010A2 | -1876 | 1784 | | | | | | | | |
| RTLP | | 000010AE | -1882 | 1883 | | | | | | | | |
| RXRDY | | 00000000 | -26 | 745 | | | | | | | | |
| SAV10 | | 000018D2 | -2749 | 2743 | | | | | | | | |
| SAV20 | | 000018DA | -2753 | 2750 | | | | | | | | |
| SAV200 | | 00001902 | -2768 | 2770 | | | | | | | | |
| SAV201 | | 0000190E | -2772 | 2769 | | | | | | | | |
| SAV21 | | 0000191E | -2777 | 2741 | | | | | | | | |
| SAV210 | | 00001924 | -2779 | 2751 | | | | | | | | |
| SAV22 | | 00001926 | -2781 | 2771 | | | | | | | | |
| SAV23 | | 00001954 | -2800 | 2804 | 2778 | | | | | | | |
| SAV230 | | 0000196E | -2804 | 2818 | | | | | | | | |
| SAV231 | | 00001972 | -2805 | 2779 | 2788 | | | | | | | |
| SAV24 | | 0000197E | -2809 | 2802 | | | | | | | | |
| SAV240 | | 00001980 | -2810 | 2813 | | | | | | | | |
| SAV241 | | 0000198E | -2815 | 2817 | | | | | | | | |
| SAV26 | | 000018E6 | -2758 | 2754 | | | | | | | | |
| SAV27 | | 000018EC | -2761 | 2756 | | | | | | | | |
| SAV29 | | 00001938 | -2785 | 2793 | | | | | | | | |
| SAV30 | | 00001944 | -2790 | 2787 | | | | | | | | |
| SAVCMD | | 00000004 | -37 | 2744 | | | | | | | | |
| SAVERR | | 000000D2 | -171 | 2740 | 2805 | | | | | | | |
| SAVFLG | | 000000D1 | -170 | 2742 | 2823 | | | | | | | |
| SAVIT | | 000018B0 | -2739 | 1189 | 1589 | | | | | | | |
| SAVMSG | | 000019E0 | -2833 | 2745 | | | | | | | | |
| SAVMSK | | 00000001 | -46 | 2783 | | | | | | | | |
| SAVPRM | | 00000070 | -146 | 1267 | 1612 | 1623 | 1626 | 1633 | 1656 | | | |
| SAVPRS | | 00000071 | -1626 | 1642 | 1651 | | | | | | | |
| SEARCH | | 00001A0A | -2844 | 1190 | | | | | | | | |
| SERCH1 | | 00001A2E | -2856 | 2845 | | | | | | | | |
| SERCH2 | | 00001A38 | -2860 | 2854 | | | | | | | | |
| SERCH3 | | 00001A4A | -2866 | 2871 | | | | | | | | |
| SERCH4 | | 00001A50 | -2869 | 2877 | | | | | | | | |
| SERCH5 | | 00001A68 | -2877 | 2867 | | | | | | | | |
| SERCH6 | | 00001A9C | -2894 | 2875 | | | | | | | | |
| SERCH7 | | 00001A76 | -2882 | 2883 | | | | | | | | |
| SERCH8 | | 00001AA4 | -2898 | 2891 | | | | | | | | |
| SERCMD | | 00000005 | -38 | 1118 | 1422 | | | | | | | |
| SERFLG | | 000000D3 | -172 | 1423 | 1528 | | | | | | | |
| SERR | | 0000000A | -106 | 2064 | 2465 | 2844 | | | | | | |
| SHUFL | MACR | | -218 | 1 | 1955 | 1963 | 1970 | 2044 | 2065 | 2089 | 2170 | 2174 |
| SKMIL | | 00001156 | -1954 | 1947 | | | | | | | | |
| SKPADJ | | 00001554 | -2384 | 2382 | | | | | | | | |
| SKPAFP | | 000004A9E | -1319 | 1316 | | | | | | | | |
| SLOAD | | 00001A92 | -2890 | 2857 | | | | | | | | |
| SOPR | | 000000BE | -153 | 507 | 511 | 524 | 527 | 674 | 1077 | 1103 | 1142 | 1573 |
| SPACE | | 00000001 | -19 | 862 | 892 | 932 | 1670 | | 1538 | 1571 | | |
| SRA | | 00000003 | -24 | 790 | | | | | | | | |
| SRB | | 00000041 | -28 | 745 | 769 | | | | | | | | |
| SRCHMK | | 00000041 | -45 | 1426 | 1470 | | | | | | | | |
| START | | 000000FC | -355 | 270 | | | | | | | | |
| STEPNO | | 0000000CD | -166 | 990 | 1003 | 1014 | 1045 | 1874 | 2170 | 1254 | 1256 | 1258 | 1260 | 1262 | 1269 |
| | | | -1280 | 1282 | 1305 | 1403 | 1424 | | | 1575 | 1580 | 1629 | 1690 | 1716 | 2498 |
| STRPTR | | 00000040 | -2529 | 2765 | 2797 | | | | | | | | |
| STUFIT | | 00001114 | -1931 | 1862 | 1867 | 1870 | | | | | | | |
| SWAIT | | 00000514 | -680 | 681 | | | | | | | | |
| SWORK | | 00000074 | -147 | 2851 | 2860 | | | | | | | | |
| TBUF | | 00004F00 | -10 | 2725 | 2736 | | | | | | | | |
| TCODE | | 000000BA | -149 | 1473 | 1483 | 1485 | 1515 | | | | | | |
| TCR | | 00000020 | -64 | 294 | | | | | | | | |
| THRA | | 00000003 | -25 | 792 | 2394 | | | | | | | | |

```
THRB              0000000B   -30    771
TOKEYS       0    00000528  -687    708
TRACE        0    000002DC  -577    278
TWOLAB       0    00001082 -1864   1859
TXRDY             00000002   -27    769   790
UNPACK       0    000010EE -1912   1860  1864
UPACK        0    000010EA -1910   1496  1872
UPLOOP       0    000010F6 -1916   1925
VBARP             00000020  -118   2152  2517
VBARS             00000022  -119   2155  2510
VBC               000000FD  -191   2159
VBL               000000FE  -195   2194
VBLANK            00000014  -111   2192  2349  2467  2706
VDR               000000FD  -196   2202
VDRIV             00000016  -112   2200  2467
VERT              00024000   -14     15    16    17  2341
VERTU             00025000   -15   2374
VFP               0000001C  -115   1339  1356  1752  2209  2231  2264
VPOST             0000001D  -116   1340  1364  1757  2230  2263
VSY               000000DF  -200   2222  2254
VSYNC             0000001E  -117   1341  2219  2233  2253  2265
VTR               0000007F  -202   2278  2290  2324
VTRIGP            00000018  -113   2276  2319  2495
VTRIGW            0000001A  -114   2279  2285  2321  2467
VWIN              000000FB  -197   2309
VWINE             0000002E  -125   2307
VWINS             0000002C  -124   2305  2713
WARN              000000BC  -151   1332  1389  1695  1705  2653  2675
WATMSG       0    000019FF -2842   2781
WORKB             000000D4  -173   1115  1123
WRKMSG       0    000019EA -2840   2795
ZERO         0    0000006C  -296   1981  2262  2364
```

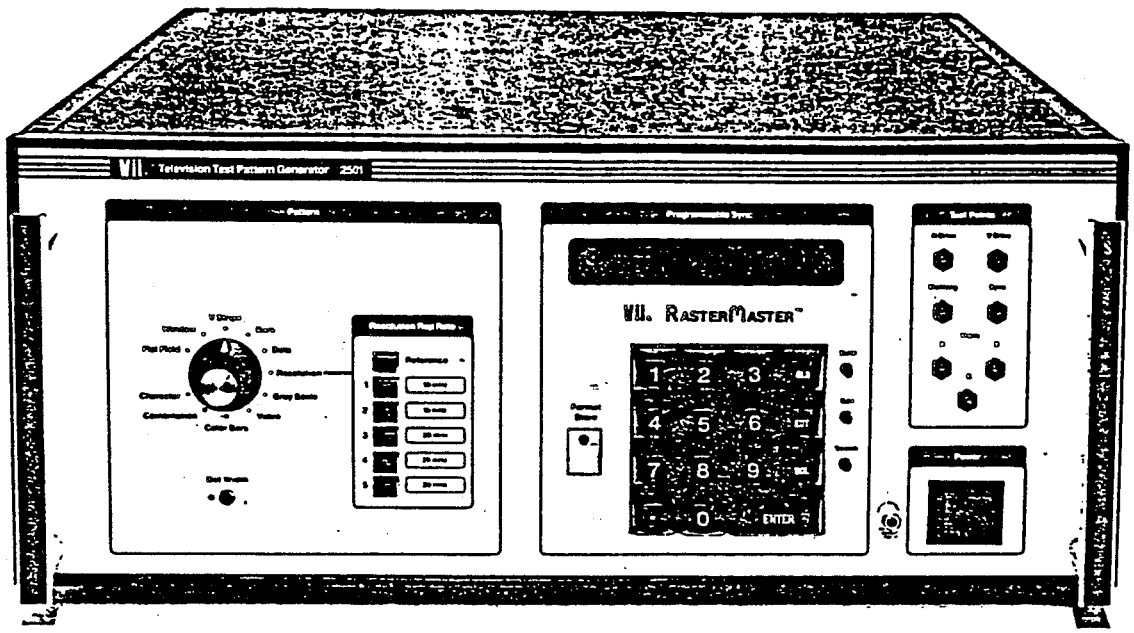

VII. Product Information

Model 2501
Television Test Pattern Generator
Programmable – Keypad Entry

Unique flexibility — the new VII® RasterMaster™ keyboard programmable video test pattern generator.

Operates at virtually any scan rate  Horizontal: 5 kHz to 100 kHz. Vertical: 1 Hz to 200 Hz. For Standard Video, Computer Graphics, Slow Scan, Medical

Storage  of up to 69 raster formats, non-volatile EEPROM.

Programmability  Direct access in real numbers:
Horizontal: in increments of 0.1 usec.  Vertical: in increments of 0.5 line.

Versatility Can program *all* pulse parameters and test pattern proportions.

User Friendly Simple to operate, two-way communication through 16-segment display, with 68000 uprocessor computing power. No complex routines or special vocabulary.

Secure Security password necessary to revise or install pulse or test pattern data.

Efficient Instant recall of stored information by two digit access code number.

Support The "Raster Master" manual includes a complete programming guide, index and work sheets for Building, Editing, Recall, and Storage of virtually any raster format.

Wide Application A complete set of raster scan display test patterns for thorough evaluation of display performance.

Functions are provided to conduct the "Performance Test for Television Display Devices" published by Vii.

Raster Structure
Established by keypad entry of individual timing parameters for each raster desired, in the range of 5 kHz to 100 kHz horizontal rate:
Horizontal Parameters (0.1 usec timing increment)
- Total H Line Time
- H Blanking
- H Front Porch
- H Sync
- 2H Serrations
- 2H Equalizing
- H Drive
- H Trigger Phase
- H Trigger Width

Vertical Parameters (½ line timing increment)
- Scan Lines in Two Fields
- V Blanking
- V Front Porch (V Trigger Phase)
- V Sync (V Trigger Width)
- V Trigger Phase
- V Trigger Width
- Sync Format

Test Patterns
Horizontal proportion is clocked from 20 H Rate unless non-standard entry is desired on allowed patterns. Selections available through keypad entry include:
Horizontal Pattern Proportion (0.1 usec increment)
- V Bar Position
- V Bar Spacing
- H Window Position
- H Window Width
Vertical Pattern Proportion (scan line in active field)
- H Bar Position
- H Bar Spacing
- V Window Position
- V Window Width

Storage
Up to 69 separate rasters, access by two digit code.

selectable reference bars.
Character Development of a block "C" with a small "x" superimposed to form rows across the television display screen. Characters are in a 5x7 pixel format, seven scan lines tall. Rows are separated by three inactive scanning lines. The number is adjustable, nominally 40 to 80 characters per row depending upon scan rate, to a maximum 25 mHz clock rate.
Video Combines a five step resolution burst sequence, black reference segment, and a ten step gray scale.
Combination Contains in one raster simultaneously the Video pattern plus Color Bars.

Video Output Signals
Three individual video channels for red, green and blue components of an RGB color television system.
Type Composite video.
Level
Video Adjustable 0 to 1.0v., internal control.
Blanking Adjustable 0 to 0.125v., internal control.
Sync Adjustable 0 to 0.4v., internal control.
Impedance 75 ohm, source terminated.
Risetime 10 nsec nominal in video portion of signal.
Coupling d.c. (direct).
Polarity White positive, sync negative.
Connectors BNC type coaxial.

TTL Video
Type Video only, without blanking "setup" or sync.
Level TTL compatible, nominal 0 to +4v.
Impedance Nominal 75 ohm source terminated.
Coupling D.C. (direct).
Polarity White positive.
Risetime Nominal 10 nsec.

Note: In the interest of product improvement, these specifications are subject to change without notice.

Current Approximately 1½ amp at -120v.
Power Approximately 150 watts.
Frequency 50/60 Hz.
Fuse Rating 2 amp slo-blo.
Enclosure
Type Cabinet enclosure for bench top use. Optional rack slides available.
Size 7" (18cm) high, 17" (43cm) wide, 20" (51cm) deep.
Weight Approximately 36 lbs. (16.3 Kg).
Temperature 0°c to +55°c.
Connectors BNC type coaxial.
Limited Warranty
Vii equipment is warranted to be free of defects in material and workmanship for a period of one year from date of shipment. If such defects are confirmed through our inspection, the product will be repaired or replaced, at our option, without charge to the purchaser for parts or labor. This warranty does not cover damage which occurs in shipment or due to misuse or abuse of the apparatus.

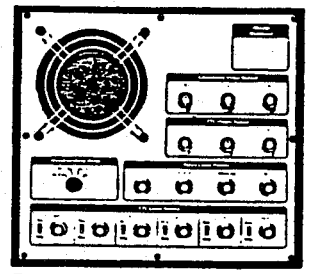

Rear Panel
Separate TTL and Video-type outputs are provided at the rear panel for both synchronizing pulses and test pattern video. Coaxial BNC-type connectors are used; all Video format outputs are source terminated to drive a 75 ohm coaxial cable unless specified otherwise. TTL format outputs are provided at low source impedance.

Window

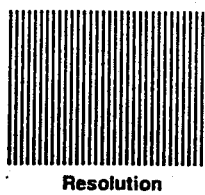
Resolution

Video

Visual Information Institute, Inc.
PO Box 33
719 Lower Bellbrook Road
Xenia, Ohio 45385-0033
Telephone 513/376-4361

© Visual Information Institute, Inc. 1984. Printed in USA by ViiPress Commercial Printers. Effective 5/84.

What is claimed is:

1. In a video test pattern generator, a selectable rate sync generator comprising:
   keyboard means for selecting individual independent raster scan signal pulse width and timing parameters for the horizontal and vertical synchronizing waveforms of a raster scan; and
   means coupled to said keyboard means for generating a time based raster scan signal by building up said scan signal from an integer number of individual constant time elements assembled according to said selected parameters.

2. The sync generator of claim 1 including a fixed frequency clock coupled to said generating means for establishing the time base for said generator.

3. The sync generator of claim 1 including a variable frequency clock selectively coupled to said generator whereby said generator selectively generates a pixel based scan rate in accordance with pixel based pulse width parameters entered into said keyboard.

4. The sync generator according to claim 3 wherein said variable frequency clock is a voltage controlled phase locked loop oscillator.

5. The sync generator according to claim 1 including means for selectively generating a scan signal comprised of pulses whose widths are expressed as a percentage of selected total horizontal line time.

6. The sync generator according to claim 1 including display means coupled to said keyboard means ror displaying selected scan rate data.

7. A video pattern generator comprising:
keyboard means for individually entering data values representing the incremental pulse width and timing parameters for all the scan rate pulses comprising a raster scan structure;
sync generator means coupled to said keyboard means for generating a time based scan rate composed of an integer number of constant time elements assembled into pulse elements having said selected pulse widths and timing;
fixed frequency clock means coupled to said sync generator means for controlling said sync generator means;
raster pattern selecting means for selecting a desired raster pattern; and
pattern generator means coupled to said sync generator means and said raster pattern selecting means for generating a selected raster pattern at the generated scan rate.

8. The pattern generator according to claim 7 including a variable frequency clock coupled to said sync generator whereby said generator selectively generates a pixel based scan rate in accordance with pulse width parameters entered into said keyboard.

9. The pattern generator according to claim 8 wherein said variable frequency clock comprises a phase locked loop voltage controlled oscillator.

10. The video pattern generator according to claim 7 including means coupled to said microprocessor and sync generator for selectively automatically generating a scan format comprised of pulse elements whose widths are proportional to the selected total horizontal line time.

11. The video pattern generator according to claim 7 including memory storage means coupled to said central processing unit for storing a plurality of raster scan rates.

12. The video pattern generator according to claim 11 wherein said stored raster scan structures may be selectively edited by varying the widths of selected pulses in accordance with selective data entries into said keyboard.

13. The video pattern generator according to claim 12 wherein a code must be entered into said keyboard to enable editing of said stored raster scan structures.

14. The video pattern generator according to claim 7 including display means coupled to said keyboard means for displaying selective scan rate data.

15. A video test pattern generator comprising:
a fixed frequency master clock;
keyboard means for selecting scan rate elements by individually entering data values representing the pulse widths of the pulse elements comprising a raster scan;
readout means coupled to said keyboard means for displaying selected scan rate data;
selecting means for selecting a raster scan display pattern;
sync generator means coupled to said keyboard means and said clock means for generating a time based scan rate comprised of a plurality of constant width time elements assembled into the selected pulse elements; and
pattern generator means coupled to said sync generator means, and said selecting means for generating a selected test pattern at the generated scan rate.

16. The test pattern generator according to claim 15 including a variable frequency clock coupled to said sync generator whereby said generator selectively generates a pixel based scan rate in accordance with pixel based scan rate parameters entered into said keyboard.

17. The test pattern generator according to claim 16 wherein said variable frequency clock comprises a voltage controlled phase locked loop oscillator, said control voltage generated by said microprocessor.

18. The video test pattern generator according to claim 15 including means coupled to said microprocessor and sync generator for selectively generating a scan rate comprised of elements whose pulse widths are proportional to the total horizontal line time.

19. The video test pattern generator according to claim 15 including memory storage means coupled to said central processing unit for storing a plurality of raster scan rates.

20. The video test pattern generator according to claim 19 including means for editing said stored raster scan rates in accordance with data entered into said keyboard.

21. The video test pattern generator according to claim 19 wherein said stored raster scan rates may be edited upon the entry of an enablement code into said keyboard.

22. The video test pattern generator according to claim 15 wherein horizontal pulse widths are defined in 0.1 microsecond increments and vertical pulse widths are defined in 0.5 line increments.

23. The method of generating a raster scan signal comprising:
entering individual pulse width and timing parameters into a selecting means;
storing said parameters in a memory;
generating a scan signal by building a signal comprised of pulse elements having such selected individual pulse width and timing parameters.

24. In a video test pattern generator, a selectable rate sync generator comprising:
synchronizing waveform generator means including a programmable microprocessor for generating a synchronizing waveform including horizontal and vertical drive pulses, horizontal and vertical blanking pulses, and horizontal and vertical sync pulses based on variable parameters set into said synchronizing waveform generator means, and
keyboard controlled means for individually and independently selecting and setting into said synchronizing waveform generator means said variable parameters, wherein said variable parameters include at least horizontal drive time, vertical drive time, horizontal blanking time, vertical blanking time, horizontal front porch, horizontal sync time, vertical trigger phase and vertical trigger width,
said keyboard controlled means including a single numeric keyboard means for selecting all of said variable parameters.

* * * * *

UNITED STATES PATENT AND TRADEMARK OFFICE
CERTIFICATE OF CORRECTION

PATENT NO. : 4,670,782
DATED : June 2, 1987
INVENTOR(S) : JOHN H. HARSHBARGER

It is certified that error appears in the above-identified patent and that said Letters Patent is hereby corrected as shown below:

```
Col.  8, line 18, before "step" insert --six--;
Col. 10, line 36, after "indicated" insert --by means--;
Col. 12, line 10, change "96care" to --96c are--;
Col. 12, line 31, change "DS" to --D$--;
Col. 12, line 32, change "DS" to --D$--;
Col. 12, line 33, change "DS" to --D$--;
Col. 12, line 34, change "DS" to --D$--;
Col. 12, line 35, change "DS" to --D$--;
Col. 12, line 36, change "DS" to --D$--;
Col. 12, line 39, change "DS" to --D$--;
Col. 12, line 40, change "DS" to --D$--;
Col. 12, line 44, change "DS" to --D$--;
Col. 13, line 52, change "FCI" to --FC1--
Col. 13, line 63, change "DS" to --D$--;
Col. 13, line 64, change "DS" to --D$--;
```

UNITED STATES PATENT AND TRADEMARK OFFICE
CERTIFICATE OF CORRECTION

PATENT NO. : 4,670,782

DATED : June 2, 1987

INVENTOR(S) : John H. Harshbarger

It is certified that error appears in the above-identified patent and that said Letters Patent is hereby corrected as shown below:

```
Col. 13, line 69, change "DS" to --D$--;
Col. 13, line 70, change "DS" to --D$--;
Col. 14, line 1, change "DS" to --D$--;
Col. 14, line 67, before "formats" insert --fixed--;
Claim 6, Col. 107, line 11, change "ror" to --for--.
```

Signed and Sealed this

Eleventh Day of April, 1989

Attest:

DONALD J. QUIGG

*Attesting Officer*      *Commissioner of Patents and Trademarks*